United States Patent

Yamamoto et al.

[11] Patent Number: 5,987,170
[45] Date of Patent: Nov. 16, 1999

[54] CHARACTER RECOGNITION MACHINE UTILIZING LANGUAGE PROCESSING

[75] Inventors: Hiroshi Yamamoto, Katano; Hisao Niwa, Osaka; Yoshihiro Kojima, Kobe; Susumu Maruno, Osaka; Kazuhiro Kayashima, Hirakata; Yasuharu Shimeki, Suita; Toshiyuki Kouda, Nara; Hidetsugu Maekawa, Hirakata; Satoru Ito, Katano, all of Japan

[73] Assignee: Matsushita Electric Industrial Co., Ltd., Osaka, Japan

[21] Appl. No.: 08/965,534

[22] Filed: Nov. 6, 1997

Related U.S. Application Data

[63] Continuation of application No. 08/513,294, Aug. 10, 1995, which is a continuation of application No. 08/125,658, Sep. 23, 1993, abandoned.

[30] Foreign Application Priority Data

| Sep. 28, 1992 | [JP] | Japan | 4-257801 |
| Dec. 10, 1992 | [JP] | Japan | 4-330169 |
| Dec. 10, 1992 | [JP] | Japan | 4-330170 |
| Mar. 12, 1993 | [JP] | Japan | 5-051918 |
| Sep. 7, 1993 | [JP] | Japan | 5-221766 |

[51] Int. Cl.$^6$ .................................................. G06K 9/72
[52] U.S. Cl. .......................... 382/170; 382/229; 704/4; 704/10
[58] Field of Search .................................. 382/170, 229, 382/227, 190, 231; 704/4, 10

[56] References Cited

U.S. PATENT DOCUMENTS

| 4,750,122 | 6/1988 | Kaji et al. | 364/419.13 |
| 4,903,206 | 2/1990 | Itoh et al. | 364/419.12 |
| 5,029,085 | 7/1991 | Ito | 364/419.08 |
| 5,050,218 | 9/1991 | Ikeda et al. | 382/40 |
| 5,146,512 | 9/1992 | Weideman et al. | 382/34 |
| 5,148,367 | 9/1992 | Saito et al. | 364/419.12 |
| 5,222,160 | 6/1993 | Sakai et al. | 364/419.02 |

FOREIGN PATENT DOCUMENTS

| 1073483 | 3/1989 | Japan | 364/419.14 |
| 02214990 | 8/1990 | Japan | |
| 03164887 | 7/1991 | Japan | |

OTHER PUBLICATIONS

Abstract of Japanese Laid Open Patent Application No. 4-254685.
Abstract of Japanese Laid Open Patent Application No. 4-76678.
Maruno et al., D-313, "Documents Recognition System With Cooperation of Pattern and Symbolic Processing (1)", Intelligent Electronics Laboratory, Central research Laboratories, Matsushita Elec. Ind. Co., Ltd., 1992, pp. 6-315, No Month.

(List continued on next page.)

*Primary Examiner*—Christopher S. Kelley
*Attorney, Agent, or Firm*—Smith, Gambrell & Russell

[57] ABSTRACT

There is disclosed a character recognition machine adapted to recognize Japanese characters such as kanjis and kanas. The machine comprises a character string storage portion, a character extraction portion, a character recognition portion, and a language processing portion. A character string to be recognized is stored as an image in the storage portion. The character extraction portion comprises a network consisting of a plurality of interconnected operators each of which has numerous inputs and outputs. An evaluation function which assumes its minimum value when a character extraction produces the best results is calculated by the operators simultaneously so as to minimize the value of the function. The character recognition portion calculates degrees of similarity of a character pattern to various character categories, the character pattern being applied from the character extraction portion. The language processing portion receives these degrees of similarity and selects a character category which seems to provide the most correct combination of characters in terms of vocabulary and grammar.

21 Claims, 33 Drawing Sheets

OTHER PUBLICATIONS

Yamamoto et al., D–314 "Documents Recognition System With Cooperation of Pattern and Symbolic Processing (2)", Intelligent Electronics Laboratory, Central Research Laboratories, Matsushita Elec. Ltd. Ind. Co., Ltd., 1992, pp. 6–316, No Month Given.

Kojima et al., D–315 "Documents Recognition System With Cooperation of Pattern and Symbolic Processing (3)", Intelligent Electronics Laboratory, Central Research Laboratories, Matsushita Elec. Ind. Co., Ltd., 1992, pp. 6–317, No Month Given.

Niwa et al., D–316, "Documents Recognition System With Cooperation of Pattern and Symbolic Processing (4)", Intelligent Electronics Laboratory, Central Research Laboratories, Matsushita Elec. Ind. Co., Ltd., 1992, pp. 6–318, No Month Given.

Niwa et al., D–317, "Documents Recognition System With Cooperation of Pattern and Symbolic Processing (5)", Intelligent Electronics Laboratory, Central Research Laboratories, Matsushita Elec. Ind. Co., Ltd., 1992, pp. 6–319, No Month Given.

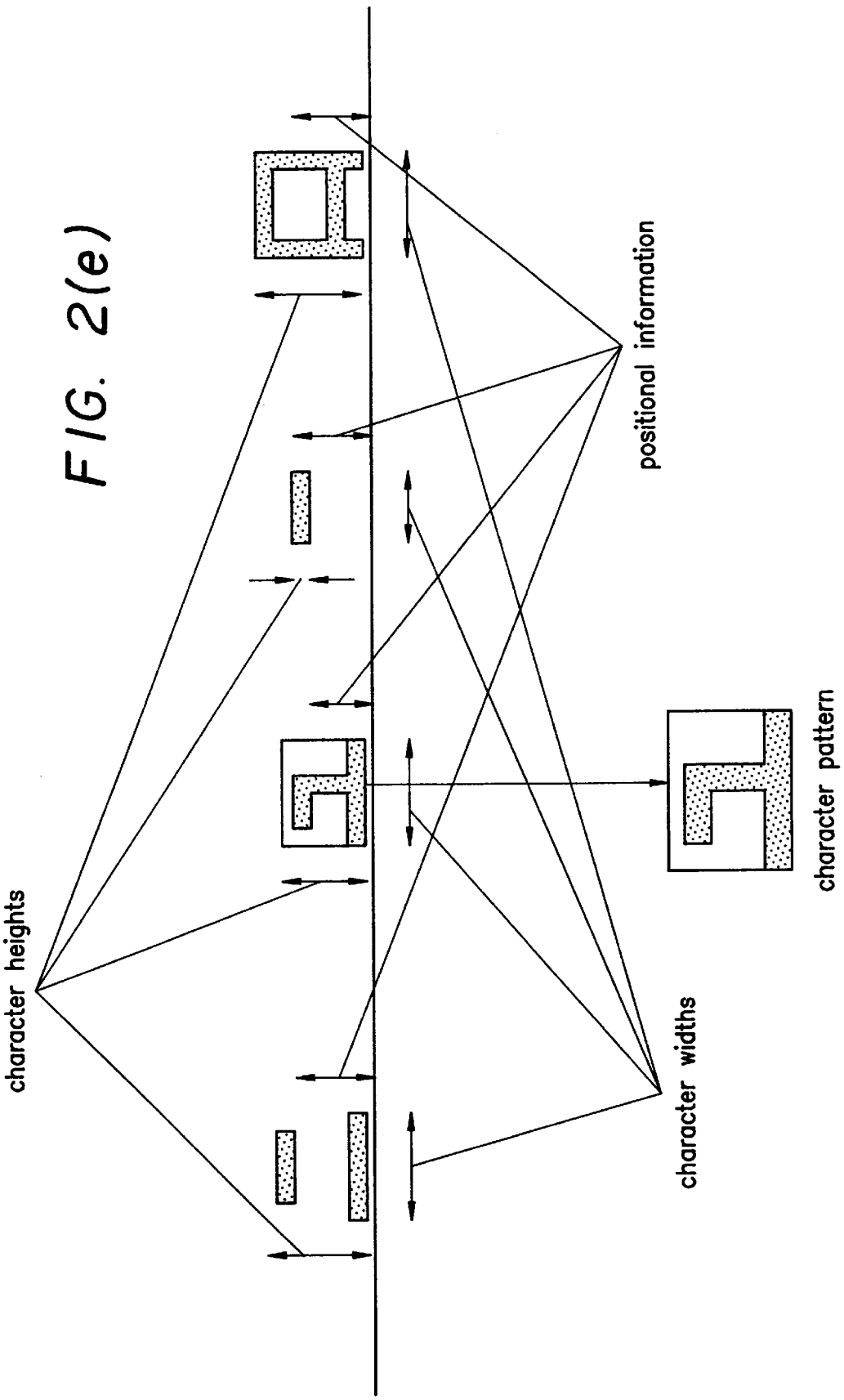

|  | (1) | (2) |
|---|---|---|
| correct character string | 正確な | ユーラシア大陸に |
| modified character string | 5枚だ | ニーラン7人陸に |
| rejected characters | 5枚だ | ニーラン7人 |
| first candidate characters | 正破な | ユーラシア大陸に |
| recognized character string | 正破な | ユーラシア大陸に |

FIG. 3(d)

| initial extraction positions | |1 0|0 0|字| |
|---|---|
| modified character string | 刈皿字 |
| rejected characters | 刈皿字 |
| re-extraction positions | |1|0|0|0|字| |
| modified character string | 1 0 0 0 字 |
| rejected characters | |
| recognized character string | 1 0 0 0 字 |

FIG. 3(e)

first candidate characters

失章を記識し、女法を用いて訂止する． modified character string

文章を認識し、文法を用いて訂正する． output from candidate character comparator portion additional learning character

文 modified character string determined character species     katakanas     numerals

CHARACTER RECOGNITION MACHINE UTILIZING LANGUAGE PROCESSING

This is a continuation of co-pending application Ser. No.08/513,294filed on Aug. 10, 1995 which was a continuation of application Ser. No. 08/125,658, filed on Sep. 23, 1993 now abandoned.

BACKGROUND OF THE INVENTION

1. Field of the Invention

The present invention relates to a character recognition machine for separating every character pattern from a character string image contained in a text image and for recognizing these character patterns. The invention also relates to a character recognition machine utilizing language processing.

2. Related Art of the Invention

FIG. 5 is a diagram showing the structure of the prior art character recognition machine. This machine comprises a character string or array image storage portion 1, a projection profile (or concentration) histogram calculating portion 3, a character interval-estimating portion 101, a Gaussian filter portion 102, a threshold value-processing portion 103, an interval memory 104, a character starting point-detecting portion 105, a character end point-detecting portion 106, a character pattern output portion 10, a feature-extracting portion 107, a reference character feature dictionary 108, a matching portion 109, a word dictionary 110, and a word matching portion 111.

The operation of this prior art character recognition machine is now described by referring to FIG. 5. The character string image storage portion 1 stores a character string image read by the machine. The projection profile histogram calculating portion 3 counts the number of black pixels located on lines extending perpendicular against the direction of the input character string in the input character string image stored in the character string image storage portion 1 and sends values obtained at various coordinates located on lines extending in the direction of the character string to the character interval-estimating portion, or character squareness degree-estimating portion, 101 and to the Gaussian filter portion 102 in such a way that the values form a projection profile histogram. The character interval-estimating portion 101 finds the average value of those values contained in the projection profile histogram which lie within a given range, based on the maximum value, and sends this average value as a character squareness degree to the character end point-detecting portion 106.

The Gaussian filter portion 102 convolves a Gaussian function into the input projection profile histogram to thereby suppress RF components of the histogram and accentuate valley portions of the histogram. The output from the Gaussian filter 102 is applied to the threshold value-processing portion 103, which then finds the starting point and the end point of an interval whose input value exceeds a given value and delivers the found values to the interval memory 104. Plural sets of the starting points and the end points calculated by the threshold value-processing portion 103 are successively written to the interval memory 104 and stored there.

The prior art machine determines character positions successively from intervals held in the interval memory 104. The determination of the character positions is described below.

First, the character starting point-detecting portion 105 reads the interval closest to the origin of the coordinate system from the interval memory 104, takes the starting point of this interval as the starting point of the first character, and delivers this starting point to both character end point-detecting portion 106 and character pattern output portion 10. Let Xstart be the applied starting point. Let L be the interval between characters obtained by the character interval-estimating portion 101. Then, the character end point-detecting portion 106 takes the end point Xend of that interval of the intervals held in the interval memory 104 which satisfies conditions (1) as the end point of the first character, and sends this point to both character pattern output portion 10 and character starting point-detecting portion 105.

$$(1-\alpha) \cdot L < |Xend - Xstart| < (1+\alpha) \cdot L \qquad (1)$$

where $\alpha$ is an appropriate positive number.

The character end point-detecting portion 106 continues its detecting operation while changing the value of a until the end point is detected.

When the end point of the first character is applied from the character end point-detecting portion 106, the character starting point-detecting portion 105 reads out a starting point which has a value greater than this end point and closest to the origin of the coordinate systems. In the same way as in the case of the first character, the character starting point-detecting portion 105 takes this starting point as the starting point of the second character and sends this starting point to both character end point-detecting portion 106 and character pattern output portion 10. In this manner, the positions of characters are determined successively in the order of the end point of the second character, the starting point of the third character, and the end point of the third character until all the intervals held in the interval memory 104 correspond to the character positions. Information about the character positions is delivered to the character pattern output portion 10.

The character pattern output portion 10 reads an image from the input character string image held in the character string image storage portion 1, the image lying within the range from the starting point to the end point of each input character. The output portion 10 successively sends such images as character patterns to the feature-extracting portion 107.

The feature-extracting portion 107 normalizes the sizes of character patterns applied from the character pattern output portion 10, extracts features (e.g., the densities of black pixels, the densities of horizontal, vertical and oblique components, contours, and the number of end points and intersections) of the characters contained in a certain number of block regions when the normalized sizes are divided into the block regions, and sends the features to the matching portion 109.

The above-described features of the characters which are found from reference characters have been previously registered in the reference character feature dictionary 108.

The matching portion 109 finds the degrees of approximation of the character features applied from the feature-extracting portion 107 to the reference characters registered in the reference character feature dictionary 108, and calculates these degrees of approximation as character recognition evaluation values. Whenever a character feature is applied, a reference character is judged to be closest to the character, based on one character recognition evaluation value. A certain number of such reference characters are sent as a candidate character category to the word matching portion 111 together with their character recognition evaluation values. Words have been previously registered in the word dictionary 110.

The word matching portion 111 finds combinations of candidate character categories applied from the matching portion 109, evaluates the matching to the words registered in the word dictionary 110, searches for a combination of the highest matching, and produces the character category contained in this combination as the result of final recognition.

In the configuration described above, it is necessary to execute the process step by step. The processing time is increased accordingly. Also, it is generally impossible to evaluate the results of extractions of characters. Once such an extraction produces an error, the results of subsequent extractions are affected greatly. Thus, the processing accuracy deteriorates. Furthermore, those portions which have been incorrectly extracted do not lead to correct recognition results. In addition, a character which is once recognized erroneously will continue to be treated erroneously.

A conventional character recognition pattern machine first roughly classifies character patterns applied, selects a character category group (i.e., a set of character patterns having similar feature vectors) to which the input character patterns belong, then subclassifies the patterns within the selected character category group to recognize the character patterns. This machine is described in, for example, the Proceedings of the Electronic Information and Communications Society of Japan, D-II, Vol. J75-D-II, No. 3, pp. 545–553, "Large-Scale Neural Net", Comb NET-II.

FIG. 6 shows the structure of this known character recognition machine. This machine has an image input portion 6-110 such as an image scanner which receives a text image to be recognized. A character-extracting portion 6-111 extracts character patterns from each character region of the text image received by the image input portion 6-110. A feature-extracting portion 6-112 extracts feature vectors from each character pattern extracted by the character-extracting portion 6-111, the feature vectors being used to discern character categories. A rough classification portion 6-113 roughly classifies the character patterns into character category groups, using the feature vectors extracted by the feature-extracting portion 6-112. A subclassification portion 6-114 subclassifies the character patterns within each character category group, using the feature vectors. A group-selecting portion 6-115 selects plural character category groups from the output (hereinafter referred to as the goodness of fit) from the rough classification portion 6-113. A subclassification portion input signal selector portion 6-116 selects such a subclassification portion 6-114 which receives the feature vectors, based on information about selection of group, the information being obtained by the group-selecting portion 6-115. A discerning portion 6-117 discerns the character patterns from the goodness of fit of the character category groups selected by the group-selecting portion 6-115 and from the output value from the subclassification portion 6-114.

The rough classification portion 6-113 comprises input portions 6-118 receiving the feature vectors of the character patterns extracted by the feature-extracting portion 6-112 and multiple inputs and one output (hereinafter this is abridged as only multiple input-output) signal processing portions 6-119 for calculating the goodness of fit of each character category group to the character patterns.

Each subclassification portion 6-114 comprises input portions 6-120 receiving the feature vectors delivered from the subclassification portion input signal selector portion 6-116, multiple input-output signal processing portions 6-121, and input portions 6-120 forming a lower layer, the input portions 6-120 being connected with the multiple input-output signal processing portions 6-121. The subclassification portions 6-114 calculate the products of the outputs from the input portions 6-120 or the multiple input-output signal processing portions 6-121 and weighting coefficients, calculate the sum of these products, and deliver the sum if it is less than a threshold value. The weighting coefficients indicate degrees of connectivity. These input-output signal processing portions 6-121 form a multilayered structure, and there exists no connection inside each layer. The network is so connected that signals are propagated only to upper layers. Thus, the degree of similarity of each character category inside the character category group to the character patterns are found. A maximum value selecting portion 6-122 selects the greatest value from the output values from the multiple input-output signal processing portions in the top layer.

The discerning portion 6-117 comprises similarity degree calculating portions 6-123 and a category discerning portion 6-124. The similarity degree calculating portions 6-123 calculate the degrees of similarity of character categories from the goodness of fit of the character category group selected by the group-selecting portion 6-115 and from the output value from the subclassification portion 6-114 which corresponds to the character category group. The category discerning portion 6-124 finds the maximum value of the degrees of similarity of character categories obtained by the similarity degree calculating portions 6-123 to discern the character category of the applied character pattern.

The operation of the known character recognition machine constructed as described above is described now. The character-extracting portion 6-111 extracts character patterns one by one from the text image applied from the image input portion 6-110. The feature-extracting portion 6-112 finds a feature vector X about the character pattern extracted from the character-extracting portion 6-111. The vector X is composed of n feature data items and given by $$X = (x_1, x_2, \ldots, x_n) \tag{1A}$$

The feature data items are found by the concentration mesh method. In this method, an applied character pattern is divided into n small regions. The area (i.e., the number of black pixels contained in each small region) of the character portion in each small region is normalized with the area of the small region. The normalized number is taken as data about a feature.

The feature vector X extracted by the feature-extracting portion 6-112 in this way is applied to the input portions 6-118 of the rough classification portion 6-113. The number of the input portions 6-118 is n, or equal to the number of feature data items of a character pattern. The feature data item $x_i$ are applied to the respective input portions 6-118. The multiple input-output signal processing portions 6-119 of the rough classification portion 6-113 calculate the total sum of the products of inputs $x_j$ to the input portions 6-118 connected with the processing portions 6-119 and their respective weighting coefficients $v_{ij}$ ($1 \leq \leq m_r$; $m_r$ is the number of character category groups; $1 \leq j \leq n$) that indicate their degrees of connectivity. The weighting coefficient vector of each input-output processing portion 6-119 is given by $$V_i = (v_{i1}, v_{i2}, \ldots, v_{in}) \tag{2}$$

Then, the rough classification portion 6-113 divides the total sum by the product of the norms $|X| \cdot |V_i|$ of the feature vector x and the weighting coefficient vector $V_i$, and delivers the quotient. That is, the output value sim $(X, V_i)$ from the multiple input-output signal processing portion 6-119 having the weighting coefficient vector $V_i$ shown in FIG. 6 can be given by $$sim(X, V_i) = (X \cdot V_i)/(|X| \, |V_i|) \quad (3)$$

$$\text{where } X \cdot V_i = \sum_j (x_j v_{ij})$$

$$|X| = \left(\sum_j x_j^2\right)^{0.5}$$

$$|V_i| = \left(\sum_j v_{ij}^2\right)^{0.5}$$

The weighting coefficient vectors $V_i$ have been previously designed so that some input-output signal processing portion 6-119 produces its maximum output in response to a set of character patterns having similar feature vectors X.

These weighting coefficient vectors $V_i$ are designed by the prior art techniques as follows. In the first step, whenever the feature vector X of a character pattern for designing the weighting coefficient vectors is applied, $V_c$ having the greatest value of sim $(X, V_i)$ is found (at this time, it is said that X is optimally matched to $V_c$), and $V_c$ is made to approach X. When the number of character patterns optimally matched to one weighting coefficient vector exceeds a given value, the region assigned to this vector is divided into two. Thus, an additional weighting coefficient vector is created. In the second step, $V_i$ optimally matched to all character patterns for designing weighting coefficient vectors are found. A check is done to determine whether these values of $V_i$ differ from previous values. If they differ, $V_i$ are modified. At this time, weighting coefficient vectors are generated, in the same way as in the first step. These operations are repeated until neither modification nor creation of weighting coefficient vectors takes place.

By designing weighting coefficient vectors in this way, each weighting coefficient vector $V_i$ can divide and quantize the feature vector space of a character pattern. That is, applied character patterns are classified into sets of character patterns having similar feature vectors, i.e., into character category groups, in terms of the weighting coefficient vectors $V_i$. The output value from each input-output signal processing portion 6-119 is produced as the goodness of fit of each character category group to character patterns to the group-selecting portion 6-115.

The group-selecting portion 6-115 selects an arbitrary number of character category groups in order of increasing goodness of fit obtained by the rough classification portion 6-113, and produces information indicating which character category groups are selected and corresponding goodness of fit.

The subclassification portion input signal selector portion 6-116 selects some subclassification portions 6-114 according to the information about the selected groups, the information being obtained from the group-selecting portion 6-115. These subclassification portions 6-114 receive the feature vector X of the applied character pattern. X is produced to these subclassification portions 6-114.

The subclassification portions 6-114 which correspond to the character category groups selected by the group-selecting portion 6-115 and receive the feature vectors X of the character patterns from the subclassification portion input signal selector portion 6-116 receive the feature vectors X at their input portions 6-120. The number of the input portions 6-120 is n, or equal to the number of feature data items of each character pattern. The feature data items $x_i$ are applied to their respective input portions 6-120. Each multiple input-output signal processing portion 6-121 of the subclassification portions 6-114 calculate the products of the outputs from the input portions 6-120 in the lower layer connected with the processing portions 6-121 or the multiple input-output signal processing portions 6-121 and weighting coefficients, calculates the total sum of these products, transforms the sum into a corresponding value by a threshold value function, and produces the resulting value to the upper layer. The weighting coefficients indicate the degrees of connectivity. The multiple input-output signal processing portions 6-121 in the top layer of each subclassification portion 6-114 are equal in number with character categories of character patterns contained in each category group. The multiple input-output signal processing portions 6-121 in the top layer correspond to these character categories. The maximum value selecting portion 6-122 selects a maximum one from output values from the multiple input-output signal processing portions 6-121 in the top layer and delivers the character categories corresponding to these multiple input-output signal processing portions 6-121, as well as the maximum output value.

Weighting functions of the multiple input-output signal processing portions 6-121 have been previously set in such a way that the multiple input-output signal processing portions 6-121 in the top layer corresponding to character categories produce a maximum output in response to the feature vectors X of the character patterns having character categories within the character category group. This is known as a learning method for weighting coefficients.

More specifically, such a learning method for weighting coefficients is carried out by a learning algorithm known as the error back propagation method. This error back propagation method is described, for example, by D. E. Rumelhart, G. E. Hinton, and R. J. Williams, in "Learning Representations by Back-Propagating Errors", Nature, Vol. 323, pp. 533–536, Oct. 9, 1986.

The error back propagation method is hereinafter described briefly. First, feature vectors X of character patterns for learning of weighting coefficients are applied to the input portions 6-120 of the subclassification portions 6-114. As described previously, each multiple input-output signal processing portion 6-121 of the subclassification portions 6-114 calculates the products of the outputs from the input portions 6-120 in the lower layer connected with the processing portions 6-121 or the multiple input-output signal processing portions 6-121 and weighting coefficients, calculates the total sum of these products, transforms the sum into a corresponding value by a threshold value function, and produces the resulting value to the upper layer. The weighting coefficients indicate the degrees of connectivity. Error E that is a deviation of output $o_k$ from all the multiple input-output signal processing portions 6-121 in the top layer from a desirable output $t_k$ (referred to as a teacher signal) is given by $$E = 0.5 \, \Sigma_p \Sigma_k \, (t_k - o_k)^2 \quad (4)$$

where $\Sigma_p$ is the sum of teacher signals associated with the number of character patterns. The purpose of the learning is to determine such a weighting coefficient value which minimizes the error E. The deviation $\Delta w_{ij}$ of the weighting coefficient of each multiple input-output signal processing portion 6-121 is calculated according to Eq. (5) given by $$\Delta w_{ij} = -\epsilon \partial E / \partial w_{ij} \quad (5)$$

where $\epsilon$ is a positive constant called a learning rate. This modification of the weighting coefficient according to Eq. (5) is repeated whenever the feature vector X of a character pattern for learning is applied. In this way, the error E can be reduced. If the error E becomes sufficiently small, then the learning is ended because we can consider that the output signal has sufficiently approached the desired value.

This method of learning weighting coefficients permits the multiple input-output signal processing portions 6-121 in the top layer corresponding to the character patterns possessed by character categories in a character category group to produce their maximum outputs. Accordingly, the maximum value selecting portion 6-122 selects that of the multiple input-output signal processing portions 6-121 in the top layer which produces a maximum output. In this way, within each character category, i.e., within each subclassification portion, the character category of the applied character pattern can be judged.

In the discerning portion 6-117, the similarity degree calculating portions 6-123 first calculate the degree of similarity of each character category obtained by the sub-classification portions 6-114, from the goodness of fit of the character category group selected by the group-selecting portion 6-115 and from the output value from the subclassification portion 6-114 corresponding to that character category group, using Eq. (6). These degrees of similarity are output to the category discerning portion 6-124.

$$\text{degree of similarity} = (\text{goodness of fit})^a \, (\text{output value})^b \quad (6)$$

where a and b are real constants.

Finally, the category discerning portion 6-124 compares the degrees of similarity of character categories obtained from the similarity degree calculating portions 6-123, and produces the character category corresponding to the greatest degree of similarity as the result of discerning.

In character recognition, features which are effective in discerning a character pattern are extracted as feature vectors. Generally, it is difficult to sufficiently recognize characters if only one feature vector is used. Characters can be detected well by using plural kinds of feature vectors. In particular, a character pattern which would lead to obscure recognition or erroneous recognition with a single feature vector may be discerned correctly if a different feature vector is added. At this time, the recognition performance might be improved by attaching great importance to the vector that enables accurate discrimination.

However, if the conventional character recognition machine which hierarchically recognizes character patterns having numerous character categories is equipped with only one feature-extracting portion or recognition portion, and if plural kinds of feature vectors are employed, then it is necessary to apply these vectors to the machine simultaneously for recognition. In this case, indeed, discriminating performance somewhat higher than in the case where a single feature vector is used can be realized but the advantages obtained by using different feature vectors as described above cannot be fully exploited. That is, when plural kinds of feature vectors are used simultaneously, it is possible to enhance the discriminating performance. However, it is very difficult to correctly recognize a character pattern which would be erroneously recognized with a certain feature vector as described above, based on the results of discrimination using a different feature vector.

Where plural kinds of feature vectors are collectively used simultaneously, as the number of dimensions of feature vectors is increased, a longer time is required to recognize characters.

In recent years, as database technologies have evolved, the demand for character recognition machines capable of recognizing characters at a high speed and at a high recognition rate has increased.

Conventionally, knowledge processing has been introduced to character recognition machines to enhance the recognition accuracy. This knowledge processing is a method of modifying the result of a recognition of each one character to the most probable character by using a word dictionary and a grammatical dictionary for the result described above.

Another known character recognition machine is disclosed in Japanese Patent Laid-Open No. 164887/1991. This known machine is shown in FIG. 7 and has an extraction portion 7-11 for extracting an image representing one character from a text image. A character recognition portion 7-12 produces candidate characters (N candidate characters per character) in response to the extracted image. A clause (or phrase) search portion 7-13 finds combinations of characters forming a clause from the set of the candidate characters, using a word dictionary 7-16 and a grammatical dictionary 7-17. A clause (or phrase) evaluating value calculating portion 7-14 finds a clause-evaluating value indicating the vocabular and grammatical correctness of each candidate clause. A candidate clause (or phrase) comparator portion 7-31 compares the clause-evaluating values of the candidate clauses. If plural candidate clauses having a maximum clause-evaluating value exist, then a candidate character string comparator portion 7-32 compares the candidate clause character strings for each individual character. If a disagreement between characters is discovered in a character position, then these characters are rejected. A signal indicating the position of the erroneously recognized character is produced. In this way, the recognition can be improved, and the modification operation can be made more efficient.

In the above-described character recognition machine, when a plurality of candidate clauses exist, the characters in these clauses are rejected. Therefore, if this machine is used for general documents containing numerous words, almost all characters are rejected. Where the character recognition portion recognizes handwritten characters, the recognition rate is low. At this time, the number of candidate characters delivered from the character recognition portion is increased. This also increases the number of candidate clauses, thus increasing the possibility of the presence of plural candidate clauses. Hence, excessive characters are rejected.

A further character recognition machine has been proposed in Japanese Patent Laid-Open No. 214990/1990. As shown in FIG. 8, this machine has a character amendment portion 8-8 which receives N candidate characters per character from a character recognition portion 8-1. An automatic amendment portion 8-61 compares the candidate characters with an amendment rule table 8-63 and amends characters according to amendment rules. The results of the amendments produced from the automatic amendment portion 8-61 are displayed for a human operator. Then, he or she amends characters erroneously recognized. A manual amendment control portion 8-62 creates rules of amendments, registers the rules in the table 8-63, applies the rules to the results of subsequent recognitions to automatically amend incorrect recognitions. In this way, characters can be recognized according to the fonts of the document and according to the amendments made by the operator.

The character recognition machine described immediately above creates rules of amendments according to amendments made by the operator and so it is not possible for the machine to automatically create rules of amendments.

SUMMARY OF THE INVENTION

It is an object of the present invention to provide a character recognition machine which is capable of recognizing characters quickly by parallel processing and of recognizing characters at a high accuracy by efficiently reusing the results of processing once performed.

It is another object of the invention to provide a character recognition machine which accurately recognizes characters in a short time by using plural kinds of feature vectors in such a way that advantages arising from the use of plural kinds of feature vectors can be fully exploited.

It is a further object of the invention to provide a character recognition machine which detects erroneously amended characters and erroneously recognized characters within a character string modified, using knowledge processing, whereby the character recognition rate can be enhanced.

It is a yet other object of the invention to provide a character recognition machine which automatically reconstructs a recognition dictionary in a character recognition portion according to a character string modified, using knowledge processing, to recognize characters automatically according to the fonts of the document, thus enhancing the character recognition rate.

A character recognition machine of the present invention comprises:

a character string image storage portion, a character extraction portion, a character recognition portion, and a language processing portion; and the character string image storage portion is provided for storing a character string to be recognized as a character string image;

the character extraction portion is connected with the character string image storage portion and comprising a plurality of operators arranged in a direction of the character string, each of the operators having a multiplicity of inputs and one output, the operators being interconnected so as to form a network, and the character extraction portion acts to determine boundary positions of characters by the use of values of initialized processing parameters, to obtain a character pattern of each character and information about sizes and positions in this character pattern, to deliver these character patterns and information to the character recognition portion, to again process a text image in character positions specified by the character recognition portion or by the language processing portion with modified values of the processing parameters, to find new boundary positions of characters in the character positions, to obtain a new character pattern and new information about sizes and positions in this character pattern, and to again deliver these character pattern and information to the character recognition portion;

a character recognition portion is provided for finding degrees of similarity of a character pattern applied from the character extraction portion, the degrees of similarity indicating degrees to which the character pattern belongs to various character categories, the character recognition portion acting to inform the character extraction portion of position of the character pattern in said character string if the degrees of similarity are not matched to information about sizes and positions in the character pattern applied from the character extraction portion, and if the degrees of similarity are matched to information about sizes and positions in the character pattern applied from the character extraction portion, the character recognition portion acting to deliver the degrees of similarity to the language processing portion, or to deliver degrees of similarity to the character category group restricted by the language processing portion for a character pattern in character positions specified by the language processing portion, and to learn a character pattern as a teacher pattern if the language processing portion specifies a correct character category, the character pattern being in character positions of the specified correct character category, and a language processing portion is provided for receiving the degrees of similarity of character categories in various character positions found by the character recognition portion, selecting as a forecasted correct character category a combination of character categories which is most correct in terms of vocabulary and grammar, producing character positions corresponding to a certain character category to the character recognition portion if the forecasted correct character category is restricted to the certain character category, producing character positions corresponding to the forecasted correct character category to the character recognition portion if the forecasted correct character category differs from a character category applied from the character recognition portion and having a maximum degree of similarity, and producing character positions corresponding to a part to the character extraction portion if the part has no combination of character categories which seems to be correct in terms of vocabulary and grammar.

A character recognition machine according to the present invention performs parallel processing by a network comprising numerous input-output operators connected together. Thus, an evaluation function which assumes its minimum value when an extraction has produced generally optimum results can be minimized by the parallel processing performed by the network. Hence, the processing speed and the processing accuracy can be enhanced. Vocabular or grammatical errors due to erroneous extraction of characters are detected by character recognition and knowledge processing. Parameter values of processing are modified, using information about the degree of squareness of a correct portion. Estimation of the position of a character in a portion which is considered to have been incorrectly extracted is again performed. Then, a character position which is correct grammatically and in terms of vocabulary is selected. This can further enhance the accuracy of processing. Furthermore, with respect to a character recognized erroneously, the machine can automatically learn of this character anew. Consequently, the accuracy of processing can be improved.

Other objects and features of the invention will appear in the course of the description thereof, which follows.

BRIEF DESCRIPTION OF THE DRAWINGS

FIG. 1(*b*) is a block diagram of a concentration smoothing network portion 1-4 and an extraction position estimating network portion 1-5 included in the machine shown in FIG. 1(*a*);

FIG. 2(e) is a diagram illustrating a character pattern extracted by a character extraction portion according to the invention, information about the size of a character, and information about the position;

FIG. 3(d) is a diagram illustrating the results of experiments performed by the second example of the character recognition machine described just above;

FIG. 3(e) is a diagram illustrating the results of experiments performed by a third example of the character recognition machine described just above;

DESCRIPTION OF THE PREFERRED EMBODIMENTS

Figure 1A:
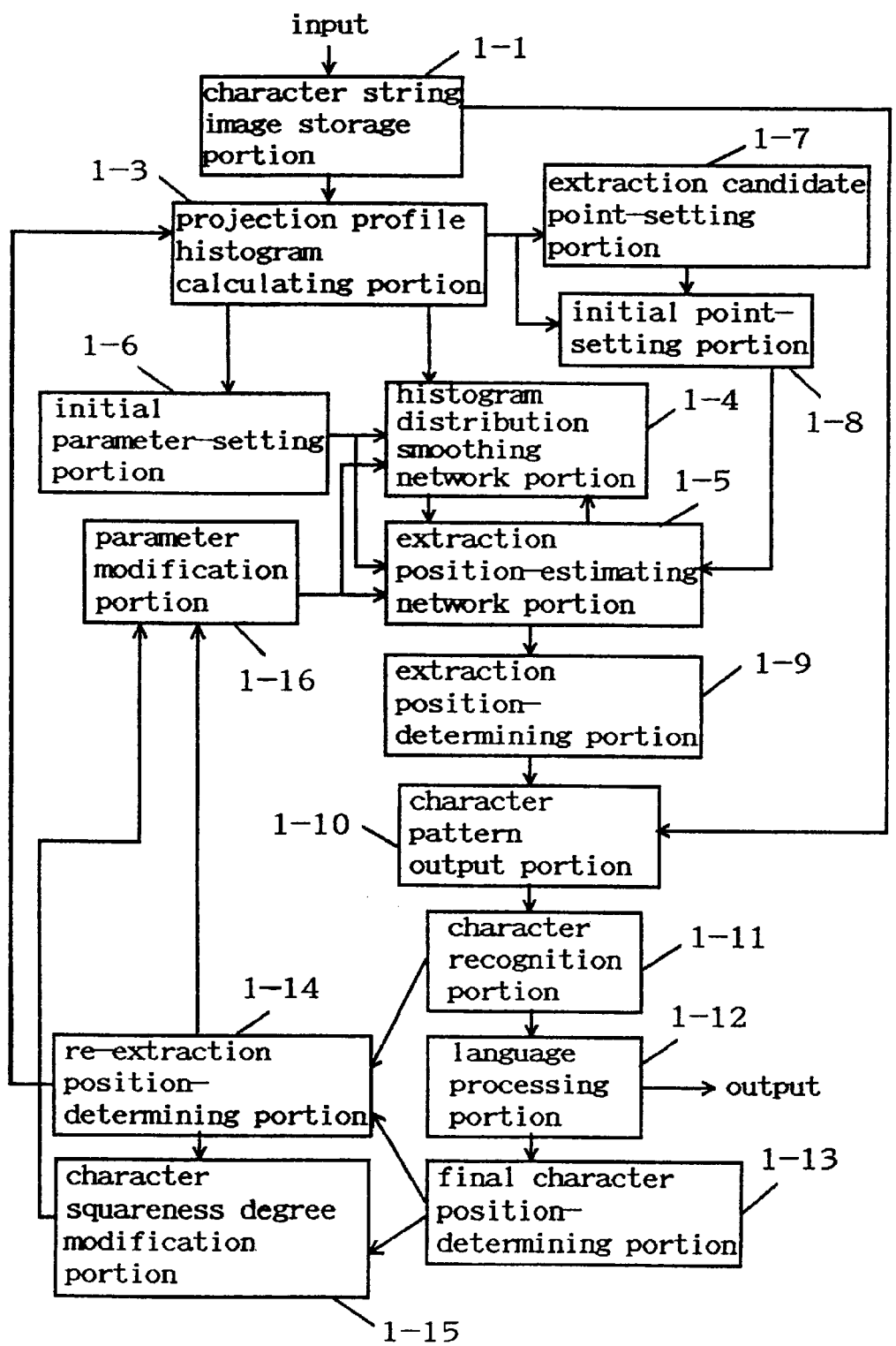
FIG. 1(*a*) is a block diagram of a character recognition machine according to the present invention.
FIG. 1(c) is a diagram of one of the concentration calculating units 1-21 shown in FIG. 1(b)
FIG. 1(d) is a diagram of one of the extraction position calculating units 1-22 shown in FIG. 1(b)
FIG. 1(e) is a diagram of an initial parameter setting portion 1-6 shown in FIG. 1(a)
FIG. 1(f) is a diagram of a character squareness degree modifying portion 1-15 shown in FIG. 1(a)
FIG. 1(g) is a diagram of an initial value setting portion 1-9 shown in FIG. 1(a)

A character extraction portion according to the present invention is first described. An example of this character extraction portion is shown in FIG. 1(a) and comprises a character string image storage portion 1-1, a projection profile histogram calculating portion 1-3, a histogram distribution smoothing network portion 1-4, an extraction position estimating network portion 1-5, an initial parameter setting portion 1-6, an extraction candidate point setting portion 1-7, an initial point setting portion 1-8, an extraction position determining portion 1-9, a character pattern output portion 1-10, a character recognition portion 1-11, a language processing portion 1-12, a final character position determining portion 1-13, a re-extraction position determining portion 1-14, a character squareness degree modification portion 1-15, and a parameter modification portion 1-16.

The present example of the character extraction portion constructed as described above operates in the manner described now. The character string image storage portion 1-1 stores and holds a character string image read into the character extraction portion. The projection profile histogram calculating portion 1-3 counts the number of black pixels located on lines extending perpendicular to the direction of the input character string in the input character string image stored in the storage portion 1-1 and creates a projection profile histogram from the values obtained at every coordinate in the direction of the character string. The histogram is delivered to the histogram distribution smoothing network portion 1-4, the initial parameter setting portion 1-6, the extraction candidate point setting portion 1-7, and the initial point setting portion 1-8.

Figure 1B:
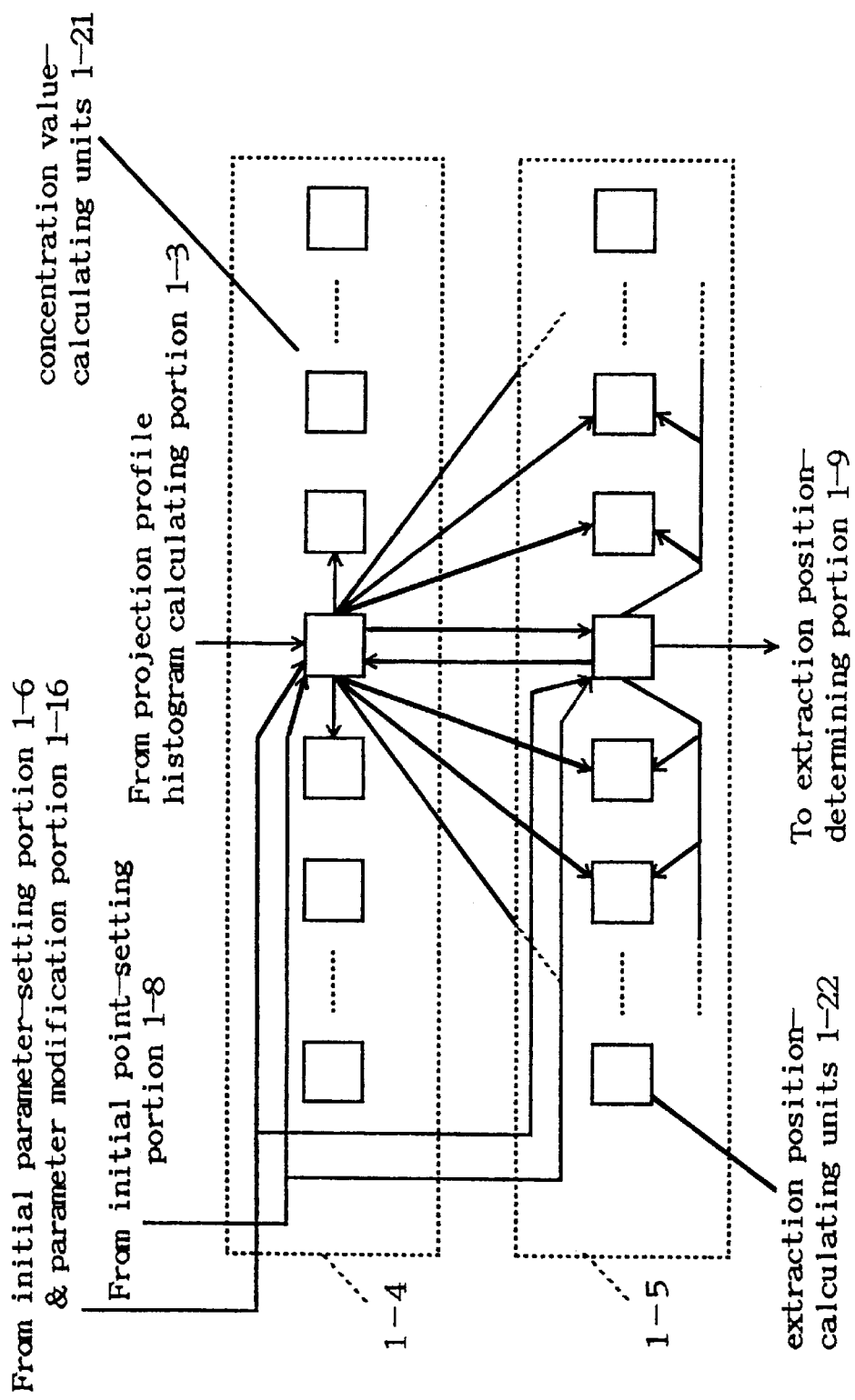

FIG. 1(b) particularly shows the structures of the histogram distribution smoothing network portion 1-4 and the extraction position estimating network portion 1-5. The network portion 1-4 has concentration value calculating units 1-21. The estimating network portion 1-5 has extraction position calculating units 1-22. For simplicity, the state of the output from only one calculating unit 1-21 and the state of the output from only one calculating unit 1-22 are shown.

As shown in FIG. 1(b), the concentration value calculating units 1-21 and the extraction position calculating units 1-22 are made to correspond to coordinates lying in the direction of the character string. The output from the projection profile histogram calculating portion 1-3 is an initial input applied to corresponding ones of the concentration value calculating units 1-21.

The output from each concentration value calculating unit 1-21 and the output from each extraction position calculating unit 1-22 are applied to other concentration value calculating units 1-21 and other extraction position calculating units 1-22 and feed back to themselves. The outputs from the extraction position calculating units 1-22 are applied to the extraction position determining portion 1-9.

To illustrate the operation of each concentration value calculating unit 1-21 and each extraction position calculating unit 1-22, the principle of processing for extracting characters according to the present invention is first described.

Generally, it is assumed that the following conditions hold as knowledge about the positions at which characters are extracted, based on a projection profile histogram.

(1) It is highly likely that each extraction position exists at a location at which projection profile histogram has a small value, and the histogram distribution shows a downwardly convex steep curve.

(2) Extraction positions are distributed in a constant range width.

(3) The number of extracted characters is limited by the height of the character string.

Functions which assume their minimum values where these conditions are satisfied are given by Eqs. (1-2), (1-3), and (1-4), respectively.

For the sake of illustration, let F(i) be the output value from the i-th concentration value calculating unit 1-21 on coordinates located on lines extending in the direction of the character string. Let L(i) be the output value from the i-th extraction position calculating units 1-22. It is assumed that as the possibility of a character extraction position increases, the value of L(i) approaches 1. As the possibility decreases, the value approaches 0.

$$Ea = \sum_i \left\{ (1-L(i)) \cdot \sum_k^{Na} (A - F(i \pm k)) \cdot \sum_k^{Nf} (F(i \pm k) - 2k \cdot F(i)) \right\} \quad (1\text{-}2)$$

$$Ei = \sum_i L(i) \sum_k^{Ni} C(k) \cdot L(i \pm k) \quad (1\text{-}3)$$

$$En = \left( \sum_i L(i) - Nn \right)^2 \quad (1\text{-}4)$$

The meaning of each parameter in the functions is now described.

A of Eq. (1-2) indicates the degree of approximation of the value of L(i) to 1 when the value of F(i) is small.

Na of Eq. (1-2) indicates a range of projection profile histogram values distributed around the i-th value which should be taken into account when small degrees are calculated.

Nf of Eq. (1-2) indicates a range of projection profile histogram values distributed around the i-th value which should be taken into account when the ratio of the downwardly convex portion is calculated.

The function of Eq. (1-3) is a monotonously decreasing function assuming a positive value. This indicates that the possibility of the existence of two adjacent extraction positions decreases as the distance between them decreases. The value of function C indicates the ratio.

Ni of Eq. (1-3) indicates a range which is distributed around i-th value and should take the assumption given by function C into account.

Nn of Eq. (1-4) indicates the maximum number of extraction positions. This maximum number is determined by the length of the character string and by the heights of characters.

The values of these parameters are determined by the initial parameter setting portion 1-6 according to the output from the projection profile histogram calculating portion 1-3. This determination will be described later in connection with the operation of the initial parameter setting portion 1-6.

The determination of the positions at which characters are extracted is accomplished by minimizing a function that is a linear sum of the functions described above. Since the range of values assumed by L(i) is restricted from 0 to 1, functions given by Eqs. 1-5 and 1-6 are added according to the invention.

$$Ev = \sum_i L(i)(1 - L(i)) \quad (1\text{-}5)$$

$$Eg = \sum_i \int S^{-1}(L(i)) d L(i) \quad (1\text{-}6)$$

Function S of Eq. (1-6) satisfies Eq. (1-7), and m(i) is the sum of input values applied to the i-th extraction position calculating unit 1-22 from the concentration value calculating units 1-21 and from the extraction position calculating units 1-22.

$$L(i) = S(m(i)) = 1/\{1 + \exp(-2 \cdot \lambda \cdot m(i))\} \quad (1\text{-}7)$$

where $\lambda$ has been previously set to an appropriate value.

In order to prevent the character string image from becoming blurred and to eliminate the effects of isolated point noises, it is necessary to make extraction processing proceed while smoothing the projection profile histogram. Using the functions described above, this can be given by $$Ef = \sum_i (F(i+1) - F(i))^2 \quad (1\text{-}8)$$

The principle of minimization of these functions is described now. It is now assumed that a function E(x) has a variable that can be differentiated. If an increment $\Delta x$ of the variable x infinitely approaches zero, Eq. (1-9) holds.

$$(E(\Delta x + x) - E(x))/\Delta x = \partial E(x)/\partial x \quad (1\text{-}9)$$

If it is assumed that Eq. (1-10) holds, then Eq. (1-11) holds.

$$\Delta x = -\epsilon \partial E(x)/\partial x \quad (1\text{-}10)$$

$$E(\Delta x + x) - E(x) = -\Theta(\partial E(x)/\partial x)^2 \leq 0 \quad (1\text{-}11)$$

where E is a sufficiently small positive number.

As can be seen from Eq. (1-11), variable x which minimizes E(x) can be found by varying the variable x according to Eq. (1-10). The same principle applies where the variable x is a vector. Obviously, it can be varied completely independently for each dimension of the vector.

The concentration value calculating units 1-21 minimize the function of Eq. (1-12) on this principle to smooth the projection profile histogram independently for each coordinate in the direction of the character string. Similarly, the extraction position calculating units 1-22 minimize the function of Eq. (1-13) to estimate character extraction positions independently for each coordinate in the character string direction. Coefficients included in Eqs. (1-12) and (1-13) indicate ratios of the functions which should be taken into consideration and have been previously set to appropriate values.

$$E1 = Ea + Cf \cdot Ef \qquad (1\text{-}12)$$

$$E2 = Ea + Ci \cdot Ei + Cn \cdot En + Cv \cdot Ev + Cg \cdot Eg \qquad (1\text{-}13)$$

As can be seen also from Eqs. (1-2), (1-3), and (1-4), where these functions are minimized, the output from each one extraction position calculating unit 1-22 is determined by interaction with the concentration value calculating units 1-21 and also with other extraction position calculating units 1-22. Therefore, extraction positions which are regarded as optimal when the whole character string is considered can be estimated. Hence, character extraction can be performed by parallel processing which is insusceptible to variations in the interval between characters, noises, and blur.

The operation of the concentration value calculating units 1-21 and the extraction position calculating units 1-22 is described next in detail by referring to FIG. 1(c).

Figure 1C:
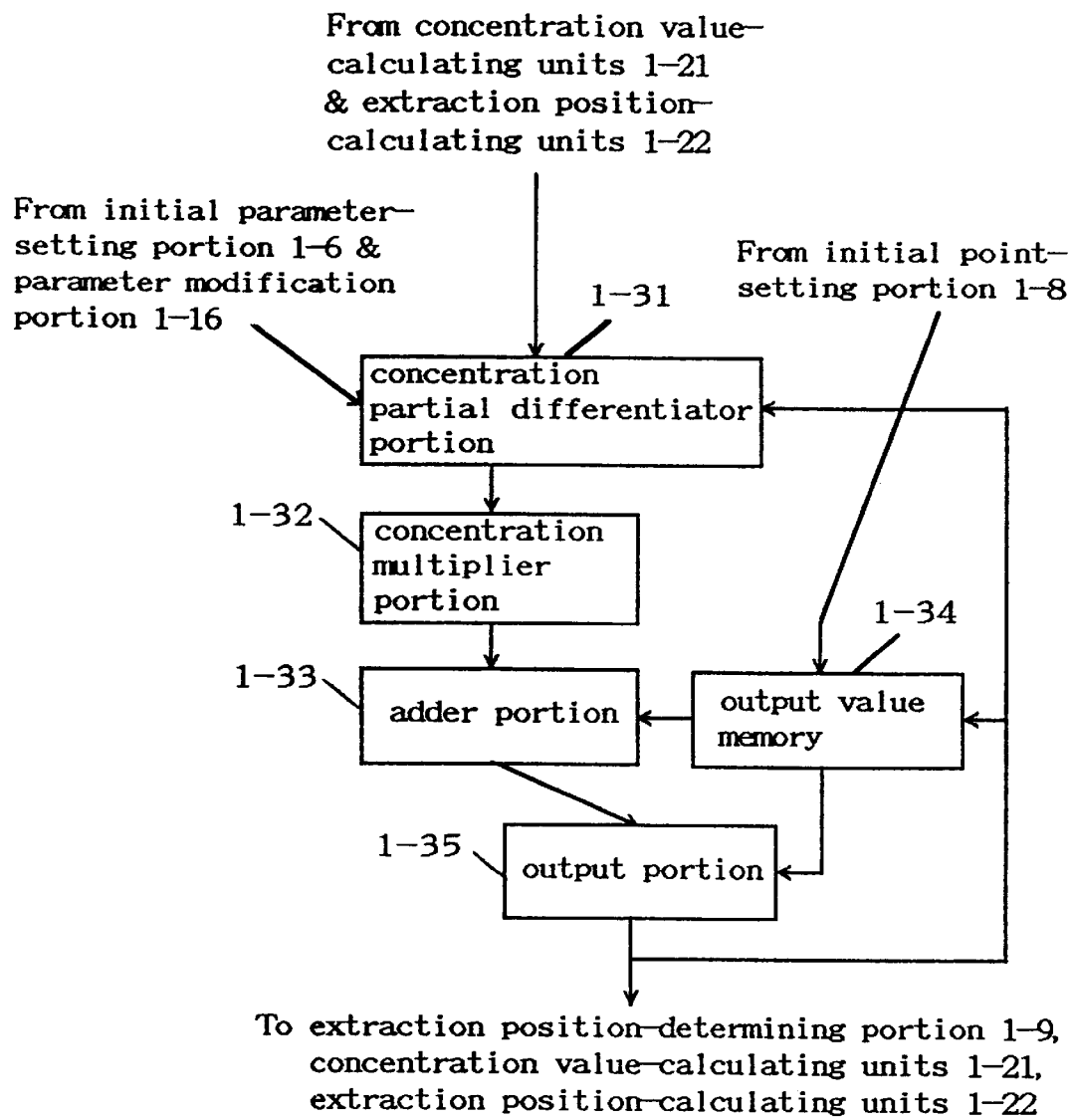

FIG. 1(c) particularly shows the structure of each concentration value calculating unit 1-21. The unit comprises a concentration partial differentiator portion 1-31, a concentration multiplier portion 1-32, an adder portion 1-33, an output value memory 1-34, and an output portion 1-35.

For the sake of illustration, the operation of the i-th concentration value calculating unit 1-21 located on some of the coordinates arrayed in the direction of the character string is described. At the beginning of processing, the contents of the output value memory are initialized at the input value applied from the projection profile histogram calculator portion 1-3. Then, the contents of the memory are updated according to the output value from the adder portion 1-33 at every instant of time.

The concentration partial differentiator portion 1-31 produces dF(i) to the concentration multiplier portion 1-32 according to input values from the initial point setting portion 1-8, the parameter modification portion 1-16, the concentration value calculating units 1-21, and the extraction position calculating units 1-22, the dF(i) being given by Eq. (1-14).

$$dF(i) = \partial E1 / \partial F(i) \qquad (1\text{-}14)$$

The concentration multiplier portion 1-32 multiplies the input value from the concentration partial differentiator portion 1-31 by a sufficiently small positive value $\epsilon f$ and delivers the resulting product to the adder portion 1-33.

The adder portion 1-33 receives input signals from the concentration multiplier portion 1-32 and the output portion 1-35, calculates the sum of these input values, sends a trigger signal to the output portion 1-35. If the adder portion 1-33 subsequently receives a trigger signal from the output portion 1-35, the adder portion updates the contents of the output value memory 1-34.

On receiving the trigger signal from the adder portion 1-33, the output portion 1-35 reads out the contents of the output value memory 1-34, sends the contents to the concentration calculating units 1-21, and furnishes a trigger signal to the adder portion 1-33.

Figure 1D:
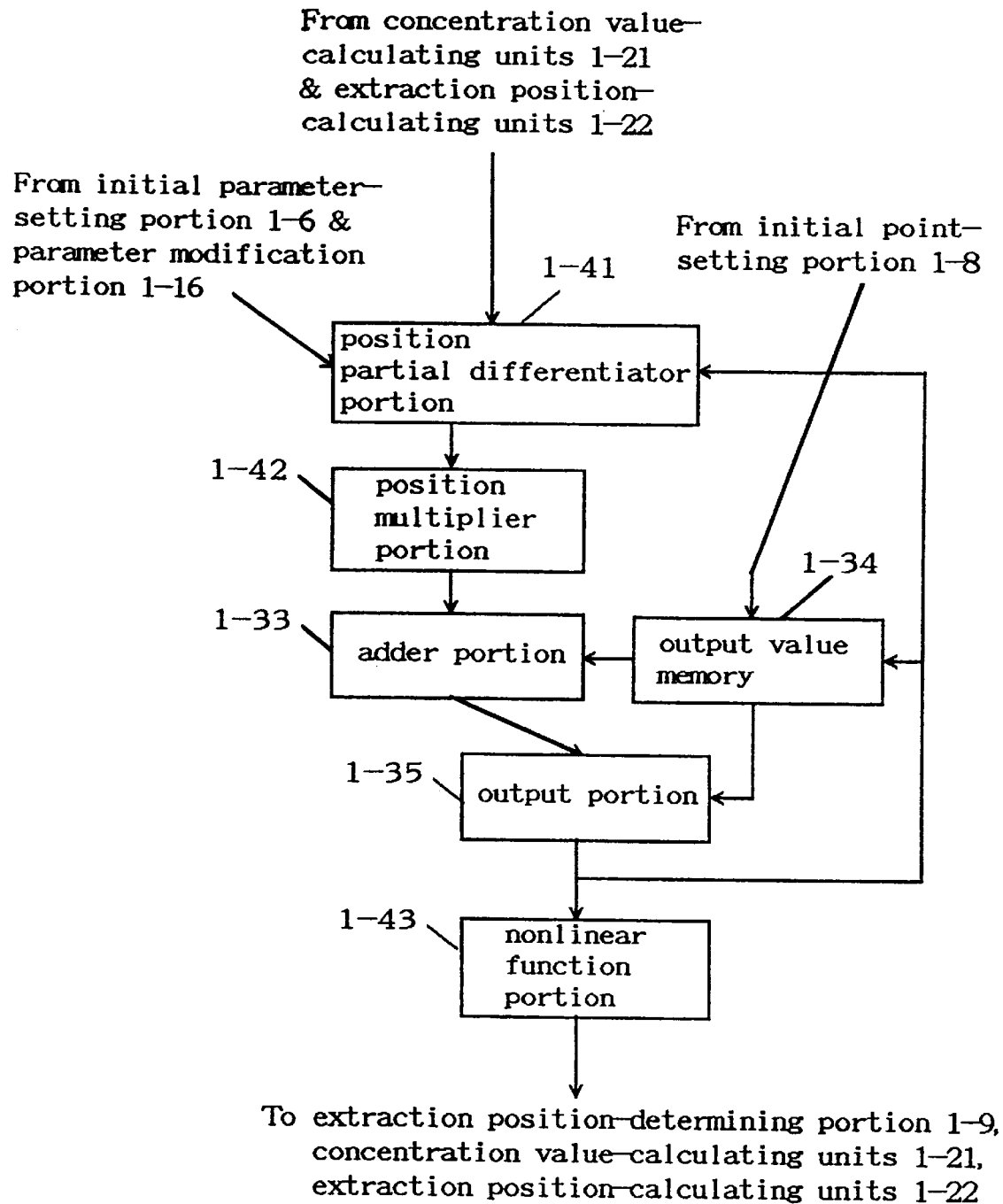

FIG. 1(d) particularly shows the structure of each extraction position calculating unit 1-22. The unit comprises a position partial differentiator portion 1-41, a position multiplier portion 1-42, a nonlinear function portion 1-43, an adder portion 1-33, an output value memory 1-34, and an output portion 1-35.

For the sake of illustration, the operation of the i-th extraction position calculating unit 1-22 located on some of the coordinates arrayed in the direction of the character string is described.

At the beginning of processing, the contents of the output value memory 1-34 are initialized by the initial value setting portion 1-8 according to the output from the projection profile histogram calculator portion. This will be described later in connection with operation of the initial value setting portion 1-8. Then, the contents of the memory are updated according to the output value from the adder portion 1-33 at every instant of time.

The position partial differentiator portion 1-41 produces dm(i) given by Eq. (1-15) to the position multiplier portion 1-42 according to input values applied from the initial parameter setting portion 1-6, the concentration calculating units 1-21, and the extraction position calculating units 1-22.

$$dm(i) = \partial E2 / \partial L(i) \qquad (1\text{-}15)$$

The position multiplier portion 1-42 multiplies the input value from the position partial differentiator portion 1-41 by a sufficiently small positive value $\epsilon 1$ and delivers the resulting product to the adder portion 1-33.

The adder portion 1-33 receives inputs from the position multiplier portion 1-42 and from the output portion 1-35, calculates the sum of these input values, and sends a trigger signal to the output portion 1-35. On subsequently receiving a trigger signal from the output portion 1-35, the adder portion 1-33 updates the contents of the output value memory 1-34.

On receiving the trigger signal from the adder portion 1-33, the output portion 1-35 reads out the contents of the output value memory 1-34, sends the contents to the nonlinear function portion 1-43, and supplies a trigger signal to the adder portion 1-33.

The nonlinear function portion 1-43 transforms its input value into a corresponding value in terms of the nonlinear function S given by Eq. (1-7) and sends the transformed value to the extraction position calculating units 1-22.

The processing described thus far is repeated to thereby achieve estimation of extraction positions, using the aforementioned minimization of the functions.

Figure 1E:
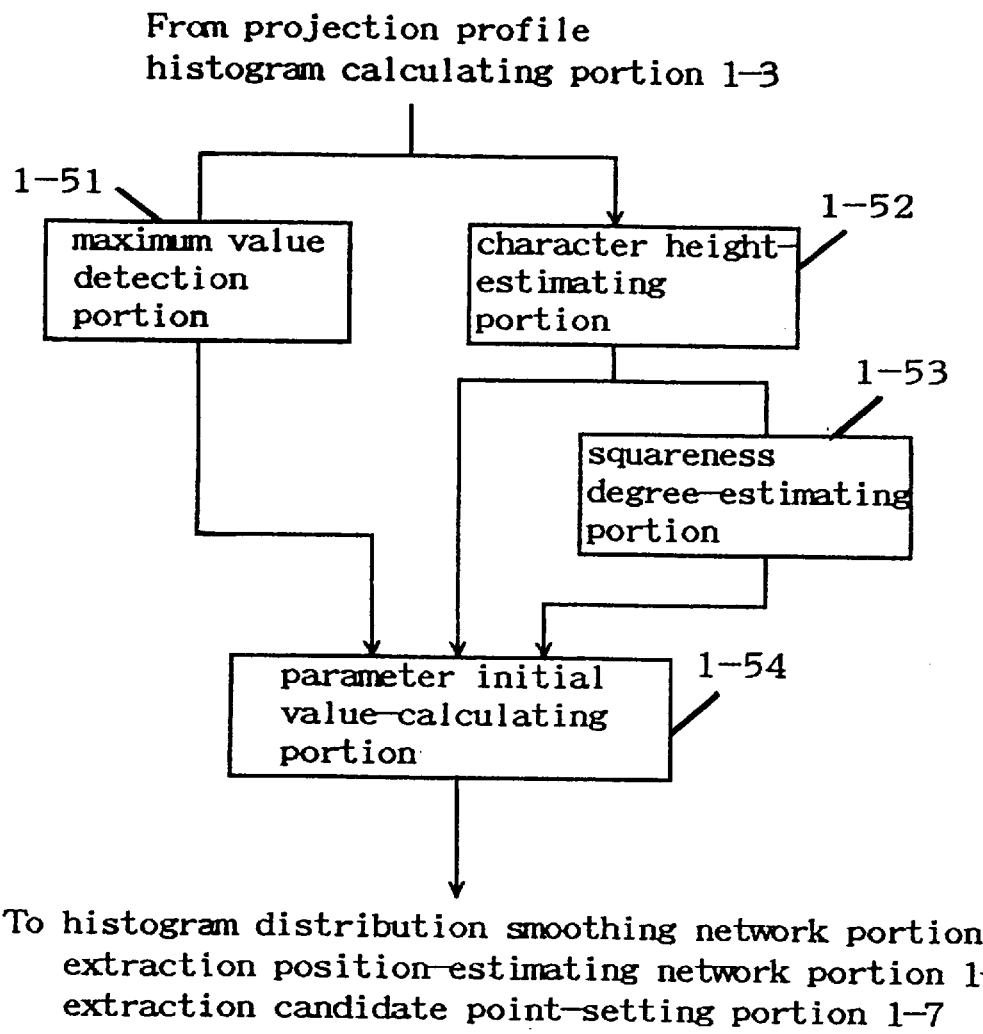
Figure 1F:
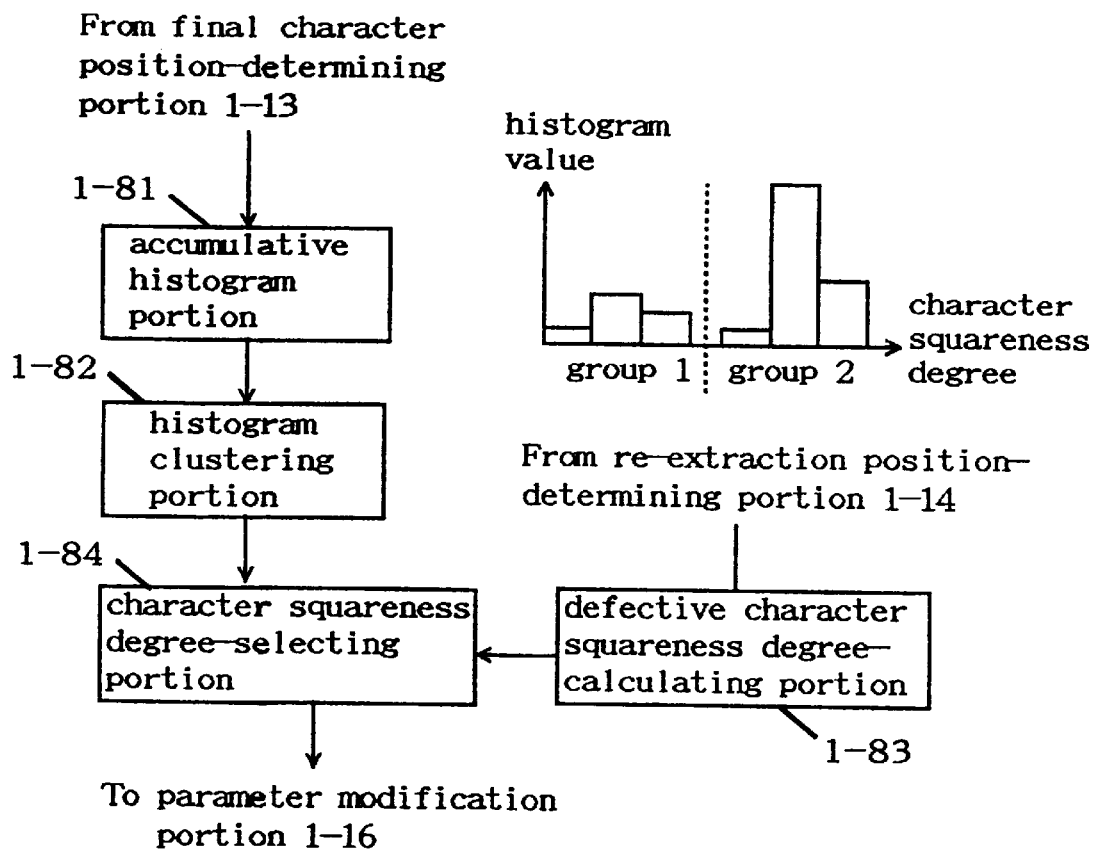
Figure 1G:
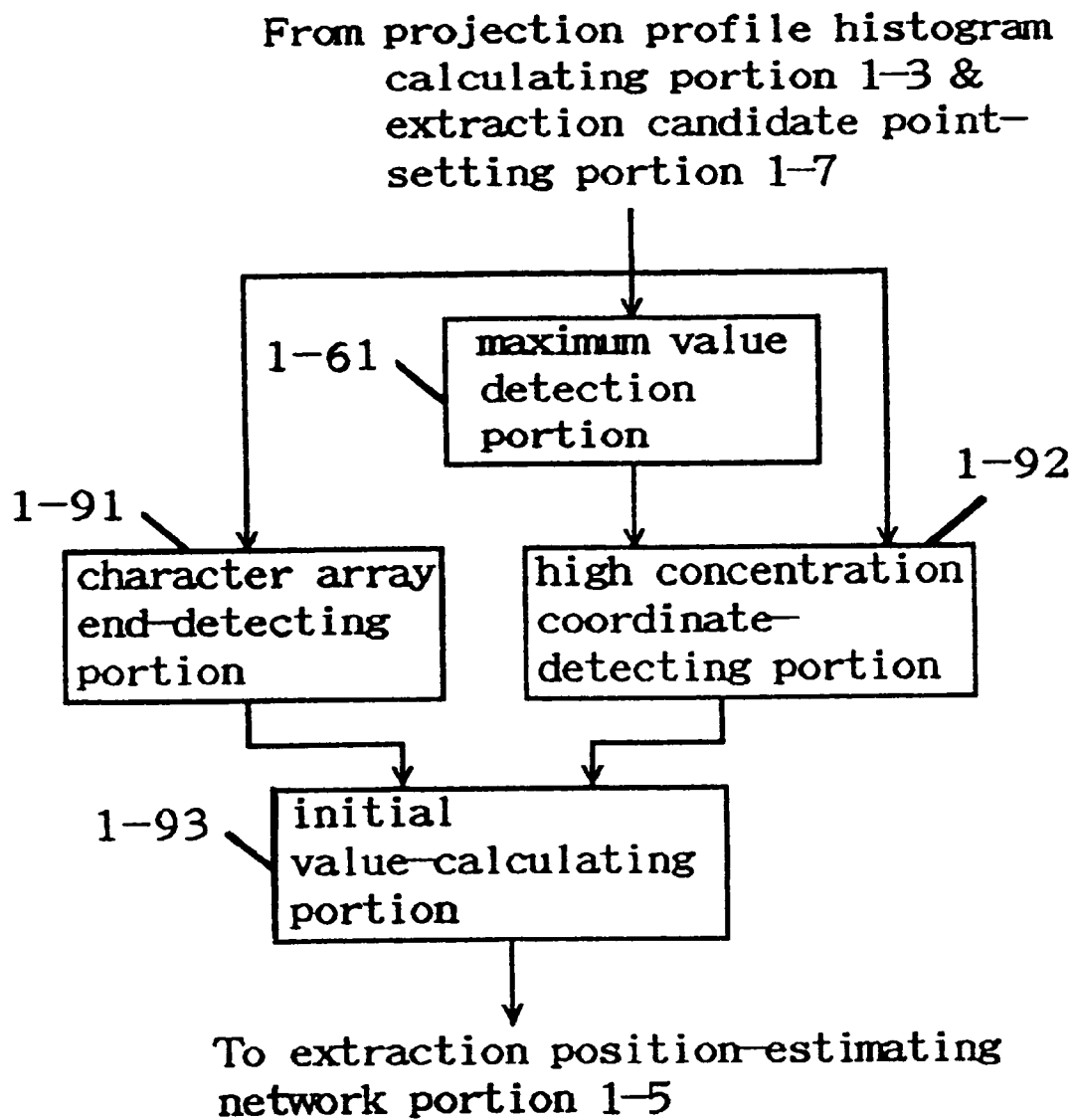

The operation of the initial parameter setting portion 1-6 is next described by referring to FIG. 1(e).

FIG. 1(e) particularly shows the structure of the initial parameter setting portion 1-6. This portion comprises a maximum value detection portion 1-51, a character height estimating portion 1-52, a squareness degree estimating portion 1-53, and a parameter initial value calculating portion 1-54.

The initial parameter setting portion 1-6 establishes parameters A, Na, Nf, Ni, C(x), Nn, Cf, Ci, Cn, Cv, and Cg included in Eqs. (1-2), (1-3), (1-4), (1-12), and (1-13). Initial values of these parameters are found in the manner described now.

The maximum value detection portion 1-51 receives an input from the projection profile histogram calculating portion 1-3, detects a maximum value within each interval of the input value, and sends the detected value to the parameter initial value calculating portion 1-54. The character height estimating portion 1-52 calculates the average value of the input value from the projection profile histogram calculating portion 1-3 within a given range based on the maximum value, in each regular interval in the direction of the character string, and sends the calculated average value as the character height in the interval to the parameter initial value calculating portion 1-54.

The squareness degree estimating portion 1-53 divides the average value of lengths of those portions of the input values from the projection profile histogram calculating portion 1-3 which are greater than a given value by the input value from the character height estimating portion 1-52, and sends the resulting quotient as the degree of squareness of the character to the parameter initial value calculating portion 1-54.

The "average value of lengths of those portions of the input values from the projection profile histogram calculating portion 1-3 which are greater than a given value" can be replaced by "the length of the portion giving rise to the greatest histogram of the lengths of those portions of the input values from the projection profile histogram calculating portion 1-3 which are greater than a given value".

Let M be an input value from the maximum value detection portion 1-51. Let T be an input value from the character height estimating portion 1-52. Let H be the input value from the squareness degree estimating portion 1-53. Let D be the length of a certain interval in the direction of a character string.

The parameter initial value calculating portion 1-54 determines the values of the parameters A, Nf, Ni, Nn and of function C as described below for each regular interval in the direction of the character string.

The parameter A is determined according to Eq. (1-16) and based on M that is the maximum value of F(i) so that the processing may not be affected by the range of values of F(i).

$$A = (1+\beta) \cdot M \qquad (1\text{-}16)$$

where $\beta$ is a positive number and has been previously set to an appropriate value.

The maximum range of values of Na corresponds to one character. The values are determined according to Eq. (1-17) and based on the estimated character height T.

$$Na = \gamma 1 \cdot T \qquad (1\text{-}17)$$

where $\gamma 1$ is a positive value less than 1 and has been previously set to an appropriate value.

Similarly, the maximum range of values of Nf corresponds to one character. The values are determined according to Eq. (1-18) and based on the estimated character height T.

$$Nf = \gamma 2 \cdot T \qquad (1\text{-}18)$$

where $\gamma 2$ is a positive value less than 1 and has been previously set to an appropriate value.

If the degree of squareness of characters contained in the interval is small, then it is necessary to set the value of Ni to a small value. The value of Ni is determined according to Eq. (1-19) and based on the estimated character squareness degree H and on the character height T.

$$Ni = I(H) \cdot T \qquad (1\text{-}19)$$

where function I is a monotonously increasing function and assumes values within a range from 0 to 1.

The value of Nn depends on the number of characters contained in the interval, and is determined from the ratio of the length of the interval to the character width according to Eq. (1-20).

$$Nn = \delta \cdot D/(H \cdot T) \qquad (1\text{-}20)$$

where $\delta$ is a positive value and has been previously set to an appropriate value.

Function C(x) is 0 when x=Ni and assumes its maximum value when x=1. Because of the meaning of the function, the value of the function is determined according to Eq. (1-21) and based on the value of A.

$$C(x) = \theta \cdot A \cdot (Ni - x) \qquad (1\text{-}21)$$

where $x \neq 0$, and $\theta$ is a positive value and has been previously set to an appropriate value.

The parameter initial value calculating portion 1-54 produces the initial values of the parameters found in this way to the histogram distribution smoothing network portion 1-4 and to the extraction position estimating network 1-5 while taking these initial values as outputs from the initial parameter setting portion 1-6.

As described thus far, the initial parameter setting portion 1-6 determines the parameters in each interval and delivers these parameters to the corresponding concentration calculating unit 1-21 in the histogram distribution smoothing network portion 1-4 and to the corresponding extraction position calculating unit 1-22 in the extraction position estimating network portion 1-5.

After a given period, the extraction position determining portion 1-9 takes the coordinate corresponding to the extraction position calculating unit 1-22 having a value larger than a given value as a character extraction position and sends it to the character pattern output portion 1-10. The former value of the extraction position calculating unit 1-22 is contained in output values from the extraction position calculating units 1-22 inside the extraction position estimating network 1-5 corresponding to coordinates arrayed in the direction of the character string. This given value has been previously set to a value close to 1.

The character pattern output portion 1-10 receives an input from the extraction position determining portion 1-9, reads an image located between adjacent ones of applied extraction positions from the character string image storage portion 1-1, and delivers such images successively as character patterns.

The character recognition portion 1-11 calculates a value for evaluating the degree of approximation of each input character pattern to any character category and sends the value to the language processing portion 1-12. Alternatively, the character recognition portion 1-11 makes a decision as to whether each character pattern has been extracted correctly, based on the value used for evaluation. If the result of the decision is that the pattern has been extracted incorrectly, then the position of this character pattern is produced to the re-extraction position determining portion 1-14. The structure and the operation of the character recognition portion 1-11 are described later in detail.

The language processing portion 1-12 selects a correct character category from combinations of candidate character categories applied from the character recognition portion 1-11, using the value used for evaluation and vocabular and grammatical knowledge. If the result of the decision is that a character has been extracted incorrectly, then information about the position of this portion is delivered. The structure and the operation of the language processing portion 1-12 are described later.

The final character position determining portion 1-13 sends information about character extraction positions regarded as correct to the character squareness degree modification portion 1-15, said character extraction positions being contained in positional information supplied from the language processing portion 1-12. Information about character extraction positions regarded as incorrect is sent to the re-extraction position determining portion 1-14.

The re-extraction position determining portion 1-14 supplies positional information as re-extraction positions (at which estimation of character positions should be performed again) to the projection profile histogram calculating portion 1-3, the character squareness degree modification portion 1-15, and the parameter modification portion 1-16, the positional information being supplied from the character recognition portion 1-11 or from the final character position determining portion 1-13.

The projection profile histogram calculating portion 1-3 supplies the value of a projection profile histogram at a re-extracted position to the histogram distribution smoothing network portion 1-4. Then, the histogram distribution smoothing network portion 1-4 and the extraction position estimating network portion 1-5 again perform estimation of character positions at re-extraction positions, using processing parameters newly established by the character squareness degree modification portion 1-15 and the parameter modification portion 1-16 in the manner described below.

First, the operation of the squareness degree modification portion 1-15 is described. FIG. 1(*f*) shows the structure of the squareness degree modification portion 1-15, which comprises an accumulative histogram portion 1-81, a histogram clustering portion 1-82, a defective character squareness degree calculating portion 1-83, and a character squareness degree selecting portion 1-84.

The accumulative histogram portion 1-81 finds the degrees of squareness of those characters which are contained in a clause regarded as correct by the final character position determining portion 1-13, finds its accumulative histogram, and produces the result to the histogram clustering portion 1-82. As shown in FIG. 1(*f*), the histogram clustering portion 1-82 forms groups from peaks of the histogram found by the accumulative histogram portion 1-81, and sends the peak value of each group to the character squareness degree selecting portion 1-84.

The defective character squareness degree calculating portion 1-83 calculates the degree of squareness of each character inside the clause located at the re-extraction position applied from the re-extraction position determining portion 1-14 and supplies the calculated degree to the character squareness degree selecting portion 1-84.

The character squareness degree selecting portion 1-84 delivers those of the input values from the histogram clustering portion 1-82 to the parameter modification portion 1-16 which exclude input values that can be regarded as substantially the same as the input values from the defective character squareness degree calculating portion 1-83.

In this way, the squareness degree modification portion 1-15 can estimate degrees of squareness of characters which might be correct. Based on these estimated degrees of squareness, character positions of portions which are regarded as having been incorrectly estimated are again estimated.

The parameter modification portion 1-16 modifies the processing parameters $N_i$, $N_n$, and the function C determined by Eqs. (1-19), (1-20), and (1-21), according to character squareness degrees which are applied from the squareness degree modification portion 1-15 and can be correct. The modified parameters and function are produced to the histogram distribution smoothing network portion 1-4 and to the extraction position estimating network portion 1-5.

As described previously, extraction positions are found by the extraction position determining portion 1-9. At this time, if the degrees of squareness applied from the squareness degree modification portion 1-15 are plural in number, a plurality of processing parameters are set. For each of the parameters, the character position is estimated. Again, a combination of clauses which maximizes the average of a clause-evaluating value is found by the character recognition portion 1-11 and the language processing portion 1-12. The final character position determining portion 1-13 produces character positions inside the clause as final extraction positions to the character pattern output portion 1-10.

The operation of the extraction candidate point setting portion 1-7 and the initial value setting portion 1-8 is described now. On receiving inputs from the projection profile histogram calculating portion 1-3 and from the initial parameter setting portion 1-6, the extraction candidate point setting portion 1-7 produces the coordinate of the middle-point of an interval satisfying the following requirements as an extraction candidate point to the initial value setting portion 1-8: (1) The projection profile histogram value is less than a predetermined threshold value; and (2) At the threshold value, the distance between successive extraction candidate points is less than the character height T multiplied by a given factor. The initial parameter setting portion 1-6 applies the character height T to the extraction candidate point setting portion 1-7.

The initial value setting portion 1-8 classifies according to input values from the projection profile histogram calculating portion 1-3 the coordinates of extraction candidate points applied from the extraction candidate point setting portion 1-7 into three kinds of coordinates: (1) coordinates which are undoubtedly extraction positions; (2) coordinates which are less likely to be extraction positions; and (3) other coordinates. For each of these three cases, the contents of the output value memory 1-34 inside each extraction position calculating unit 1-22 are initialized.

FIG. 1(*g*) particularly shows the structure of the initial value setting portion 1-8, which comprises a character string end detecting portion 1-91, a high concentration coordinate detecting portion 1-92, an initial value calculating portion 1-93, and a maximum value detecting portion 1-61.

The character string end detecting portion 1-91 takes an input corresponding to the coordinates arrayed in the direction of the character string from the projection profile histogram calculating portion 1-3 which is greater than a given value but is smallest of these inputs as a character string starting point. The end detection portion 1-91 takes an input which is greater than the given value and is greatest of these inputs as a character string end point. The end detecting portion 1-91 furnishes information about these points to the initial value calculating portion 1-93.

The maximum value detecting portion 1-61 receives the input from the projection profile histogram calculating portion 1-3, detects the maximum value of the input value in each interval, and sends the detected value to the high concentration coordinate detecting portion 1-92.

The high concentration coordinate detecting portion 1-92 delivers to the initial value calculating portion 1-93 those coordinates given by the inputs from the projection profile histogram calculating portion 1-3 which have values greater than values determined by the input values from the maximum value detecting portion 1-61.

The initial value calculating portion 1-93 initializes the contents of the output value memory 1-34 inside the extraction position calculating unit 1-22 at L1, the unit 1-22 corresponding to the input value from the character string end detecting portion 1-91. The calculating portion 1-93 initializes the contents of the output value memory 1-34 inside the extraction position calculating unit 1-22 at L2, the unit 1-22 corresponding to the input value from the high concentration coordinate detecting portion 1-92. The calculating portion 1-93 initializes the contents of the other output value memories 1-34 at L3. L1, L2, and L3 satisfy Relation (1-23).

$$L1 > L3 > L2 \qquad (1\text{-}23)$$

It is to be noted that the contents of the output value memories 1-34 corresponding to coordinates other than the extraction candidate points are zero.

In this way, a minimum value close to 0 is assigned as an initial value to coordinates which undoubtedly are not extraction positions. A large value close to 1 is assigned as an initial value to coordinates which are originally highly likely to be extraction positions. As a result, correct extraction positions can be estimated at a higher speed and more correctly than in the case in which the same value is assigned to every coordinate as an initial value.

As described thus far, in the present example, the histogram distribution smoothing network portion 1-4 smoothes the projective histogram distribution. Simultaneously, the extraction position estimating network portion 1-5 estimates character extraction positions while referring to the results of the smoothing operation. In this way, extraction positions which are optimal for the whole character string can be found. Hence, character extraction processing insusceptible to variations in the interval between characters, noises, and blur can be performed. Furthermore, the processing can be carried out at a high speed by parallel processing.

The character recognition portion 1-11 cooperates with the language processing portion 1-12 to extract portions whose character positions are considered to have been estimated incorrectly. Processing parameters for the incorrectly estimated portions are optimized, using information about the degrees of squareness of portions whose character positions are correctly estimated. Again, character positions are estimated. Then, character positions which are estimated correctly in terms of language are taken as final character positions by the language processing portion 1-12. This improves the processing accuracy further.

In addition, both the extraction candidate point setting portion 1-7 and initial value setting portion 1-8 are provided so as to roughly reflect correct extraction positions. This permits the processing to be performed at a higher speed and at a higher accuracy.

FIG. 2(*a*) is a block diagram of a first example of the character recognition portion according to the present invention. In FIG. 2(*a*), feature extracting portions 2-12 extract different features used to detect character categories from character patterns extracted by a character extraction portion 2-11. Single feature recognizing portions 2-13 are identical in number with the feature extracting portions 2-12. The single feature recognizing portions 2-13 receive their respective feature vectors and find degrees of similarity of the character patterns to their respective character categories. A candidate character selecting portion 2-14 finds a plurality of candidate character categories for the above-described character patterns, using the degrees of similarity of the character patterns to the feature vectors, the degrees of similarity being derived by the single feature recognizing portions 2-13, respectively. A post-recognition processing portion 2-15 selects final candidate character categories from plural candidate character categories obtained from the candidate character selecting portion 2-14, using information about the sizes and positions of character patterns obtained by the character extraction portion, and delivers the final candidate character categories and their degrees of similarity as character-evaluating values to the language processing portion.

The candidate character selecting portion 2-14 has the same number of similarity degree normalizing portions 2-16 as the single feature recognizing portions 2-13. The candidate character selecting portion 2-14 transforms the degrees of similarity of character categories obtained from their respective feature recognizing portions 2-13 into normalized degrees of similarity. The candidate character selecting portion 2-14 further has first-order candidate character selecting portions 2-17 which are identical in number with the single feature extracting portions 2-13, in the same way as the similarity degree normalizing portions 2-16. The first-order candidate character selecting portions 2-17 select plural candidate character categories (hereinafter referred to as the first-order candidate character categories) from all character categories, using the normalized degrees of similarity obtained by their respective similarity degree normalizing portions 2-16, information about the sizes and positions of the character patterns derived by the character extraction portions 2-11, and information about reference sizes and reference positions of their respective character categories, the latter information being stored in a character information storage portion 2-50 (described later). A second-order candidate character selecting portion 2-18 selects plural candidate categories (hereinafter referred to as the second-order candidate categories) from all first-order candidate character categories, using the degrees of similarity of the first-order candidate character categories obtained by the first-order candidate character selecting portion 2-17, and informs the post-recognition processing portion 2-15 of the selected second-order candidate categories. The structure of the second-order candidate character selecting portion 2-18 is particularly shown in FIG. 2(*a*). The selecting portion 2-18 has adders 2-181 which accumulate the degrees of similarity of the first-plural first-order candidate character selecting portions 2-17 for their respective categories to find the integrated degree of similarity of each character category. A final candidate character selecting portion 2-182 selects plural second-order candidate character categories from the integrated degrees of similarity of the character categories.

The post-recognition processing portion 2-15 has a character information storage portion 2-50 in which information about the reference size and the reference position of character patterns for each character category are stored. The post-recognition processing portion 2-15 further includes a post-processed character set storage portion 2-51 in which combinations of character categories (a set of categories of characters post-processed) that are required to be processed after recognition are stored. A post-processed character set decision portion 2-52 takes any one character category of the set of categories of characters post-processed as an additional second-order candidate character category, using information about the reference sizes of the character categories corresponding to the set of categories of the post-processed characters stored in the character information storage portion 2-50 and information about the sizes and positions of the character patterns entered as information about reference positions. FIG. 2-1(b) is a block diagram of each single feature recognition portion 2-13. A single feature similarity degree calculating portion 2-25 calculates the degree of similarity of each character category for the above-described character patterns from the group assignment degree of the character category group selected by the group selecting portion 2-23 and from the inside group similarity degrees found by the subclassification portions 2-22.

The single feature similarity degree calculating portion 2-25 has multipliers 2-26 each of which multiplies the group assignment degree of the character category group selected by the group selecting portion 2-23 by the inside group similarity degree obtained from the subclassification portion 2-22 receiving the feature vector of the character pattern from the subclassification input signal selecting portion 2-24. A category similarity degree calculating portion 2-27 selects some of the larger output values from the multipliers 2-26 for each character category, and produces the sum of these output values.

Figure 2A:
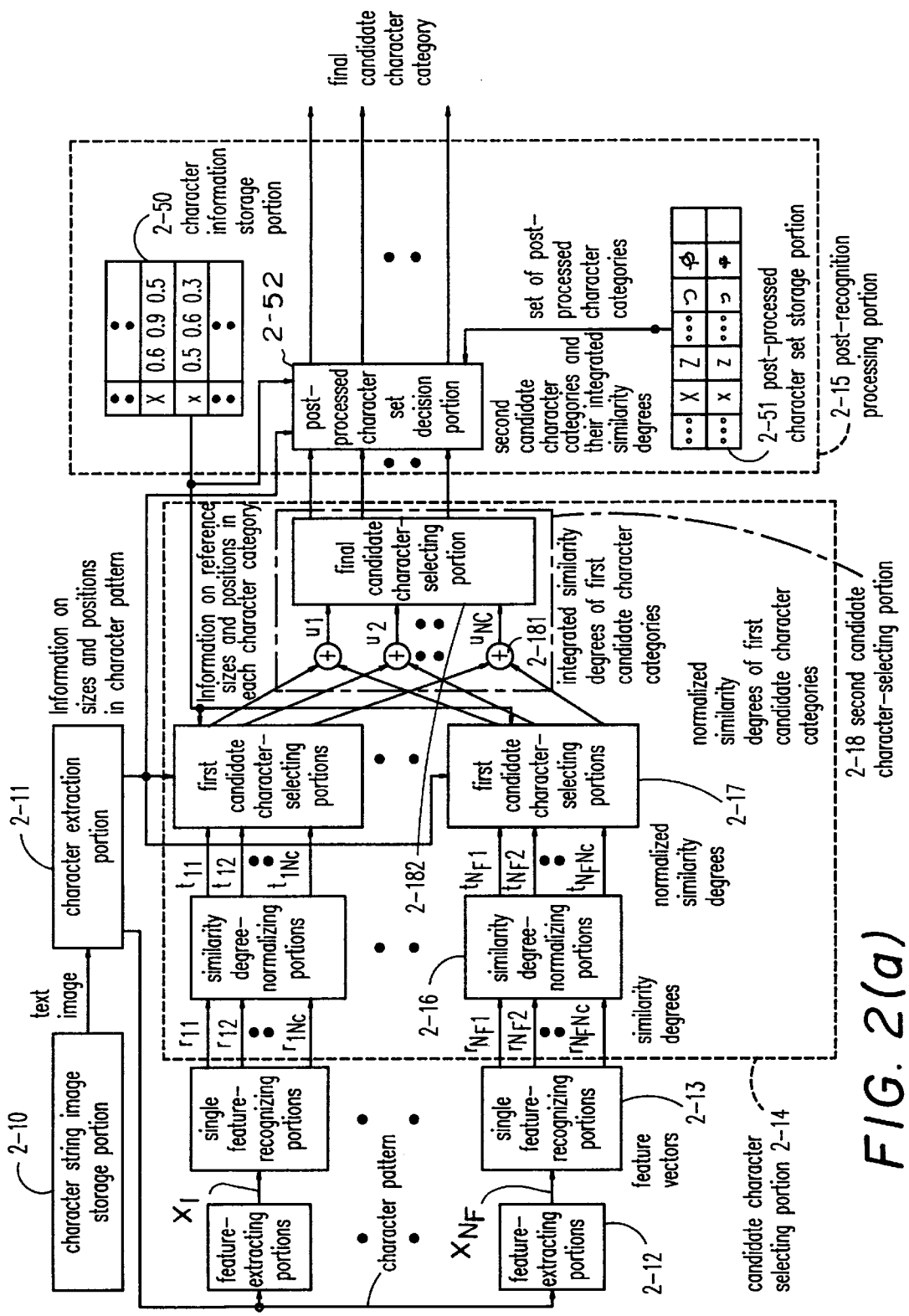
FIG. 2(a) is a block diagram of a first example of the character recognition portion according to the invention.
Figure 2B:
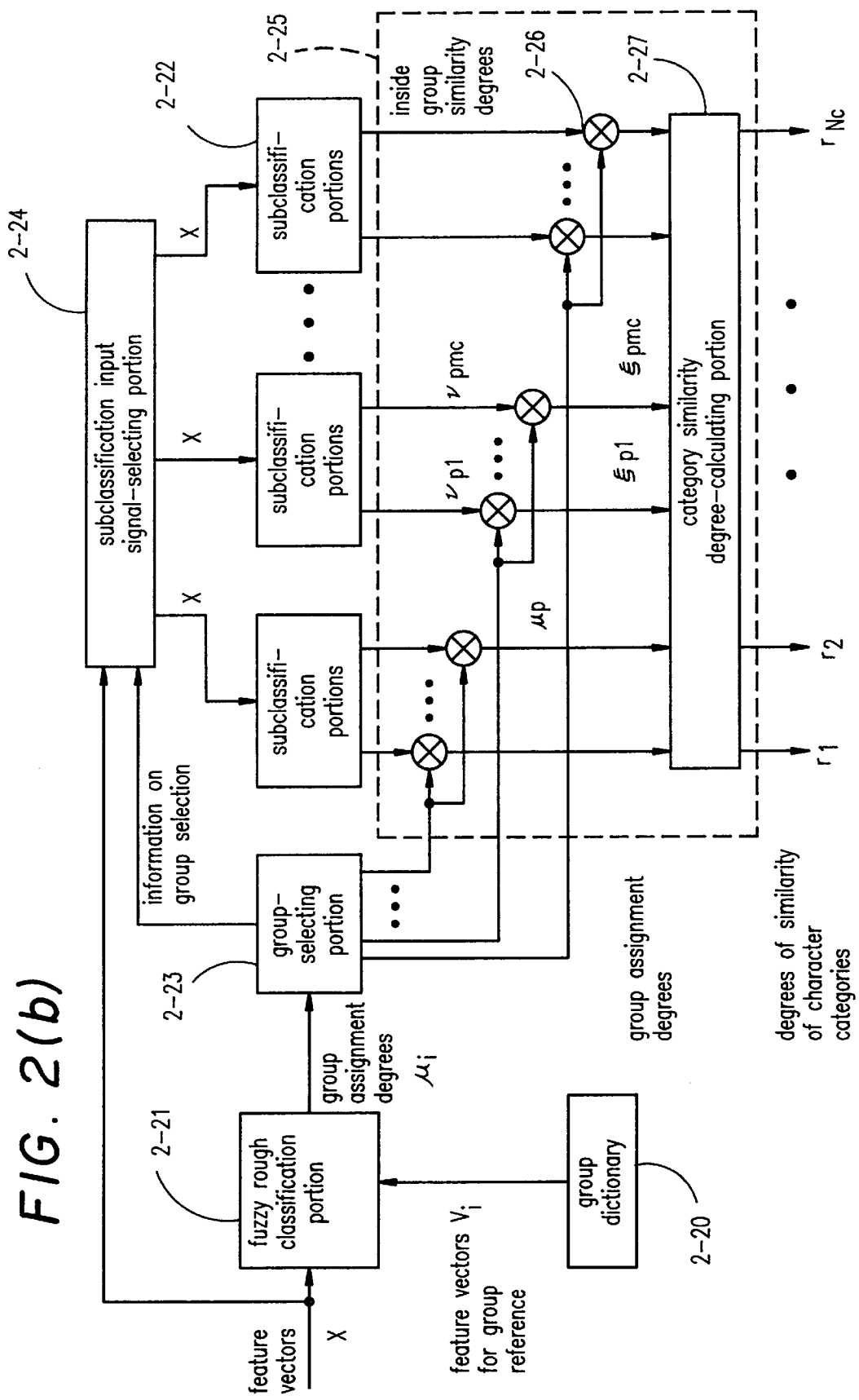
FIG. 2(b) is a block diagram of a single feature recognition portion of the first example of the character recognition portion according to the invention.
Figure 2C:
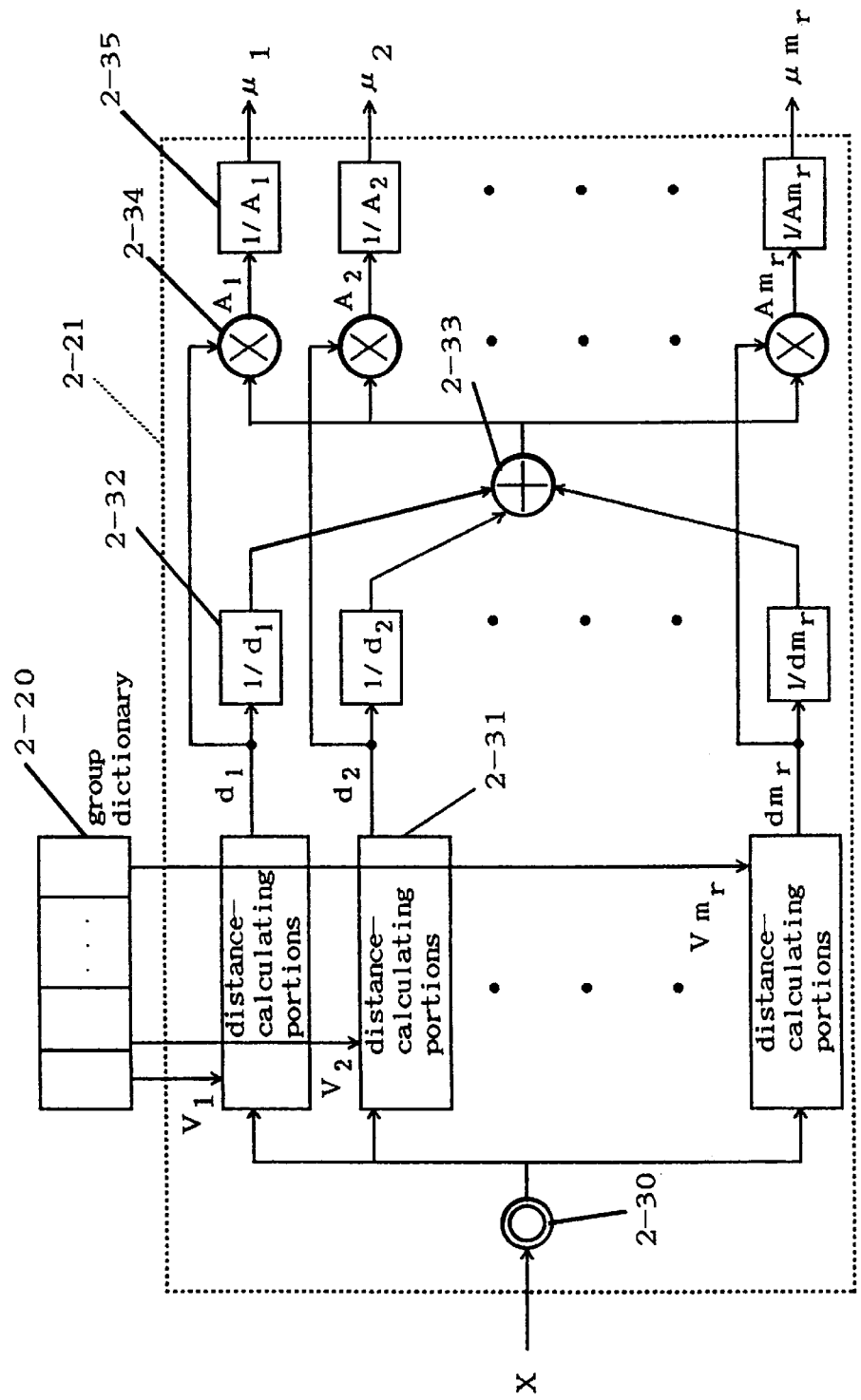
FIG. 2(c) is a block diagram of a fuzzy rough classification portion of the first example of the character recognition portion according to the invention.

FIG. 2(c) is a block diagram of the fuzzy rough classification portion 2-21, particularly showing its structure. This rough classification portion has an input portion 2-30 which receives feature vectors obtained from the feature extracting portions 2-12. Distance calculating portions 2-31 calculate the distances between all group reference feature vectors in the group dictionary 2-20 and the above-described feature vector, respectively. Dividers 2-32 calculate the inverses of the outputs from the distance calculating portions 2-31, respectively. An adder 2-33 produces the sum of the outputs from the dividers 2-32. Multipliers 2-34 produce the products of the output from the adder 2-33 and the outputs from the distance calculating portions 2-31, respectively. Dividers 2-35 calculate the inverses of the outputs from the multipliers 2-34, respectively.

Figure 2D:
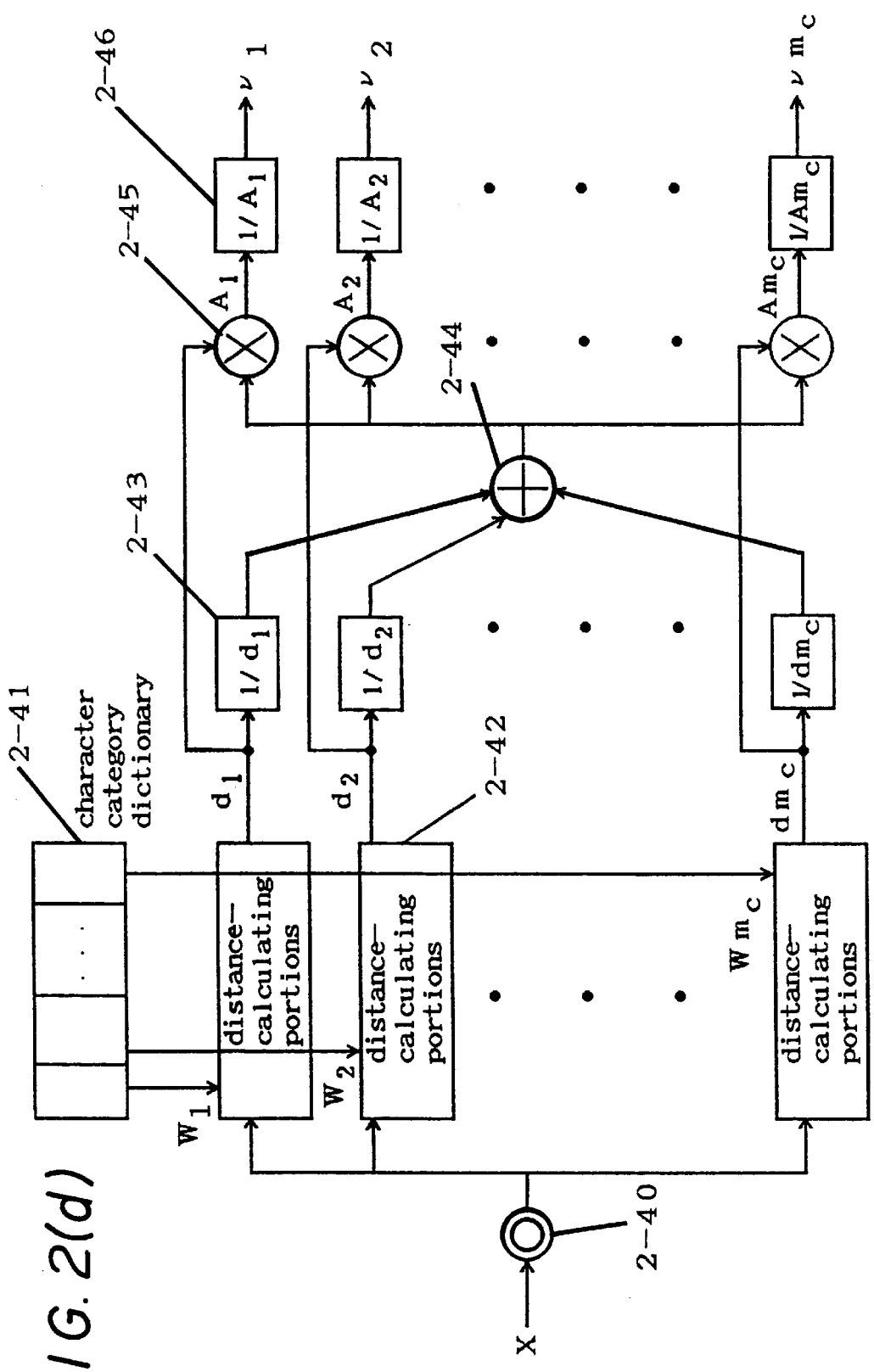
FIG. 2(d) is a block diagram of a first example of subclassification portion of the first example of the character recognition portion according to the invention.

FIG. 2(d) is a block diagram of a first example of each subclassification portion 2-22. An input portion 2-40 receives the feature vector of a character pattern delivered from the subclassification input signal selecting portion 2-24. A character category dictionary 2-41 stores plural feature vectors used for reference to character categories representing typical values of character categories of character patterns. Distance calculating portions 2-42 calculate the distances, respectively, between all character category reference feature vectors and the feature vector described above. Dividers 2-43 calculate the inverses of the outputs from the distance calculating portions 2-42, respectively. An adder 2-44 produces the sum of the outputs from the dividers 2-43. Multipliers 2-45 produce the products of the outputs from the adders 2-44 and the outputs from their respective distance calculating portions 2-42. Dividers 2-46 calculate the inverses of the outputs from the multipliers 2-45, respectively.

The operation of the character recognition portion constructed in this way is now described. The character extraction portion 2-11 delivers character patterns and information about the sizes and positions of characters. The character patterns are applied to the feature extracting portions 2-12. The information about the sizes and positions of characters (see FIG. 2-4) is supplied to the first-order candidate character selecting portions 2-17 and the post-recognition processing portion 2-15 in the candidate character selecting portion 2-14.

The feature extracting portions 2-12 extract different feature vectors $X_k$ (k=1 through $N_F$: $N_F$ is the number of kinds of feature vectors) from character patterns extracted from the character extraction portion 2-11. Each feature vector $X_k$ is composed of $n_k$ feature data items and given by $$X_k = (x_{k1}, x_{k2}, \ldots, x_{knk}) \qquad (2\text{-}1)$$

Examples of feature vectors of different character patterns are given below. Feature vectors other than those given below will do.

(a) Concentration feature mesh features of 64 dimensions. An image of a character pattern is divided into 8×8 regions, for example. The frequency of black pixels in each region forms an element.

(b) Contour direction density features of 64 dimensions. An image of a character pattern is divided into 4×4 regions, for example. The frequency of occurrence of each of the directional elements (horizontal, vertical and two oblique directions) of character contour points in each small region forms an element.

(c) Peripheral features of 32 dimensions. An image of a character pattern is divided into 4×4 regions, for example. The area of a non-image region is counted when it goes from one outer fringe to the other fringe until the first character portion is encountered. This operation is performed for the four outer fringes to obtain first-order peripheral features of 16 dimensions. Similarly, the area is counted until the second character portion is encountered; the first character portion is disregarded. Thus, second-order peripheral features of 16 dimensions are obtained. The peripheral features of the 32 dimensions have both first- and second-order peripheral features.

(d) Stroke density feature. An image in a character pattern is scanned horizontally and vertically. The number of passes through character portions forms a featuring amount.

The feature vectors $X_k$ of feature patterns extracted by the feature extracting portions 2-12 are applied to their respective single feature recognizing portions 2-13. These single feature recognizing portions 2-13 perform their respective identification processes as described below to find the degrees of similarity of character categories to their respective feature vectors $X_k$. The feature vector $X_k$ used in the following description of the operation of the single feature recognizing portions 2-13 is a feature vector obtained by some feature extraction method. In the following, $X_k$ and $n_k$ are indicated by X and n, respectively, for simplicity.

The operation of each single feature recognizing portion 2-13 is described in detail below. In each single feature recognizing portion 2-13, feature vector X is first applied to the fuzzy rough classification portion 2-21. In this fuzzy rough classification portion 2-21, the feature vector X is applied to the input portion 2-30 and delivered to $m_r$ distance calculating portions 2-31. The distance calculating portions 2-31 read group reference feature vectors $V_i$ ($1 \leq i \leq m_r$; $m_r$ is the number of feature vectors used for reference to groups) representing character category groups from the group dictionary 2-20, calculate the distances $d_i$ between X and $V_i$, and produce the calculated distances to their respective dividers 2-32 and multipliers 2-34. The distances $d_i$ are given by $$d_i = \|X - V_i\|^{2/(f-1)} \quad (1 \leq i \leq m_r) \qquad (2\text{-}2)$$

where f is a real number greater than unity (f>1). The dividers 2-32 calculate the inverses of the distances $d_i$, respectively, and produce the calculated values to the adders 2-33, respectively. The adders 2-33 calculate the sum of the outputs from all the dividers 2-32 and produces the sum to the $m_r$ multipliers 2-34. The multipliers 2-34 calculate the products of the outputs from the distance calculating portions 2-31 and the output from the adder 2-33 and supply the products to their respective dividers 2-35. These dividers 2-35 calculate the inverses of the outputs from their respective multipliers 2-34. Finally, the fuzzy rough classification portion 2-21 produces to the group selecting portion 2-23 group assignment degrees $\mu_i$ ($1 \leq i \leq m_r$) of character category groups to feature vectors X of character patterns to which the outputs from the dividers 2-35 are respectively applied. That is, the group assignment degree $\mu_i$ ($1 \leq i \leq m_r$) of each character category group can be given by $$\mu_i = \frac{1}{\sum_{j=1}^{m_r} (d_i/d_j)} \quad (2\text{-}3)$$

Group reference feature vectors representing character categories and stored in the group dictionary 2-20 have been previously designed by a conventional clustering method, for example, K average algorithm described by Makoto Nagao in "Character Pattern Information Processing", compiled by the Electronic Information Communications Society of Japan, published by Corona Publishing Company, Japan, Isodata algorithm, or LBG algorithm described by Y. Linde, A. Buzo, and R. M. Gray in "An Algorithm for Vector Quantizer Design", IEEE Trans. on Communications, Vol. 28, 1, pp. 84–95, January 1980.

A method of designing the group dictionary 2-20, using the K average algorithm, is now described briefly.

(1) Character patterns which are $m_r$ in number ($m_r$ is a predetermined number of character categories) are appropriately selected from a set of character patterns that are used to design the group dictionary and should be recognized. These feature vectors are taken as $m_r$ feature vectors $V_i$ ($1 \leq i \leq m_r$) which are used when reference is made to the group.

(2) $V_i$ which minimize distances $d_i$ given by Eq. (2-4) are found for feature vectors X of all character patterns used to design the group dictionary.

$$d_i = \|X - V_i\| \quad (2\text{-}4)$$

At this time, it is assumed that X belongs to character category groups $S_i$ ($1 < i < m_r$).

(3) The average value of feature vectors X of character patterns belonging to each group $S_i$ is found and indicated by $V_i'$.

(4) If the relation $V_i' = V_i$ holds for every value of i, then the group reference feature vector obtained at this time is written to the group dictionary 2-20; otherwise $V_i'$ is taken as a new group reference character pattern signal $V_i$, and the process returns to item (2) described above.

By designing the feature vectors for reference to the group in this way, all the character patterns can be classified into subsets (character category groups) of character patterns. In each subset, some feature vectors are similar to each other. The Isodata algorithm and the LBG algorithm are essentially the same as this K average algorithm.

The group selecting portion 2-23 selects plural character category groups from the fuzzy rough classification portion 2-21 in order of increasing group assignment degree, sends information indicating which character category groups have been selected to the subclassification input signal selecting portion 2-24, and sends corresponding group assignment degrees to the single feature similarity degree calculating portion 2-25. As a method of selecting character category groups, category groups having group assignment degrees exceeding a given threshold value may be selected.

The subclassification input signal selecting portion 2-24 selects those subclassification portions 2-22 which receive the feature vectors X of the applied character patterns, according to group selection information obtained from the group selecting portion 2-23, and produce the feature vectors X to these subclassification portions 2-22.

Each of the subclassification portions 2-22 (which receive feature vectors from the subclassification input signal selecting portion 2-24) corresponding to the character category groups selected by the group selecting portion 2-23 first receives the feature vectors X of the character patterns at its input portion 2-40, and produces the feature vectors X to $m_c$ distance calculating portions 2-42. The distance calculating portions 2-42 read character category reference feature vectors $W_i$ ($1 \leq i \leq m_c$; $m_c$ is the number of feature vectors used for reference to character categories) representing typical values of the character categories stored in the character category dictionary 2-41, calculate the distances $d_i$ between X and $W_i$, and deliver the calculated distances to their respective dividers 2-43 and multipliers 2-45. The distances $d_i$ are given by $$d_i = \|X - W_i\|^{2/(f-1)} \quad (1 \leq i \leq m_c) \quad (2\text{-}5)$$

where f is a real number satisfying the condition f>1. The dividers 2-43 calculate the inverses of the distances $d_i$, respectively, and produce the calculated values to the adder 2-44. This adder 2-44 calculates the sum of the outputs from all the dividers 2-43, and produces the calculated sum to the $m_c$ multipliers 2-45. The multipliers 2-45 calculate the products of the outputs from their respective distance calculating portions 2-42 and the output from the adder 2-44, and produce the calculated products to their respective dividers 2-46. The dividers 2-46 calculate the inverses of the outputs from their respective multipliers 2-45. Finally, in the subclassification portions 2-22, the outputs from the dividers 2-46 are produced to the single feature similarity degree calculating portion 2-25 as inside group similarity degrees $v_i$ ($1 \leq i \leq m_c$) of character categories to the feature vectors X of character patterns. That is, in each subclassification portion 2-22, the inside group similarity degrees $v_i$ ($1 \leq i \leq m_c$) of character categories can be given by $$v_i = \frac{1}{\sum_{j=1}^{m_c} (d_i/d_j)} \quad (2\text{-}6)$$

The character category reference feature vectors indicating typical values of character categories stored in the character category dictionary 2-41 have been previously designed so that the outputs from the distance calculating portions 2-42 corresponding to character categories in character category groups are smaller than the outputs from other distance calculating portions 2-42 in response to character patterns having character categories inside the character category groups.

For example, these character category reference feature vectors are designed by a learning algorithm called learning vector quantization which is described, for example, by T. Kohonen in "Learning Vector Quantization for Pattern Recognition", Helsinki University of Technology, Report TKK-F-A 601, November 1986.

The learning vector quantization is described briefly below. First, character category reference feature vectors $W_i$ having $m_c$ character categories are prepared. Feature vectors used to design the character category dictionary are composed of sets of character patterns contained in character category groups. Feature vectors of character patterns arbitrarily selected for each character category are used as initial values of the vectors $W_i$. Also, feature vectors used for reference and obtained by a conventional clustering method such as the K average algorithm already described in connection with design of the group dictionary 2-20 are employed as initial values of the vectors $W_i$. Then, the feature vector X of a character pattern having arbitrary one category $C_x$ is selected from character patterns used to design the character category dictionary. With respect to the vector X, the following steps are repeated.

(1) A character category reference feature vector $W_c$ which is closest to X is selected. Let $C_c$ be the character category of this vector $W_c$.

(2) If $C_x = C_c$, then the vector $W_c$ approaches the feature vector X. If $C_x \neq C_c$, then the vector $W_c$ can be moved away from the feature vector X. Character category reference feature vectors other than the vector $W_c$ are not updated.

When the vector X is given, the above-described character reference feature vector is repeatedly updated for all character patterns used to design the character category dictionary previously prepared.

By designing the character category reference feature vectors in the character category dictionary 2-41 in this way, character category reference feature vectors having character categories inside character category groups are always located closest to the feature vectors of character patterns having character categories inside the category groups. Hence, the character category of the character pattern applied to each character category can be recognized by selecting the distance calculating portion 2-42 producing a minimum output from all the distance calculating portions 2-42.

In the single feature similarity degree calculating portion 2-25, the multipliers 2-26 calculate the products of group assignment degrees of character category groups selected by the group selecting portion 2-23 and their respective inside group similarity degrees obtained from the subclassification portions 2-22 corresponding to the character category groups and receiving feature vectors from the subclassification input signal selecting portion 2-24, and produce the calculated products to the category similarity degree calculating portion 2-27. In particular, the number of the multipliers 2-26 is the number of group reference feature vectors multiplied by the number of character category reference feature vectors in each subclassification portion. The multipliers 2-26 receive the group assignment degree $\mu_p$ ($1 \leq p \leq m_r$; $m_r$ is the number of character category groups) of some category group p selected by the group selecting portion 2-23 and inside group similarity degree $v_{pq}$ ($1 \leq q \leq m_c$; $m_c$ is the number of character categories of character patterns) of some character category q obtained from the subclassification portion 2-22 corresponding to the character category p. That is, the output value $\xi_{pq}$ of each multiplier 2-26 is given by $$\xi_{pq} = \mu_p \cdot v_{pq} \tag{2-7}$$

The category similarity degree calculating portion 2-27 classifies the outputs from all the multipliers 2-26 in terms of character category, and selects some output having larger values. The sum of the selected output values is calculated for each character category. This is produced to the candidate character selecting portion 2-14 as the degree of similarity $r_i$ ($1 \leq i \leq N_c$; $N_c$ is the number of character categories) of each character category to the feature vectors of character patterns applied to each single feature recognizing portion 2-13. In order to select plural output values from the multipliers 2-26 for each category, those outputs from the multipliers 2-26 which exceed a certain threshold value may be selected.

As described thus far, each single feature recognizing portion 2-13 roughly classifies the feature vectors of character patterns obtained from some feature extracting portion 2-12 and then subclassifies them. Finally, the outputs are integrated. In this way, feature vectors are discriminated hierarchically. Consequently, the degrees of similarity of character patterns to some data about features are found.

In the candidate character selecting portion 2-14, the degrees of similarity of character categories to the feature vectors of input character patterns are applied to the similarity degree normalizing portions 2-16 from their respective single feature recognizing portions 2-13. The degrees of similarity are transformed into corresponding normalized degrees of similarity for each character category. More specifically, as given by Eq. (2-8), the degrees of similarity $r_{ki}$ ($1 \leq k \leq N_F$; $N_F$ is the number of kinds of feature vectors; $1 \leq i \leq N_c$; $N_c$ is the number of character categories) of character categories obtained from their respective single feature recognizing portions 2-13 are divided by the maximum value $r_{kmax}$ of these degrees of similarity, thus normalizing the degrees of similarity. These are delivered as normalized degrees of similarity $t_{ki}$ ($0 < t_{ki} \leq 1$; $1 \leq i \leq N_c$; $N_c$ is the number of character categories) to their respective first-order candidate character selecting portions 2-17.

$$t_{ki} = r_{ki}/r_{kmax} \tag{2-8}$$

Each first-order candidate character selecting portion 2-17 compares information about the sizes (the widths a and the heights b of character patterns obtained from the character extraction portion 2-11), positional information h, information about the reference sizes (the widths $A_i$ and heights $B_i$ of the reference character patterns) and information about reference positions $H_i$ ($1 \leq i \leq N_c$; $N_c$ is the number of character categories) of all character categories stored in the character information storage portion 2-50, selects plural candidate character categories (first-order candidate character categories), and sends these selected categories to the second-order candidate character selecting portion 2-18. An example of the method of selecting candidate character categories consists of establishing a character width-evaluating function F(a), a character height-evaluating function F(b), and a character position-evaluating function F(h), given by Eqs. 2-9, 2-10, and 2-11, respectively, and selecting candidate character categories having functions F smaller than certain threshold values.

$$F(a) = |a - A_i| \tag{2-9}$$
$$F(b) = |b - B_i| \tag{2-10}$$
$$F(h) = |h - H_i| \tag{2-11}$$

As an evaluating function, a character shape-evaluating function as given by Eq. (2-12) and using information about the ratio of character width to character height, or a/b, and information about the ratio of the height of the reference character to the width of the reference character, or $A_i/B_i$, may be used.

$$F(a/b) = |(a/b) - (A_i/B_i)| \qquad (2\text{-}12)$$

The method of selecting first-order candidate character categories by means of the first-order candidate character selecting portions 2-17 is not limited to the method using only information about the sizes s and positions h of character patterns. Alternatively, those character categories which have normalized degrees of similarity exceeding a given threshold value are first selected from the outputs from the respective similarity degree normalizing portions 2-16. Then, the information about the sizes s and positions h of character patterns are compared with information about the reference sizes ($A_i$, $B_i$) and about the reference positions $H_i$ of all character categories stored in the character information storage portion 2-50. Then, first-order candidate character categories are selected.

In the second-order candidate character selecting portion 2-18, each adder 2-181 calculates the sum of the normalized degrees of similarity $t_{ki}$ (given by Eq. (2-13)) of all first-order candidate character categories obtained from the first-order candidate character selecting portions 2-17 for the corresponding one of categories to find an integrated degree of similarity $u_i$ ($1 \leq i \leq N_c$; $N_c$ is the number of categories).

$$u_i = \sum_k t_{ki} \qquad (2\text{-}13)$$

The final candidate character selecting portion 2-182 compares these integrated degrees of similarity $u_i$ having larger values and delivers them as second-order candidate character categories to the post-recognition processing portion 2-15 together with the integrated degrees of similarity.

As described thus far, the candidate character selecting portion 2-14 integrates the results of discrimination (i.e., the degrees of similarity) obtained by recognizing the feature vectors of character patterns applied to the single feature recognizing portions 2-13 and selects plural candidate character categories. The similarity degree normalizing portions 2-16 transform the degrees of similarity obtained from the single feature extracting portion 2-12 into normalized degrees of similarity which permit the results of discrimination of feature vectors to be well integrated within the first-order candidate character selecting portions 2-17. More specifically, values which are most important for the first-order candidate character selecting portions 2-17 to finally select candidate character categories with great confidence are maximum values of the degrees of similarity of character categories obtained from the single feature recognizing portions 2-13 and values approximate to the maximum values, i.e., degrees of similarity which are derived from the single feature recognizing portions 2-13 and rank first, second, and so on. However, the maximum one of degrees of similarity obtained from the single feature recognizing portions 2-13 is affected by the sum of the numbers of output units in the subclassification portions (specifically, as the sum increases, the maximum degree of similarity tends to decrease). Therefore, if the degrees of similarity from the single feature recognizing portions 2-13 are directly supplied to the first-order candidate character selecting portions 2-17, then top priority is always given to the result of discrimination made by the single feature recognizing portion 2-13 having a maximum degree of similarity on average. Therefore, in this configuration, it is difficult to yield the advantage of the use of plural kinds of feature vectors. That is, when a character pattern is incorrectly recognized with some feature vector, it is difficult to correctly recognize the pattern according to the result of discrimination using a different feature vector. However, in the similarity degree normalizing portions 2-16, the degrees of similarity obtained from the single feature recognizing portion 2-13 are normalized with their maximum degree of similarity and so the maximum degree of similarity is maintained at 1. Consequently, it is possible that the results of discriminations made by the single feature recognizing portions 2-13 contribute equally to the final selection of candidate character categories made by the candidate character selecting portion 2-14. It is unlikely that top priority is given to some single feature recognizing portion 2-13 at all times. Hence, highly reliable candidate character categories can be found.

Feature vectors obtained by the feature extracting portion 2-12 are extracted from normalized character patterns. Therefore, in this method, it is not possible to correctly recognize character categories having vertically long and horizontally long features such as "I", "1", and "–". In the present example, however, these character categories can be correctly discriminated by making effective use of information about the sizes and positions of characters by means of the first-order candidate character selecting portions 2-17.

Finally, plural second-order candidate character categories obtained by the candidate character selecting portion 2-14 are supplied to the post-recognition processing portion 2-15, where final candidate character categories are selected, using the information about the sizes and positions of characters obtained by the character extraction portion 2-11. These final candidate character categories and their integrated degrees of similarity are produced to the language processing portion. In particular, the post-processed character set decision portion 2-52 performs the following processing.

First, all sets of post-processed character categories stored in the post-processed character set storage portion 2-51 are read out and compared with the second-order candidate character categories. At this time, if any second-order candidate character category is a set of post-processed character categories, then information about the sizes and positions of characters in the second-order candidate character categories and also in all post-processed character categories contained in the set of post-processed character categories to which the second-order candidate character categories belong are read from the character information storage portion 2-50. The information read out is compared with information about the sizes (widths a and heights b) and the positions h of character patterns obtained by the character extraction portion 2-11. Character categories which are more similar to information about the sizes and positions of applied character patterns are determined as new second-order candidate character categories. One specific method of determining the second-order candidate character categories is to determine character categories having smaller values of evaluation functions as second-order candidate character categories, the evaluation functions being given by Eqs. 2-9 through 2-12. Examples of sets of post-processed character categories include "X, x", "K, k", and other sets of uppercase and lowercase characters resembling each other. It is assumed that X is one second-order candidate character category. For the category X, the width, the height, and the position of a reference position stored in the character information storage portion 2-50 are 0.6, 0.9, and 0.5, respectively. For the category x, the width, the height, and the position are 0.5, 0.6, and 0.3, respectively. It is also assumed that the width, the height, and the position of a character pattern obtained from the character extraction portion 2-11 are 0.52, 0.7, and 0.32, respectively. If Eq. (15)+Eq. (16)+Eq. (17) (F(a, b, h)=F(a)+F(b)+F(h)) is used as an evaluation function, then the evaluation function F assumes a value of 0.46 for X and a value of 0.14 for x. In this way, a final candidate character category is x.

In this manner, an uppercase and a lowercase which are similar to each other and difficult for the post-recognition processing portion 2-15 to discriminate from each other only with feature vectors can be precisely distinguished from each other by making effective use of information about the sizes and positions of the characters. The present example of character recognition portion has been described thus far.

In this way, in the present example, plural kinds of feature vectors are discriminated from each other by their respective single feature recognizing portions 2-13, and the degrees of similarity of character categories to the feature vectors are found. Then, the candidate character selecting portion 2-14 integrates the results of discriminations made by the single feature recognizing portions 2-13, using all the degrees of similarity. Thus, the character pattern is finally recognized. Consequently, a character pattern which would have been incorrectly recognized with some feature vector can be easily and correctly recognized, based on the results of discriminations using a different feature vector. This technique is difficult to carry out where plural kinds of feature vectors are collectively used as a unit as in the prior art techniques. As a result, accurate recognition can be accomplished.

In the prior art techniques, the use of plural kinds of feature vectors increases the time required for a recognition. In the present example, the single feature recognizing portions simultaneously perform their respective recognition processes and, therefore, the time required for a recognition can be shortened compared with the prior art techniques.

In the present example of each single feature recognizing portion 2-13, the subclassification portions 2-22 may be constructed as described below instead of assuming the structure shown in FIG. 2(d).

Figure 2F:
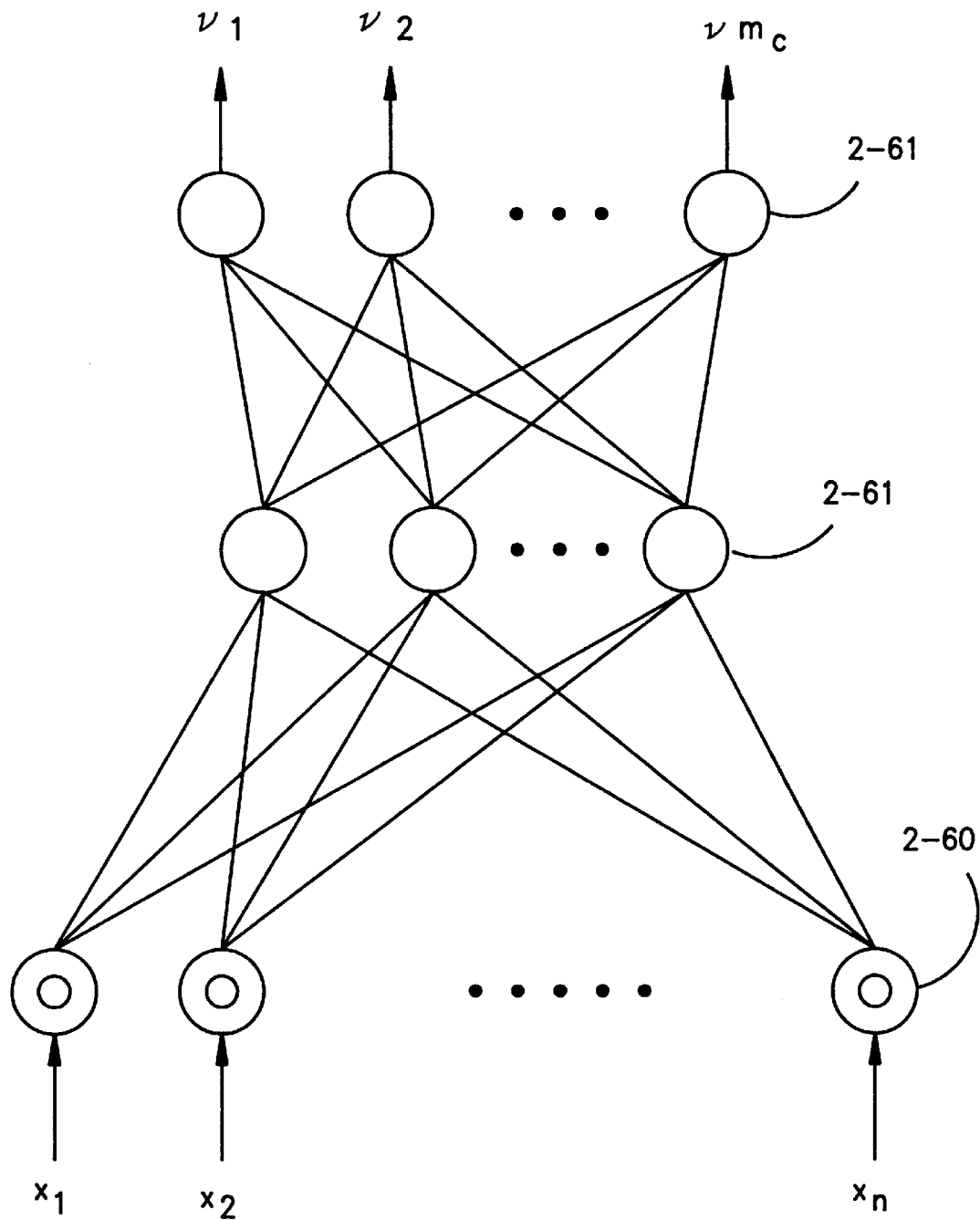
FIG. 2(f) is a block diagram of a second example of the subclassification portion of the first example of the character recognition portion according to the invention.

FIG. 2(f) is a block diagram of a second example of each subclassification portion 2-22. Input portions 2-60 receive the feature vectors of character patterns produced from the subclassification input signal selecting portion 2-24. The input portions 2-60 forming a lower layer are connected with multiple input-output signal processing portions 2-61. These multiple input-output signal processing portions 2-61 multiply either the outputs from the input portions 2-60 or the outputs from the input-output signal processing portions 2-61 by their respective weighting coefficients indicating the degrees of connectivity, totalize the products, and deliver the resulting sum if it is less than a threshold value. In this example, multiple input-output signal processing portions are designed to form a multilayered structure. In each layer, no connection is made. The network is so built that signals are propagated only to upper layers. In this manner, inside group similarity degrees indicating the degrees of character categories inside a character category to the feature vectors of the applied character pattern are found.

Figure 2G:
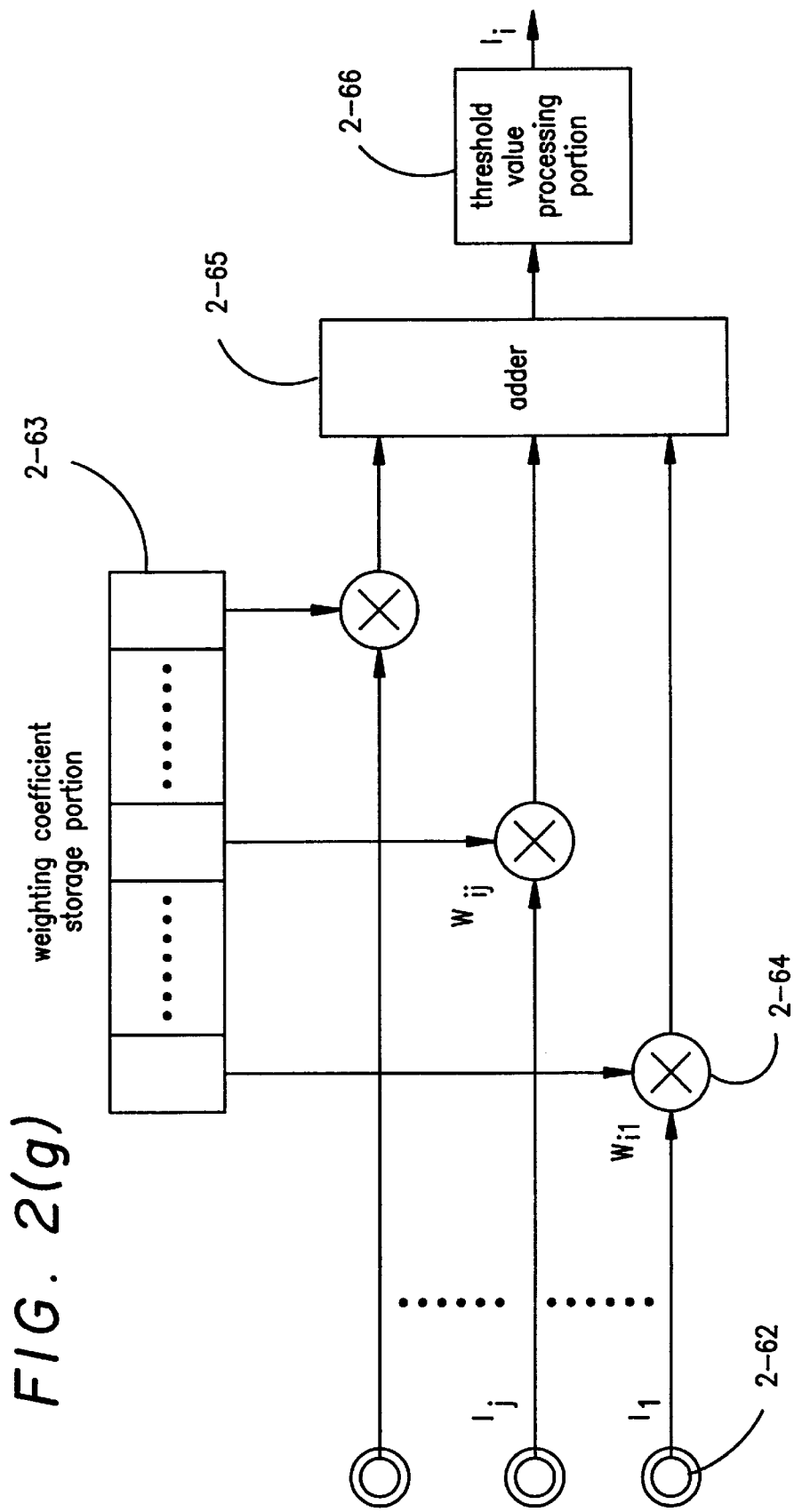
FIG. 2(g) is a block diagram of one multiple input-output signal processing portion of the second example of the subclassification portion of the first example of the character recognition portion according to the invention.

FIG. 2(g) is a block diagram of each of the multiple input-output signal processing portions 2-61. Input portions 2-62 receive input signals. A weighting coefficient storage portion 2-63 stores weighting coefficients with which signals produced from the input portions 2-62 are weighted. Multipliers 2-64 produce the products of the weighting coefficients from the weighting coefficient storage portion 2-63 and the input signals from the input portions 2-62, respectively. An adder 2-65 produces the sum of the output values from all the multipliers 2-64. A threshold value processing portion 2-66 limits the output value from the adder 2-65 within a given range.

The operation of the second example of each subclassification portion 2-22 constructed as described thus far is described now. In the same way as in the first example, the subclassification portions 2-22 which correspond to character category groups selected by the group selecting portion 2-23 and receive feature vectors from the subclassification input signal selecting portion 2-24 receive the feature vectors X of character patterns at their input portions 2-60. The number of the input portions 2-60 is n and equal to the number of feature data items of the character pattern. The feature data items $x_i$ are applied to their respective input portions 2-60. As shown in FIG. 2(f), the input portions 2-60 are connected with the multiple input-output signal processing portions 2-61 of the subclassification portions 2-22 and form a low layer. The multipliers 2-64 of the multiple input-output signal processing portions 2-61 multiply the outputs either from the input portions 2-60 or from the multiple input-output signal processing portions 2-61 by weighting coefficients $w_{ij}$ stored in the weighting coefficient storage portion 2-63. The coefficients indicate the degrees of connectivity. The adder 2-65 calculates the sum of the outputs from the multipliers 2-64. The output from the adder 2-65 is transformed into a corresponding value by the threshold value processing portion 2-66 and supplied to the upper layer. Let $I_i$ be the output value from the i-th multiple input-output signal processing portion 2-61 in the layer shown in FIG. 2(g). Let $I_j$ be the input value to one input portion 2-62. Let $w_{ij}$ be the weighting coefficient indicating the degree of connectivity of the input connected with the input portion. The weighting coefficient indicates the degree of connectivity of coupling between the i-th multiple input-output signal processing portion and the j-th input. The output value $I_i$ can be given by $$I_i = f\left(\sum_j w_{ij} \cdot I_j\right) \qquad (2\text{-}14)$$

Figure 2H:
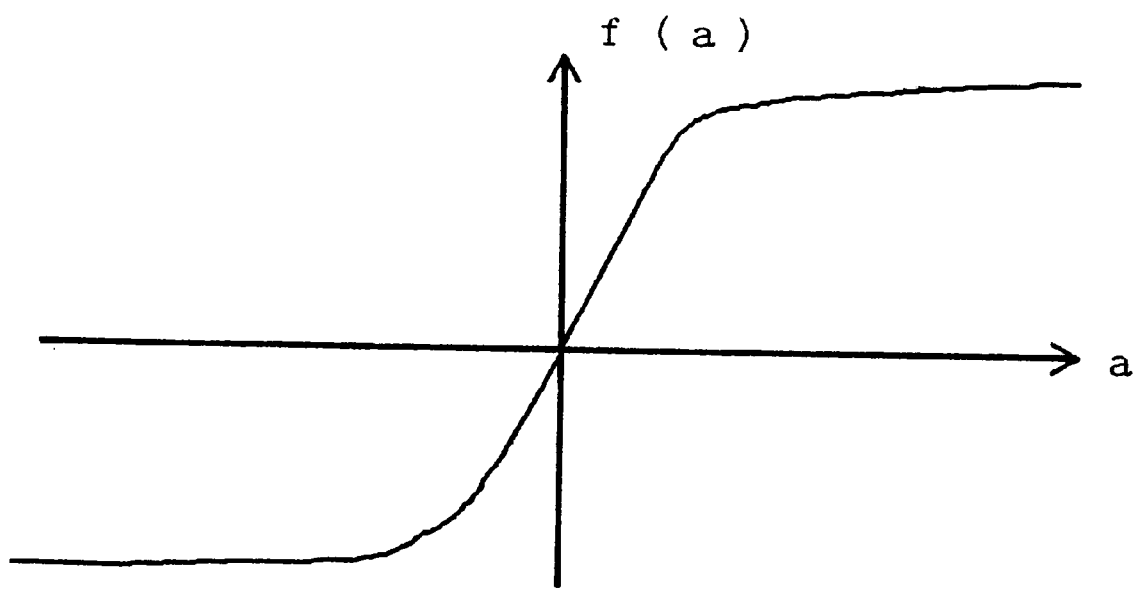
FIG. 2(h) is an input-output characteristic diagram of a threshold value processing portion of one multiple input-output signal processing portion of the second example of the subclassification portion of the first example of the character recognition portion according to the invention.
Figure 2I:
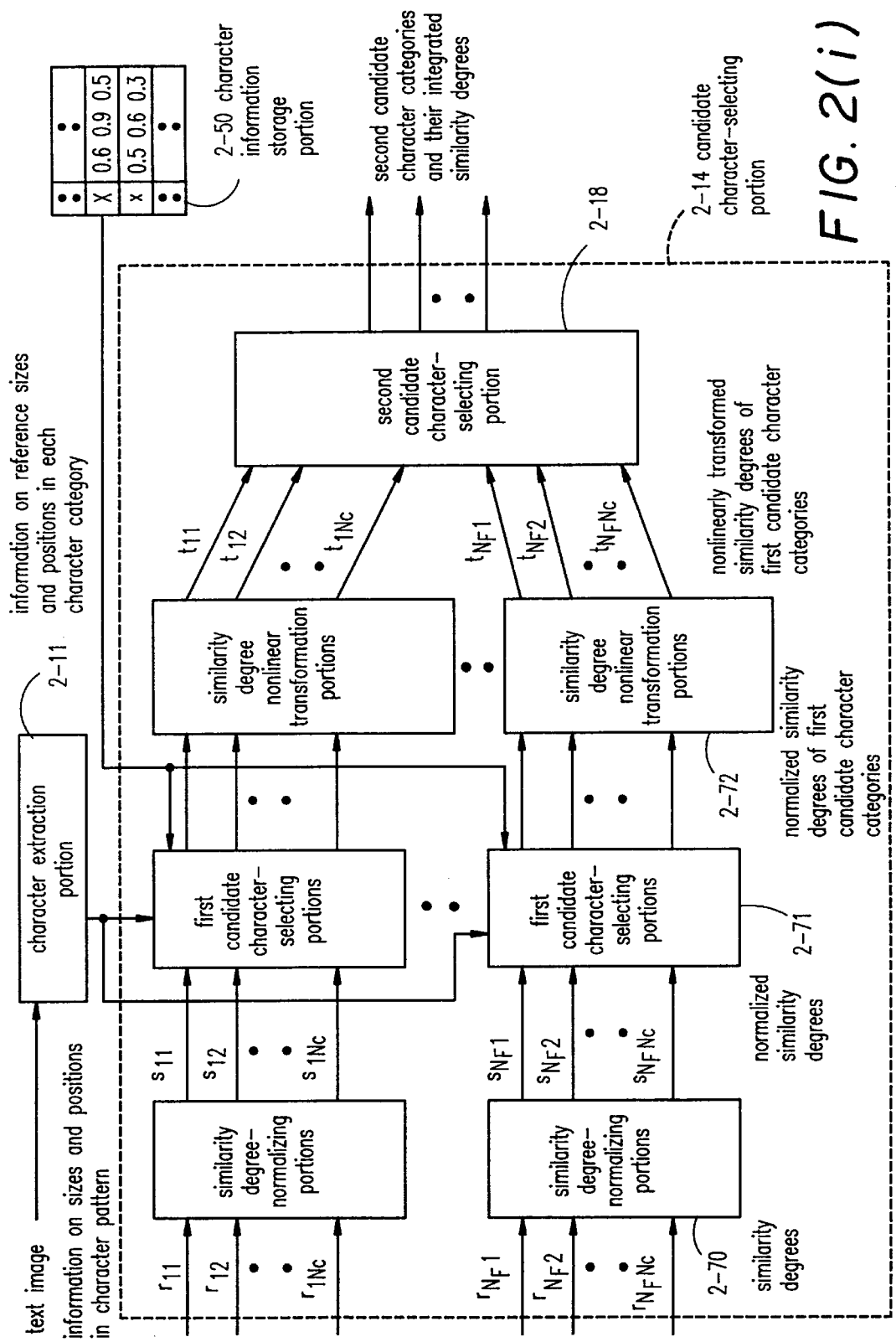
FIG. 2(i) is a block diagram of a second example of the candidate character selecting portion of the first example of the character recognition portion according to the invention.

The input-output characteristic of the threshold value processing portion 2-66 is shown in FIG. 2(h). The input-output characteristic of the threshold value processing portion 2-66 which limits the output within a range of (0, 1) can be given by $$f(a)=1/(1+\exp(-a+\theta)) \qquad (2\text{-}15)$$

where a is an input to the threshold value processing portion 2-66. The input-output characteristic of the threshold value processing portion 2-66 may have a threshold value function other than the above-described function.

The multiple input-output signal processing portions 2-61 in the top layer are identical in number with character categories of character patterns contained in each character category group. The multiple input-output signal processing portions 2-61 in the top layer correspond to these character categories. That is, the output from each multiple input-output signal processing portion 2-61 in the top layer is delivered as an inside group similarity degree $v_i$ ($1 \leq i \leq m_c$; $m_c$ is the number of feature vectors used for reference to character categories) to the single feature similarity degree calculating portion 2-25. The inside group similarity degree $v_i$ indicate the degree of similarity of the feature vector X of the character pattern to each character category inside the character category group.

The weighting coefficients of the multiple input-output signal processing portions 2-61 have been previously set such that the multiple input-output signal processing portion 2-61 in the top layer corresponding to each character category produces its maximum output in response to a character pattern having each character category inside the character category group. In this way, each subclassification portion 2-22 can recognize a character category of a character pattern. These weighting coefficients are designed by a learning algorithm called error back propagation method, which is described, for example, by D. E. Rumelhart, G. E. Hinton, and R. J. Williams, "Learning Representations by Back-Propagating Errors"), Nature, Vol. 323, pp. 533–536, Oct. 9, 1986.

FIG. 2($i$) is a block diagram of a second example of the candidate character selecting portion 2-14, particularly showing its structure. Similarity degree normalizing portions 2-70 are equal in number with the single feature recognizing portions 2-13, and act to normalize the degrees of similarity of character categories obtained from their respective single feature recognizing portions 2-13 with the maximum value of these degrees of similarity. First-order candidate character selecting portions 2-71 are identical in number with the single feature recognizing portions 2-13 in the same way as the similarity degree normalizing portions 2-70. The first-order candidate character selecting portions 2-71 select plural candidate character categories (referred to herein as first-order candidate character categories) from all character categories, using the normalized degrees of similarity obtained from their respective similarity degree normalizing portions 2-70, information about the sizes and positions of character patterns obtained from the character extraction portion 2-11, and the information about the reference sizes and reference positions of the character categories, the latter information being stored in the character information storage portion 2-50. Similarity degree nonlinear transformation portions 2-72 are identical in number with the single feature recognizing portions 2-13 in the same way as the similarity degree normalizing portions 2-70. The similarity degree nonlinear transformation portions 2-72 serve to nonlinearly transform the normalized degrees of similarity of their respective first-order candidate character categories, and to divide the transformed normalized degrees of similarity by the sum of these degrees, thus finding the nonlinearly transformed degrees of similarity of the first-order candidate character categories. A second-order candidate character selecting portion 2-18 is similar in structure to the second-order candidate character selecting portion 2-18 of the first example, selects plural candidate categories (referred to herein as second-order candidate categories) from all the first-order candidate character categories, using the nonlinearly transformed degrees of similarity of the first-order candidate character categories obtained from the similarity degree nonlinear transformation portions 2-72, and sends the selected categories to the post-recognition processing portion 2-15.

The operation of the second example of the candidate character selecting portion 2-14 constructed in this way is now described. First, the similarity degree normalizing portions 2-70 divide the degrees of similarity $r_{ki}$ ($1 \leq k \leq N_F$; $N_F$ is the number of kinds of feature vectors; $1 < i < N_c$; $N_c$ is the number of character categories) obtained from their respective single feature recognizing portions 2-13 by the maximum value $r_{kmax}$ of these degrees of similarity, as given by Eq. (2-16), and produce them as normalized degrees of similarity $s_{ki}$ ($0 \leq s_{ki} \leq 1$; $1 \leq i \leq N_c$; $N_c$ is the number of character categories) to their respective first-order candidate character selecting portions 2-71.

$$s_{ki} = r_{ki}/r_{kmax} \tag{2-16}$$

The first-order candidate character selecting portions 2-71 operate essentially similarly to the first example of the candidate character selecting portion 2-14. That is, the first-order candidate character selecting portions 2-71 selects plural candidate character categories (first-order candidate character categories) and sends them to the similarity degree nonlinear transformation portions 2-72.

The similarity degree nonlinear transformation portions 2-72 nonlinearly transform the normalized degrees of similarity $s_{ki}$ ($0 \leq s_{ki} \leq 1$; $1 \leq i \leq M_c$; $M_c$ is the number of first-order candidate character categories) obtained from their respective first-order candidate character selecting portions 2-71 into corresponding degrees, normalize (or divide) the degrees of similarity of the nonlinearly transformed first-order candidate character categories with (or by) the sum of these degrees, and deliver the normalized degrees as nonlinearly transformed degrees of similarity $t_{ki}$ ($1 \leq i \leq M_c$) to the second-order candidate character selecting portion 2-18. Letting f(x) be a nonlinear function, the integrated degree of similarity $t_{ki}$ can be given by $$t_k = f(s_{ki}) \bigg/ \sum_j f(s_{kj}) \quad 1 \leq j \leq M_C \tag{2-17}$$

Nonlinear function f(x) is a monotonously increasing function satisfying the relations $0 \leq f(x) \leq 1$, $f(0)=0$, and $f(1)=1$ when $0 \leq f(x) \leq 1$. As an example, a function given by Eq. (2-18) exists.

$$f(x)=x^a \tag{2-18}$$

where $\leq a \leq 1$.

The second-order candidate character selecting portion 2-18 operates similarly to the second-order candidate character selecting portion 2-18 of the first example. That is, the second-order candidate character selecting portion 2-18 selects plural second-order candidate character categories from all first-order candidate character categories, using the nonlinearly transformed degrees of similarity of all the first-order candidate categories obtained from the first-order candidate character selecting portions 2-71, and sends the selected categories to the post-recognition processing portion 2-15.

Careful examination of the degrees of similarity of character categories when the single feature recognizing portions 2-13 recognize a character incorrectly reveals that the maximum degree of similarity does not heavily depend on incorrect recognition, and that incorrect recognition often takes place when the difference between the maximum degree of similarity and the second degree of similarity is small. Accordingly, in the present example, after the degrees of similarity obtained from the single feature recognizing portions 2-13 are normalized with the maximum degree of similarity, the aforementioned difference between the maximum degree of similarity and the second degree of similarity is emphasized. In particular, when this difference is small, it is reduced further. In addition, the second degree of similarity is made smaller. This lowers the reliability or degree of similarity of the result of discrimination made by some single feature recognizing portion 2-13 which might suffer from incorrect recognition. Therefore, when the second-order candidate character selecting portion 2-18 selects final candidate character categories, emphasis is placed on the results of discriminations made by other single feature recognizing portions 2-13. As a result, highly reliable candidate character categories can be found.

EXAMPLE 2

Figure 2J:
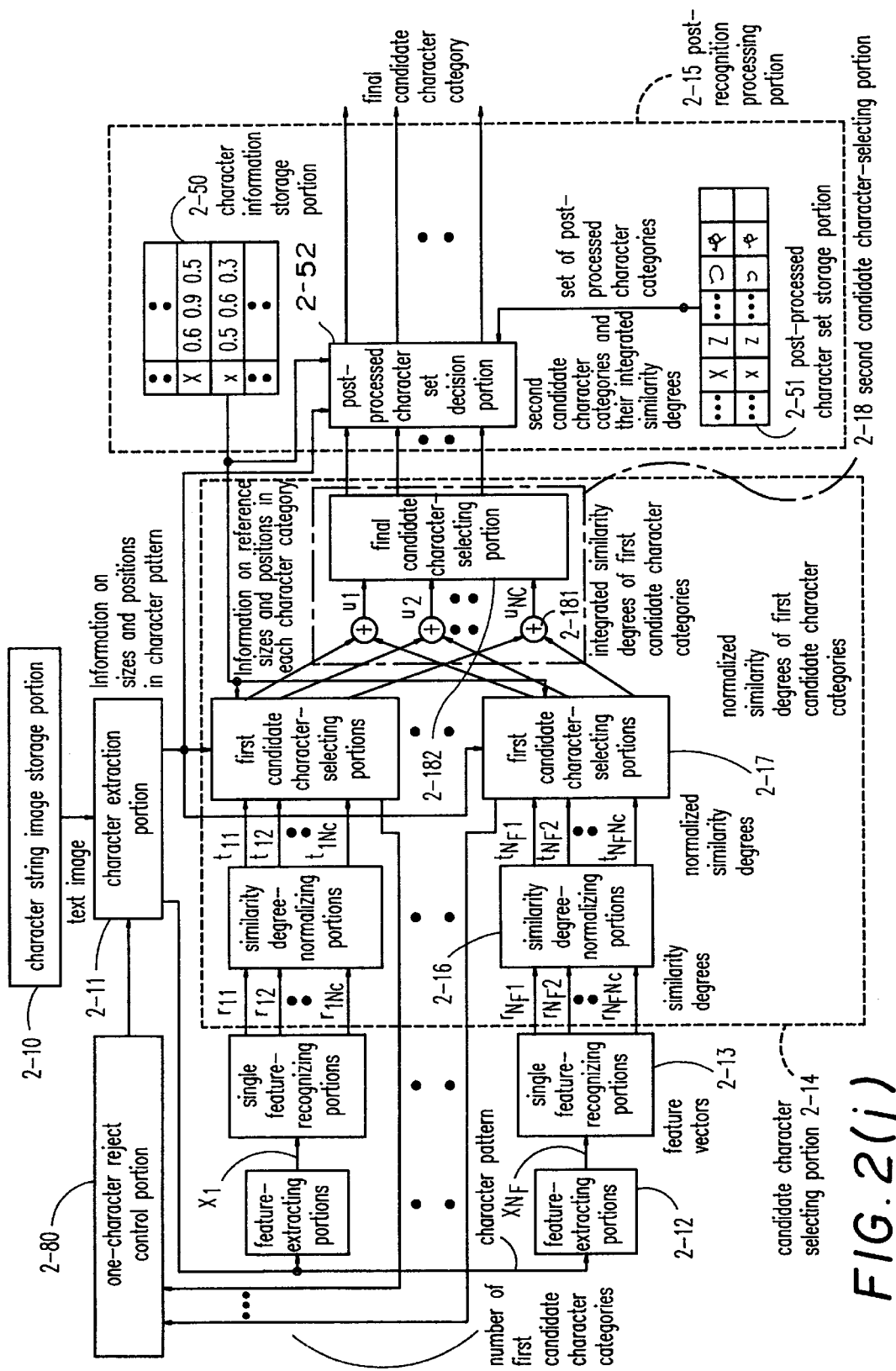
FIG. 2(j) is a block diagram of a second example of the character recognition portion according to the invention.

FIG. 2(j) is a block diagram of the second example of the character recognition portion according to the present invention. Components 2-10 through 2-18 are the same as the counterparts of the first example of the character recognition portion shown in FIG. 2(a). A one-character reject control portion 2-80 causes the character extraction portion 2-11 to extract a further character, depending on the number of first-order candidate character categories obtained from the first-order candidate character selecting portions 2-17. That is, the second example of the character recognition machine is similar to the first example except that the one-character reject control portion 2-80 is added.

The operation of the character recognition machine constructed in this way is now described. The components of the present example operate essentially similarly to the counterparts of the first example except for the one-character reject control portion 2-80, to recognize characters. Therefore, operation of these components is described briefly here.

In the same way as in the first example, the character extraction portion 2-11 extracts, one by one, character regions of character patterns, as shown in FIG. 2(e). The character patterns are sent to their respective single feature extracting portions 2-12. Information about the sizes and the positions of the extracted character patterns is delivered to the first-order candidate character selecting portions 2-17 and the post-recognition processing portion 2-15 in the candidate character selecting portion 2-14. The feature extracting portions 2-12 extract different feature vectors $X_k$ (k=1 to $N_F$; $N_F$ is the number of kinds of feature vectors) from character patterns extracted by the character extraction portion 2-11, and send the extracted vectors to their respective single feature recognizing portions 2-13. These single feature recognizing portions 2-13 perform their respective recognition operations in the same way as in the first example. The degrees of similarity of character categories to feature vectors $X_k$ are found and sent to the candidate character selecting portion 2-14. In this candidate character selecting portion 2-14, the similarity degree normalizing portions 2-16 normalize the degrees of similarity obtained from the single feature recognizing portions 2-13 corresponding to feature vectors with the maximum value of these degrees of similarity to thereby transform them into normalized degrees of similarity. Each first-order candidate character selecting portion 2-17 compares the information about the sizes and the positions obtained from the character extraction portion 2-11 with the information about the reference sizes and reference positions of all character categories stored in the character information storage portion 2-50, selects plural first-order candidate character categories, and sends them to the second-order candidate character selecting portion 2-18. As already described in the first example, the method of selecting first-order candidate character categories by means of the first-order candidate character selecting portion 2-17 is not limited to the method of consisting of selecting first-order candidate character categories by the use of only information about the sizes and positions of character patterns. For example, some character categories which are obtained from the corresponding similarity degree normalizing portion 2-16 and have degrees of similarity exceeding a certain threshold value are selected.

Then, the information about the sizes and the positions of character patterns are compared with the information about the reference sizes and reference positions of all character categories stored in the character information storage portion 2-50 as described above. Thus, first-order candidate character categories are selected.

The one-character reject control portion 2-80 calculates the sum of the numbers of first-order candidate categories obtained from the first-order candidate character selecting portions 2-17. If the sum is 0, i.e., no first-order candidate character category is selected, then the plural parameters used by the character extraction portion 2-11 to extract character regions one by one are varied. As already described in the first example, these parameters include reference sizes of character regions, the pitch, and the interval between adjacent character regions. Then, the character extraction portion 2-11 is again caused to extract character regions. Extracted character patterns are sent to the single feature recognizing portions 2-13.

The second-order candidate character selecting portion 2-18 totalizes the degrees of similarity of first-order candidate character categories obtained from their respective first-order candidate character selecting portions 2-17 for each category. Thus, an integrated degree of similarity of all the first-order candidate character categories is found. Subsequently, plural integrated degrees of similarity having larger values are selected. These are produced as second-order candidate character categories to the post-recognition processing portion 2-15.

Finally, the post-recognition processing portion 2-15 selects final candidate character categories from plural second-order candidate character categories obtained from the candidate character selecting portion 2-14, using information about the sizes and positions of character patterns derived from the character extraction portion 2-11.

Generally, in a Japanese text written in full-sized characters, if half-sized alphanumerical characters and numerals and characters which can be easily divided into plural parts such as "い" appear consecutively, character patterns are often incorrectly extracted. In this case, it has been difficult for the prior art techniques to correctly recognize such character patterns. In the present example, however, the first-order candidate character selecting portions 2-17 compare information about the sizes and positions of character patterns extracted by the character extraction portion 2-11 with information about the reference sizes and reference positions of the character categories to thereby select plural first-order candidate characters. Therefore, if the applied character pattern differs from the reference sizes and reference positions of the character categories by more than a given extent, then the candidate character category is 0. At this time, the one-character reject control portion 2-80 judges that the character recognition portion 2-11 has incorrectly extracted a character pattern. The parameters used by the character extraction portion 2-11 when a character pattern is extracted are varied subtly. Then, extraction of a character pattern is again performed, and recognition processing is carried out again. Consequently, characters can be extracted correctly even from a character string which often causes incorrect extraction of characters as mentioned above. Hence, accurate recognition can be accomplished.

EXAMPLE 3

Figure 2K:
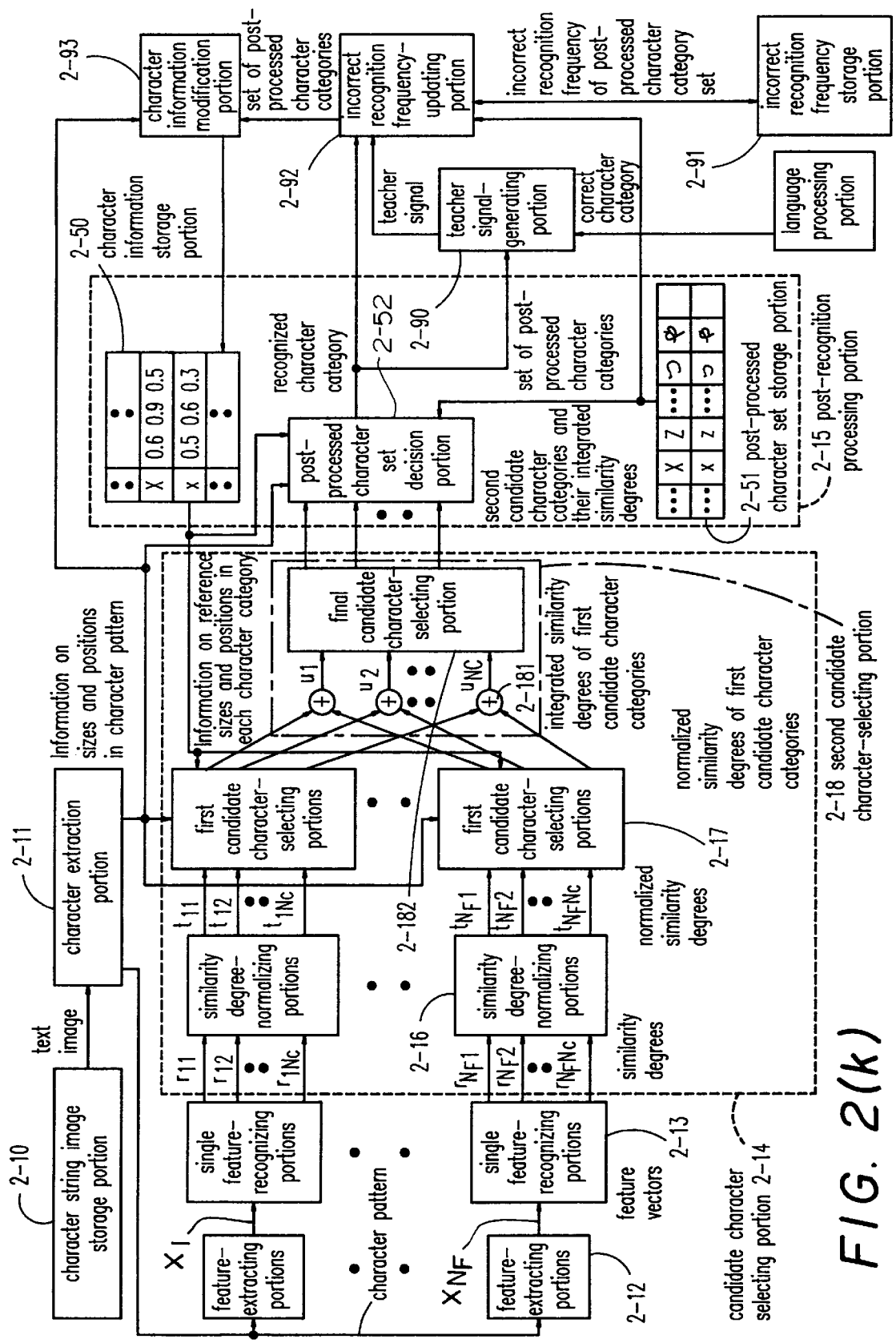
FIG. 2(k) is a block diagram of a third example of the character recognition portion according to the invention.

FIG. 2(k) is a block diagram of a third example of the character recognition portion according to the present invention. In this figure, components 2-10 through 2-18 are the same as their respective counterparts of the first example of character recognition portion shown in FIG. 2(a) 1(a). A teacher signal-generating portion 2-90 generates a teacher signal, using both the first candidate category of the final candidate character category (referred to herein as the recognition character category) obtained from the post-recognition processing portion 2-15 and a correct character category obtained from the language processing portion. An incorrect recognition frequency storage portion 2-91 stores an incorrect recognition frequency for each set of post-processed character category. This incorrect recognition frequency indicates the number of coincidences of combinations of the state of the teacher signal (correct character category) and the recognition character category with sets of post-processed character categories stored in the post-processed character set storage portion 2-51. An incorrect recognition frequency-updating portion 2-92 compares the combinations of the correct character categories and the recognition character categories with the sets of post-processed character categories stored in the incorrect recognition frequency storage portion 2-91 to update the incorrect recognition frequency of the post-processed character category sets stored in the incorrect recognition frequency storage portion. If this frequency is greater than an arbitrary permitted frequency, then the incorrect recognition frequency-updating portion 2-92 delivers the corresponding post-processed character category set. A character information modification portion 2-93 modifies information about the reference sizes and the reference positions of sets of post-processed character categories stored in the character information storage portion 2-50 and obtained from the incorrect recognition frequency-updating portion 2-92, using information about the sizes and positions in the applied character pattern.

The operation of the character recognition portion constructed as described thus far is now described. In the present invention, components excluding the teacher signal-generating portion 2-90, the incorrect recognition frequency storage portion 2-91, the incorrect recognition frequency-updating portion 2-92, and the character information modification portion 2-93 operate similarly to the counterparts of the first example when processing for character recognition is performed. Therefore, the operation of these components is described briefly here.

In the same way as in the first example, the character extraction portion 2-11 extracts a character pattern for each character region, as shown in FIG. 2(e). This character pattern is sent to the feature-extracting portions 2-12. Also, information about the sizes and positions in the extracted character pattern is supplied to the first candidate character-selecting portions 2-17 in the candidate character-selecting portion 2-14 and to the post-recognition processing portion 2-15. The feature-extracting portions 2-12 extract different feature vectors $X_k$ (k=1 to $N_F$: $N_F$ is the number of kinds of feature vectors) from character patterns extracted from the character extraction portion 2-11, and deliver the extracted feature vectors to their respective single feature-recognizing portions 2-13. These single feature-recognizing portions 2-13 perform their respective recognition processes in the same way as in the first example. That is, the recognizing portions 2-13 find the degrees of similarity of the character categories to their respective feature vectors $X_k$ and send the found degrees of similarity to the candidate character-selecting portion 2-14. In this candidate character-selecting portion 2-14, the similarity degree-normalizing portions 2-16 normalize the degrees of similarity obtained from the single feature-recognizing portions 2-13 corresponding to the feature vectors with the maximum value of these degrees of similarity to transform the degrees of similarity into normalized degrees of similarity. The first candidate character-selecting portions 2-17 compare information about the sizes and positions in character patterns obtained by the character extraction portion 2-11 with the information about the reference sizes and reference positions of all character categories stored in the character information storage portion 2-50, select plural first candidate character categories, and deliver these categories to the second candidate character-selecting portion 2-18. The second candidate character-selecting portion 2-18 accumulates the degrees of similarity of first candidate character categories obtained from their respective first candidate character-selecting portions 2-17 for each category. Thus, an integrated degree of similarity of all the first candidate character categories is found. Subsequently, plural integrated degrees of similarity having larger values are selected. These are produced as second candidate character categories to the post-recognition processing portion 2-15. The post-recognition processing portion 2-15 selects final candidate character categories from plural second candidate character categories obtained from the candidate character-selecting portion 2-14, using information about the sizes and positions in character patterns derived from the character extraction portion 2-11.

The teacher signal-generating portion 2-90 compares the recognized character category obtained from the post-recognition processing portion 2-15 with the correct character category of the character pattern produced from the language processing portion. If they differ, this correct character category is delivered as a teacher signal to the incorrect recognition frequency-updating portion 2-92. This updating portion 2-92 reads out all sets of post-processed character categories stored in the post-processed character set storage portion 2-51, and compares the combinations of the teacher signal (or, the correct character category) and the recognized character categories successively with all the sets of post-processed character categories read out in this way. If any of the combinations of the teacher signal and the recognized character categories agrees with some set of post-processed character category, then the incorrect recognition frequency of the post-processed character categories corresponding to the aforementioned combinations stored in the incorrect recognition frequency storage portion 2-91 is incremented by one. At this time, if the incorrect recognition frequency of this set of post-processed character categories exceeds an arbitrary permitted frequency, this set of post-processed character categories is produced to the character information modification portion 2-93. On receiving this set of post-processed character categories, the character information modification portion 2-93 modifies information about the reference sizes and reference positions of this set of post-processed character categories stored in the character information storage portion 2-50 according to information about the sizes and positions in the character pattern actually extracted by the character extraction portion 2-11. This method of modification is now described in further detail. In a set of post-processed character categories ($C_1$, $C_2$), such as "X" and "x", let $A_1$ be the width of the reference character pattern of the character category $C_1$ stored in the character information storage portion 2-50. Let $B_1$ be the reference character height. Let $H_1$ be information about the reference position. Let $A_2$ be the reference width of the character pattern of the character category $C_2$. Let $B_2$ be the reference character height. Let $H_2$ be information about the reference position. If the frequency at which $C_1$ is incorrectly recognized as $C_2$ exceeds a certain value, then information about the characters $(A_1, B_1, H_1)$ and $(A_2, B_2, H_2)$ in the corresponding character categories are modified as given by Eq. (2-19) according to information about characters $(a_1, b_1, h_1)$ and $(a_2, b_2, h_2)$ in the character categories of the previously applied character patterns:

$$A_1 = A_1 + \alpha(A_1 - a_1)$$
$$B_1 = B_1 + \beta(B_1 - b_1)$$
$$H_1 = H_1 + \gamma(H_1 - h_1)$$
$$A_2 = A_2 + \alpha(A_2 - a_2) \quad (2\text{-}19)$$
$$B_2 = B_2 + \beta(B_2 - b_2)$$
$$H_2 = H_2 + \gamma(H_2 - h_2)$$

where $\alpha$, $\beta$, and $\gamma$ are arbitrary real numbers.

In the character categories $C_1$ and $C_2$, the characters $(a_1, b_1, h_1)$ and $(a_2, b_2, h_2)$ which provide a basis for modification of character information are taken as the average value of character information of the previously applied character patterns.

In this way, in the present example, the information about the reference character sizes and reference positions of the character categories stored in the character information storage portion 2-50 and used by the post-recognition processing portion 2-15 to discriminate similar uppercases and lowercases such as "X" and "x" can be modified according to information about the sizes and positions in the actually applied character pattern. That is, recognition of a text image is performed on a real-time basis. Thus, the machine learns information about the sizes and positions of uppercases and lowercases which are similar to each other. Hence, the accuracy at which the post-recognition processing portion 2-15 discriminates between uppercases and lowercases which are similar to each other can be improved. In this way, accurate recognition performance can be accomplished.

Figure 3A:
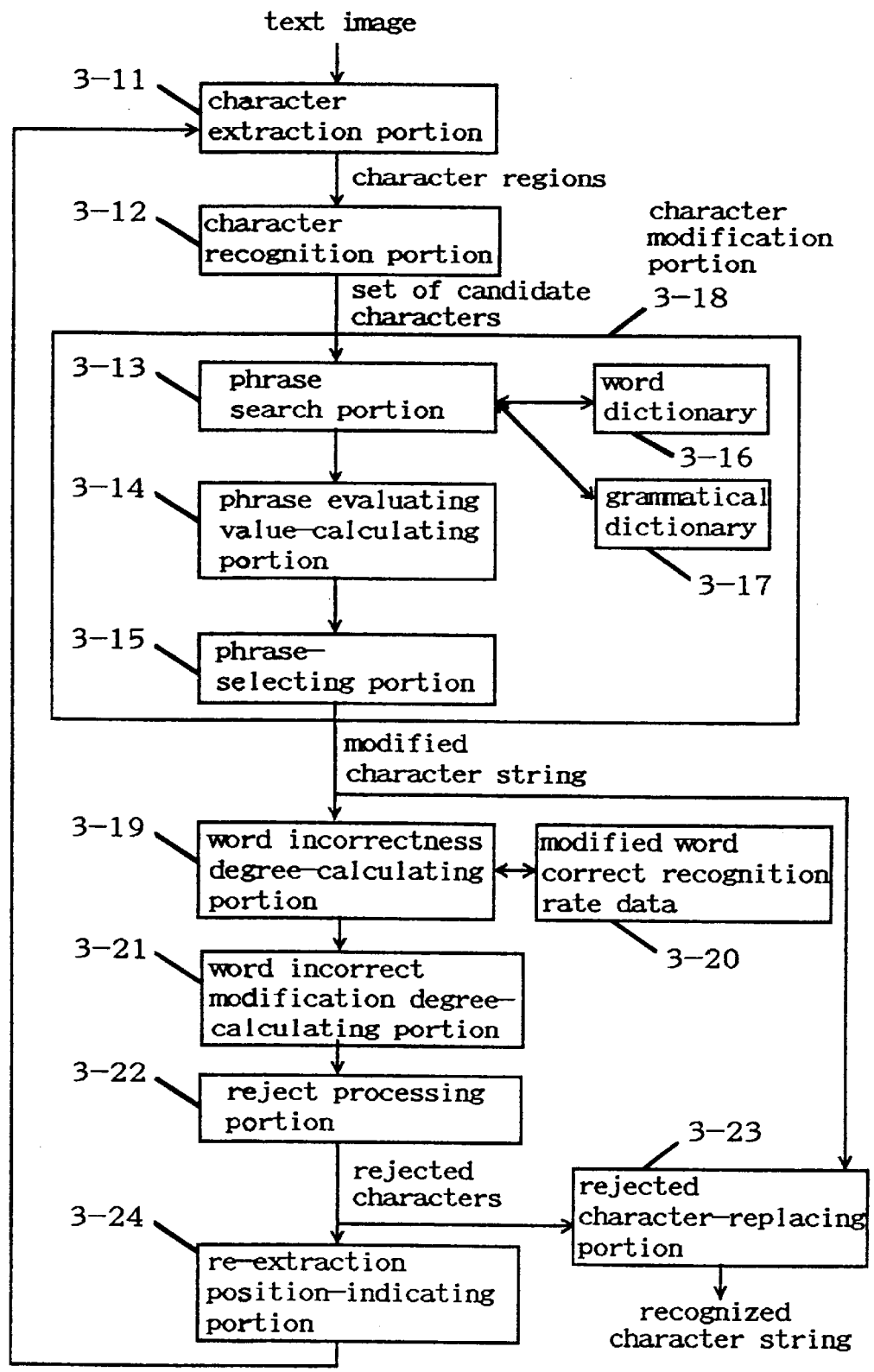
FIG. 3(a) is a diagram illustrating the structure of a third example of another character recognition machine according to the invention.
Figure 3B:
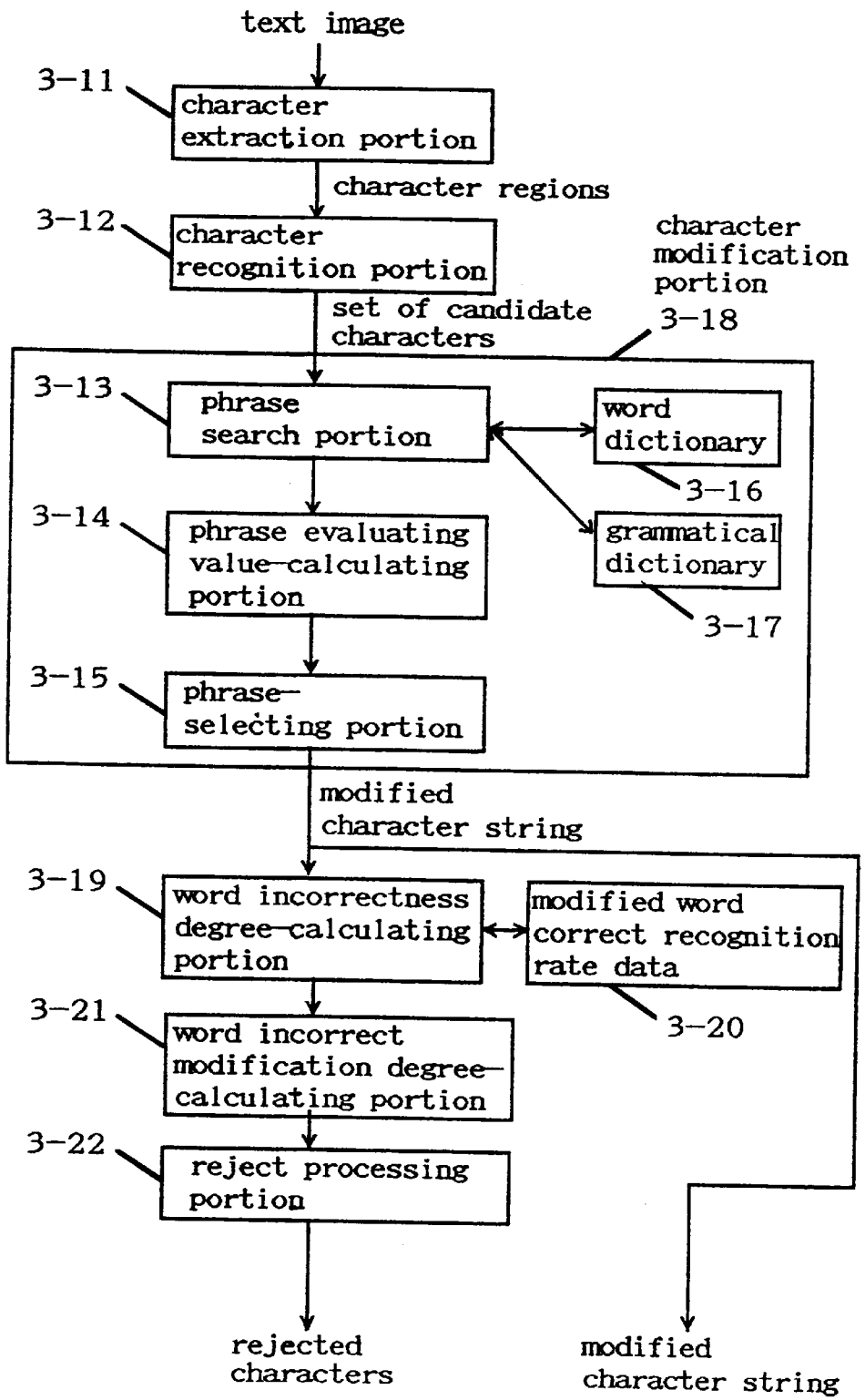
FIG. 3(b) is a diagram illustrating the structure of a first example of the character recognition machine described just above.

The language processing portion of the present invention is described now. A first example of this language processing portion is first described. The whole structure of this example of language processing portion is shown in FIG. 3(b).

A character extraction portion 3-11 extracts characters from a text image. Every character contained in the image is divided into plural regions. A character recognition portion 3-12 recognizes characters, based on the image of characters. The character recognition portion 3-12 produces a set of candidate characters including n candidate characters, from a first candidate character to an n-th candidate character, per character.

A phrase search portion 3-13 searches a word dictionary 3-16, selects a combination of candidate characters coincident with some words existing in the word dictionary 3-16 from combinations of sets of candidate characters, and selects a combination of words capable of forming a phrase by referring to a grammatical dictionary 3-17. A phrase evaluating value-calculating portion 3-14 calculates a value indicating the correctness of the phrase in terms of vocabulary and grammar, the phrase being searched by the phrase search portion 3-13. The calculation is performed, based on the lengths and the frequencies of words contained in the phrase. A phrase-selecting portion 3-15 selects that of the candidate phrases which has the greatest evaluation value, and delivers a modified character string.

A word incorrectness degree-calculating portion 3-19 calculates the degree of incorrect recognition of each word contained in the modified character string from the modified character string produced by the character modification portion 3-18 and also from the evaluation of each character contained in the modified character string made by the character recognition portion 3-12 by referring to modified word correct recognition rate data 3-20.

A word incorrect modification degree-calculating portion 3-21 calculates the degree (word incorrect modification degree) at which each word is incorrectly modified by the character modification portion 3-18, from the incorrect recognition degree of the word.

A word reject processing portion 3-22 determines words to be rejected according to word incorrect modification degrees and produces a signal indicating the positions of the rejected words.

The word recognition machine constructed as described above recognizes characters in the manner described now. First, a text image to be recognized is treated by the character extraction portion 3-11, which divides the image into regions for each individual character. The character recognition portion 3-12 recognizes each extracted character of the image and produces a set of candidate characters consisting of n candidate characters, from first to n-th candidate characters, per character.

The phrase search portion 3-13 searches the word dictionary 3-16 to select a combination of candidate characters coincident with some of words existing in the word dictionary 3-16, from combinations of sets of candidate characters. Furthermore, the search portion 3-13 selects a combination of words capable of forming a phrase by referring to the grammatical dictionary 3-17. The phrase evaluating value-calculating portion 3-14 then calculates a phrase-evaluating value from the lengths of words in the phrase, the frequencies of the words, and other factors. The phrase-evaluating value indicates the correctness of the phrase in terms of vocabulary and grammar. With respect to the candidate phrase for which the phrase-evaluating value has been calculated, the phrase-selecting portion 3-15 selects a correct combination of phrases, based on the phrase-evaluating value, and produces a modified character string.

The word incorrectness degree-calculating portion 3-19 calculates a word incorrect recognition degree from the modified character string produced by the character modification portion 3-18 and also from the evaluation of each character contained in the modified character string made by the character recognition portion 3-12. The modified word correct recognition rate data 3-20 has statistical data indicating which words have been correctly modified on modifications of characters by the character modification portion 3-18. The modified word correct recognition rate data 3-20 has statistical data indicating the probabilities that words are correctly amended in association with the number of characters of the amended word, the number of amended characters (i.e., the number of characters produced as amended characters other than the first candidate characters) and the kinds of the words constituting the word. Table 3-1 indicates data on correctness percents of words amended by a character modification portion used in an experiment.

TABLE 3-1

Correctness Percents of Modified Words

| number of characters of word | number of modified characters | kinds of characters | correctness percent (%) |
|---|---|---|---|
| 3 | 1–3 | kanji, kana | 91.5 |
| 2 | 2 | kanji + kanji | 50.9 |
|  |  | kana + kana | 9.1 |
|  |  | kanji + kana | 0.0 |
|  | 1 | kanji + kanji | 89.9 |
|  |  | kana + kana | 58.0 |
|  |  | kanji + kana | 50.6 |
| 1 | 1 | kanji | 14.9 |
|  |  | kana | 28.7 |

The word incorrectness degree-calculating portion 3-19 calculates the word incorrectness degree Pw (i.e., the degree at which the word w is incorrect) of each word w produced from the character modification portion 3-18 from the modified word correct recognition rate data 3-20 and from the evaluation of each character contained in the word, the evaluation being made by the character recognition portion 3-12. For example, the incorrect recognition degree Pw of the word w can be calculated according to Eq. (3-1).

$$Pw=(100-(\text{correctness percent of the kind to which the word w belongs in the modified word correct recognition rate data 3-20}))\times(\text{difference of evaluation value by the character recognition portion 3-12 between amended character and first candidate character}) \quad (3\text{-}1)$$

Eq. (3-1) indicates that the word incorrectness degree is calculated in such a way that a word having a higher correctness percent in the modified word correct recognition rate data has a smaller word incorrectness degree Pw and that as the difference of evaluation value by the character recognition portion 3-12 between the amended character and the evaluation value of the first candidate character increases, the word incorrectness degree Pw increases.

Since the incorrectness degree of the amended word is calculated, based on statistical data created, depending on the number of characters contained in each word, on the number of characters amended in words, and on the kinds of characters of words, the incorrectness degree reflects the probability that each amended word is incorrect.

The word incorrect modification degree-calculating portion 3-21 calculates the word incorrect amendment degree Cw of each word w from the word incorrectness degree. In particular, this word incorrect amendment degree Cw of a word w is calculated from the word incorrectness degree Pw−1 of the previous word w−1 and from the word incorrectness degree Pw+1 of the following word w+1. For instance, the incorrect amendment degree Cw of a word w can be calculated according to Eq. (3-2).

$$Cw=Pw+(Pw-1+Pw+1)\times 0.5 \quad (3\text{-}2)$$

Eq. (3-2) indicates that the incorrect amendment degree of the word w increases as the incorrectness degrees of the words located before and behind, respectively, the word w increase. There exist three major causes of incorrect amendment of a word: (1) incorrect extraction of characters from a text image; (2) some characters are not contained in the candidate characters, i.e., no correct characters are contained in the set of candidate characters represented by the output from the character recognition portion 3-12; and (3) some words are not registered in the word dictionary 3-16. If such causes exist, it is impossible for the phrase search portion 3-13 to search the phrases containing characters and words causing incorrect amendments for correct words. Therefore, adjacent words are incorrectly amended, thus deteriorating the recognition rate. Consequently, the incorrect amendment degree of each word can be correctly calculated by examining the words located before and behind the word for which the word incorrect amendment degree should be found.

The word reject processing portion 3-22 inspects the word incorrect amendment degree of each word. If this degree is in excess of a certain threshold value, then characters contained in the word are delivered as rejected characters.

The word incorrect modification degree-calculating portion 3-21 of the present example makes it possible to estimate incorrectly amended locations from the modified character string. This enables words to be rejected. Hence, an amendment operation subsequent to a character recognition operation can be performed efficiently.

Figure 3C:
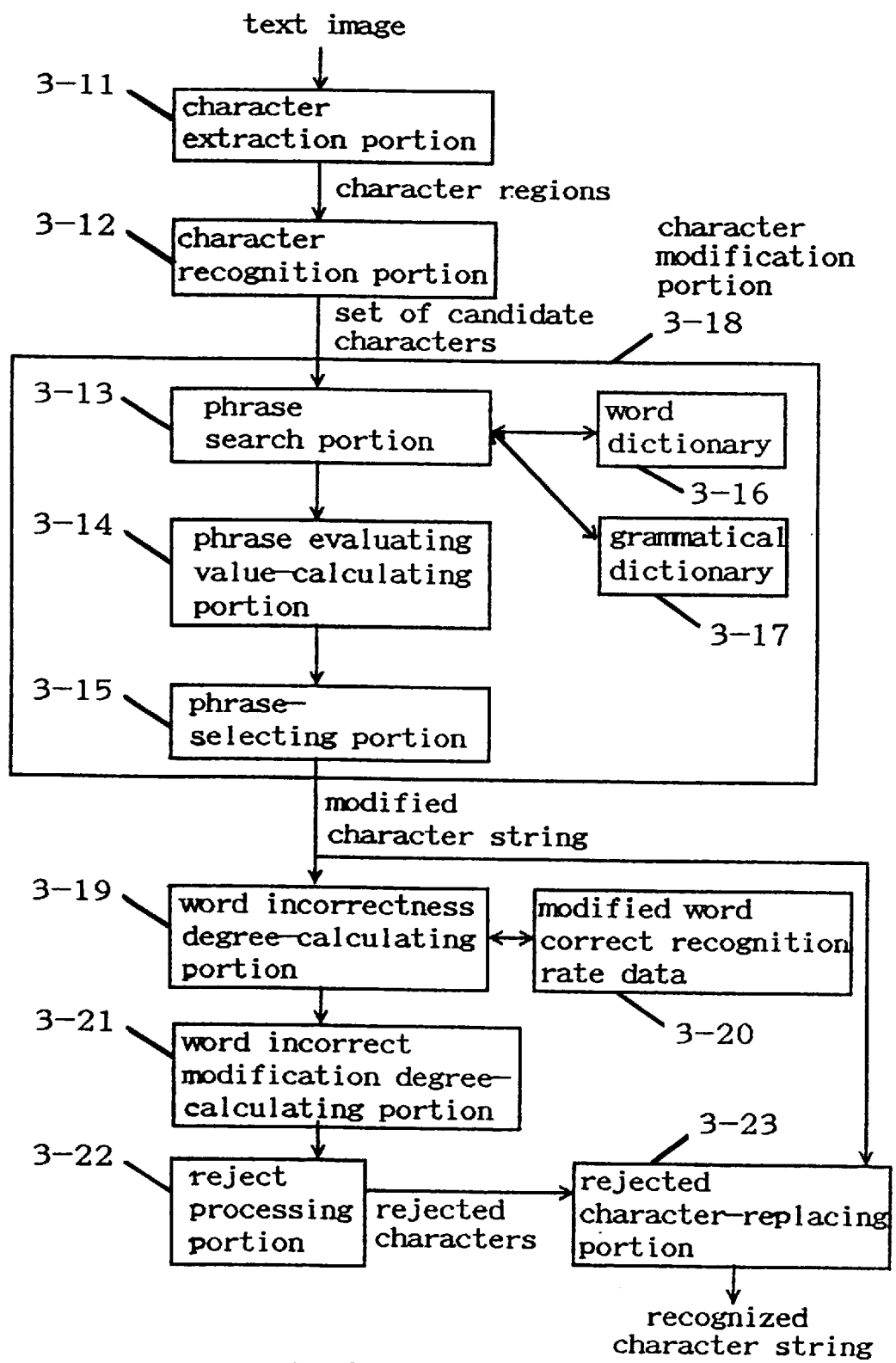
FIG. 3(c) is a diagram illustrating the structure of a second example of the character recognition machine described just above.

A second example of the language processing portion according to the present invention is described below. FIG. 3(c) shows the whole structure of this example of character recognition machine.

This machine has a character extraction portion 3-11, a character recognition portion 3-12, a character modification portion 3-18, a word incorrectness degree-calculating portion 3-19, modified word correct recognition rate data 3-20, a word incorrect modification degree-calculating portion 3-21, and a word reject processing portion 3-22 which are the same as their respective counterparts of the first example.

A reject character-replacing portion 3-23 receives each rejected character from the reject processing portion 3-22 and replaces the rejected character in the modified character string by the first candidate character produced by the character recognition portion 3-12.

The character recognition machine constructed as described above recognizes characters in the manner described below. First, a text image to be recognized is treated by the character extraction portion 3-11, which divides the image into regions for each individual character. The character recognition portion 3-12 recognizes each extracted character of the image and produces a set of candidate characters consisting of n candidate characters, from first to n-th candidate characters, per character.

The phrase search portion 3-13 searches the word dictionary 3-16 to select a combination of candidate characters coincident with some of the words existing in the word dictionary 3-16, from combinations of sets of candidate characters. Furthermore, the search portion 3-13 selects a combination of words capable of forming a phrase by referring to the grammatical dictionary 3-17. The phrase evaluating value-calculating portion 3-14 then calculates a phrase-evaluating value from the lengths of words in the phrase, the frequencies of the words, and other factors. The phrase-evaluating value indicates the correctness of the phrase in terms of vocabulary and grammar. With respect to the candidate phrase for which the phrase-evaluating value has been calculated, the phrase-selecting portion 3-15 selects a correct combination of phrases, based on the phrase-evaluating value, and produces a modified character string.

The word incorrectness degree-calculating portion 3-19 calculates word incorrectness degrees in the same way as in the first example. The word incorrect modification degree-calculating portion 3-21 calculates word incorrect amendment degrees in the same way as in the first example.

The word reject processing portion 3-22 inspects the word incorrect amendment degree of each word. If this degree is in excess of a certain threshold value, then characters contained in the word are delivered as rejected characters.

The rejected character-replacing portion 3-23 replaces the rejected characters in the modified amended character string by the first candidate character produced by the character recognition portion 3-12, and produces the replaced characters as a recognized character string.

Some results of character recognition performed in the present example are shown in FIG. 3(d). In column (1) of this figure, characters "正確な" ("accurate" in Japanese) were to be recognized. However, the character "確" was not contained in a set of candidate characters. As a result, the modified character string was "5 枚だ" ("5" in Japanese). In response to this modified character string, the word reject processing portion 3-22 rejected all of the three characters. The rejected character-replacing portion 3-23 replaced the rejected characters contained in the amended character string by the first candidate characters. As a result, the recognized character string was "正磁な".

In column 2 of FIG. 3(d), the characters of "ユーラシア大陸に" ("in the Eurasian Continent" in Japanese) were to be recognized. Since the word "ユーラシア" ("Eurasian") is not contained in the word dictionary 3-16, the modified character string was "ニーラン７人陸に". In response to this modified character string, the word reject processing portion 3-22 rejected all of the 6 characters of "ニーラン７人". The rejected character-replacing processing portion 3-23 replaced the rejected characters contained in the amended character string by the first candidate characters. As a result, the recognized character string was "ユーラシア大陸に". In this way, by replacing rejected characters with the first candidate characters selected by the character recognition portion 3-12, deterioration in the character recognition rate due to erroneous correction can be prevented, even if some words are not contained in the candidate character set or have not been registered in the word dictionary 3-16.

A third example of the language processing portion according to the present invention is described below. FIG. 3(a) shows the whole structure of this example of character recognition machine.

This machine has a character extraction portion 3-11, a character recognition portion 3-12, a character modification portion 3-18, a word incorrectness degree-calculating portion 3-19, modified word correct recognition rate data 3-20, a word incorrect modification degree-calculating portion 3-21, a word reject processing portion 3-22, and a rejected character-replacing portion 3-23 which are the same as their respective counterparts of the first example.

A re-extraction position-indicating portion 3-24 inspects those regions of rejected characters which are included in a text image, and informs the character extraction portion 3-11 of re-extraction positions.

The character recognition machine constructed as described above recognizes characters in the manner described below. First, a text image to be recognized is treated by the character extraction portion 3-11, which divides the image into regions for each individual character. The character recognition portion 3-12 recognizes each extracted character of the image and produces a set of candidate characters consisting of n candidate characters, from first to n-th candidate characters, per character.

The phrase search portion 3-13 searches the word dictionary 3-16 to select a combination of candidate characters coincident with some of the words existing in the word dictionary 3-16, from combinations of sets of candidate characters. Furthermore, the search portion 3-13 selects a combination of words capable of forming a phrase by referring to the grammatical dictionary 3-17. The phrase evaluating value-calculating portion 3-14 then calculates a phrase-evaluating value from the lengths of words in the phrase, the frequencies of the words, and other factors. The phrase-evaluating value indicates the correctness of the phrase in terms of vocabulary and grammar. With respect to the candidate phrase for which the phrase-evaluating value has been calculated, the phrase-selecting portion 3-15 selects a correct combination of phrases, based on the phrase-evaluating value, and produces a modified character string.

The word incorrectness degree-calculating portion 3-19 calculates a word incorrectness degree in the same way as in the first example. The word incorrect modification degree-calculating portion 3-21 calculates a word incorrect amendment degree in the same way as in the first example.

The word reject processing portion 3-22 inspects the word incorrect amendment degree of each word. If this degree is in excess of a certain threshold value, then characters contained in the word are delivered as rejected characters.

The re-extraction position-indicating portion 3-24 checks those regions of the rejected characters which are contained in the text image, and informs the character extraction portion 3-11 of the positions. The character extraction portion 3-11 divides characters into character regions different from the character regions obtained by the first extraction. The character recognition portion 3-12 recognizes characters for each extracted character of the image in the newly extracted character region. The recognition portion 3-12 produces a set of candidate characters comprising n candidate characters, from first to n-th candidate characters, per character.

The set of candidate characters initially recognized is combined with the set of candidate characters recognized from the text region corresponding to rejected characters. Then, the phrase search portion 3-13 searches the word dictionary 3-16, selects combinations of candidate characters coincident with some words existing in the word dictionary 3-16, and selects a combination of words capable of forming a phrase by referring to the grammatical dictionary 3-17. The phrase evaluating value-calculating portion 3-14 then calculates a phrase-evaluating value from the lengths of words in the phrase searched by the phrase search portion 3-13, the frequencies of the words, and other factors. The phrase-evaluating value indicates the correctness of the phrase in terms of vocabulary and grammar. With respect to the candidate phrase for which the phrase-evaluating value has been calculated, the phrase-selecting portion 3-15 selects a correct combination of phrases, based on the phrase-evaluating value, and produces a modified character string.

The word incorrectness degree-calculating portion 3-19 calculates a word incorrect recognition degree in the same way as in the first example. The word incorrect modification degree-calculating portion 3-21 calculates a word incorrect amendment degree in the same way as in the first example.

The word reject processing portion 3-22 inspects the word incorrect amendment degree of each word. If this degree is in excess of a certain threshold value, then characters contained in the word are delivered as rejected characters.

The rejected character-replacing portion 3-23 replaces the rejected characters in the amended character string by the first candidate characters selected by the character recognition portion 3-12, and produces the replaced characters as a recognized character string.

Some results of character recognition performed in the present example are shown in FIG. 3(*e*). In this figure, "1000 字" ("1000 characters" in Japanese) is a correct character string. The character extraction portion 3-11 initially extracted "10" and "00" as one-character regions. Therefore, the initially modified character string was "刈皿字". In response to this, the reject processing portion 3-22 rejected all three characters. The character extraction portion 3-11 again extracted character regions corresponding to these rejected characters. As a result, all the characters contained in "1000 字" could be correctly extracted. A character string modified in response to this extraction was "1000 字". Furthermore, none of the characters of the modified character string were rejected. As a recognized character string, "1000 字" was produced. In this way, the correct character string could be delivered as a recognized character string. Thus, even if characters are extracted incorrectly at first, they can be correctly extracted by again extracting character regions corresponding rejected characters and performing processing. Therefore, the extraction operation results in less errors. This improves the recognition rate of characters.

In the present example, rejected characters are determined from a modified character string once processed by the character modification portion 3-18. The regions of the rejected characters are subjected to re-extraction processing. A set of candidate characters is created from the results of the re-extraction. Based on this set of candidate characters, a modified character string and a recognized character string are delivered. The regions of the rejected characters produced according to the results may also be subjected to re-extraction processing.

As described already, in these examples, rejected characters can be obtained from a modified character string and from an evaluation of each character made by the character recognition portion 3-12. The regions of the rejected characters are subjected to re-extraction processing. This reduces extraction error. Also, by replacing the rejected characters with the first candidate characters selected by the character recognition portion 3-12, the character recognition portion 3-12 is prevented from erroneously amending characters even if correct characters are not contained in the candidate character set or have not been registered in the word dictionary 3-16. This improves the character recognition rate.

A fourth example of the language processing portion according to the present invention is described below. FIG. 4(*a*) shows the whole structure of this example of the character recognition machine. A character recognition portion 4-1 recognizes characters in a text image 4-10, using a recognition dictionary 4-16. The recognition portion 4-1 produces a set of candidate characters comprising n candidate characters, from first to n-th candidate characters, per character.

A word search portion 4-2 searches the word dictionary 4-6, selects a set of candidate words 4-12 from combinations of candidate characters 4-11 forming an assemblage. The set of candidate words 4-12 constitutes combinations of words existing in the word dictionary 4-6 and candidate characters coincident with the words. A phrase search portion 4-3 selects a set of candidate phrases 4-13 forming a possible phrase from the set of candidate words 4-12 by referring to a grammatical dictionary 4-7. A phrase evaluating value-calculating portion 4-4 then calculates the phrase-evaluating value of the phrase searched by the phrase search portion 4-3 from the lengths of words in the phrase, the frequencies of the words, and other factors. The phrase-evaluating value indicates the correctness of the phrase in terms of vocabulary and grammar. A phrase-selecting portion 4-5 selects a phrase having the greatest evaluated value from candidate phrases, and produces a modified character string 4-14.

A candidate character comparator portion 4-9 compares the modified character string 4-14 with the set of candidate words 4-11, extracts characters differing between the modified character string and the first candidate characters of the set of candidate characters, and sends the extracted characters as additional learning characters 4-15 to the character recognition portion 4-1.

The character recognition machine built in this way recognizes characters in the manner described now. First, the character recognition portion 4-1 recognizes characters in the text image 4-10, using the recognition dictionary 4-16. The recognition portion 4-1 produces a set of candidate characters comprising n candidate characters, from first to n-th candidate characters, per character.

The word search portion 4-2 searches the word dictionary 4-6, selects a set of candidate words 4-12 from combinations of candidate characters 4-11 forming an assemblage. The set of candidate words 4-12 constitutes combinations of words existing in the word dictionary 4-6 and candidate characters agreeing with the words. The phrase search portion 4-3 selects a set of candidate phrases 4-13 forming a possible phrase from the set of candidate words 4-12 by referring to a grammatical dictionary 4-7. The phrase evaluating value-calculating portion 4-4 then calculates the phrase-evaluating value of the phrase searched by the phrase search portion 4-3 from the lengths of words in the phrase, the frequencies of the words, and other factors. The phrase-evaluating value indicates the correctness of the phrase in terms of vocabulary and grammar. The phrase-selecting portion 4-5 selects a correct combination of phrases from the candidate phrases about which the phrase-evaluating values have been found, based on these phrase-evaluating values. The selected correct combination is sent to the modified character string 4-14.

The candidate character comparator portion 4-9 compares the modified character string 4-14 with the set of candidate characters 4-11. The characters in the modified character string are compared with the first candidate characters of the set of candidate characters in the same character positions. If two compared characters differ, they are produced as additional learning characters 4-15.

The character recognition portion 4-1 receives the additional learning characters 4-15 and adds these additional characters 4-15 to the recognition dictionary 4-16 so that the additional learning characters may be recognized from the character image of the additional learning characters and from the characters in the modified character string. The addition of the additional characters to the recognition dictionary makes it possible that characters which could not be recognized by the first character recognition are recognized.

The addition of the additional learning characters 4-15 to the recognition dictionary 4-16 in the character recognition portion 4-1 may be implemented by fabricating the character recognition portion 4-1 out of a neural network and varying the weights added to the network according to additional learning.

In the present example, the candidate character comparator portion 4-9 compares the modified character string with the first candidate characters. Alternatively, modified characters are compared with the m-th candidate characters ($1 \leq m \leq i < n$). If the modified characters are not contained in i candidate characters, then the modified characters are delivered as additional learning characters 4-15.

Figure 4A:
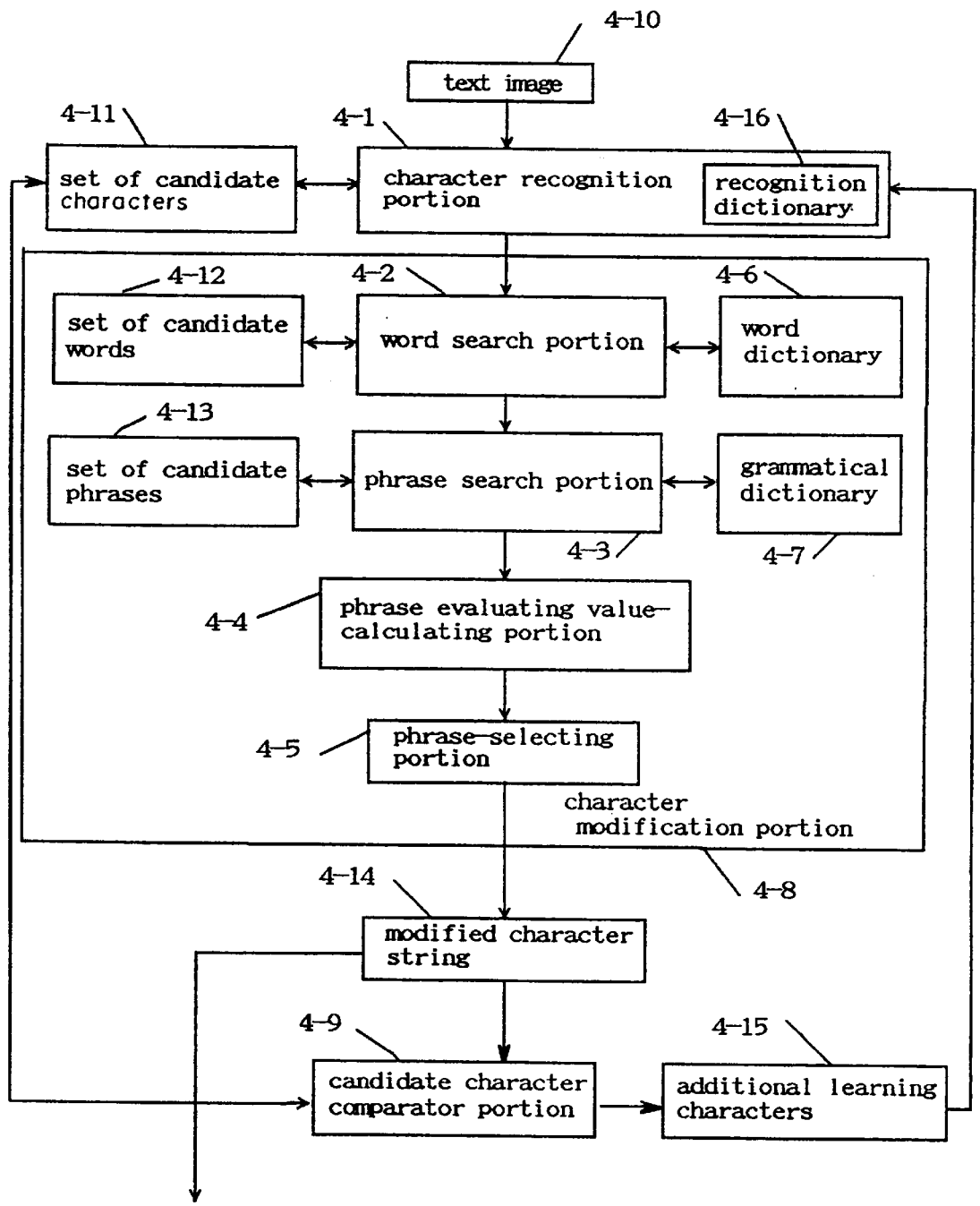
FIG. 4(a) is a diagram illustrating the structure of a first example of a further character recognition machine according to the invention.
Figure 4B:
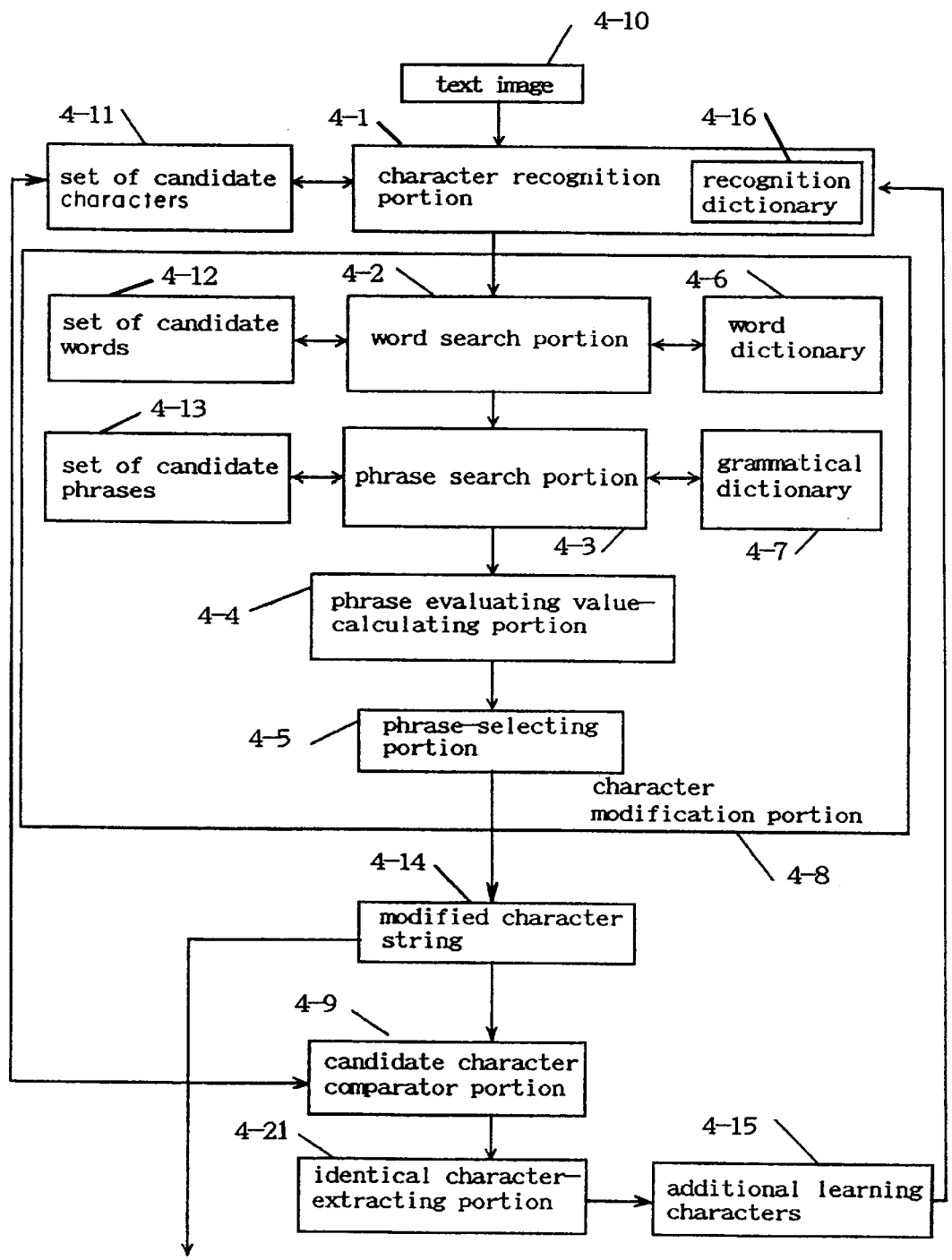
FIG. 4(b) is a diagram illustrating the structure of a second example of the further character recognition machine according to the invention.

A fifth example of the language processing portion according to the present invention is described below. FIG. 4(b) shows the whole structure of this example of character recognition machine.

This machine has a word recognition portion 4-1, a word search portion 4-2, a phrase search portion 4-3, a phrase evaluating value-calculating portion 4-4, a phrase-selecting portion 4-5, and a candidate character comparator portion 4-9, in the same way as in the first example.

An identical character-extracting portion 4-21 extracts an identical character from characters produced from the candidate character comparator portion. If this character is contained in different words, this character is delivered as an additional learning character 4-15.

The character recognition machine built in this way recognizes characters in the manner described now. First, the character recognition portion 4-1 recognizes characters in the text image 4-10, using the recognition dictionary 4-16. The recognition portion 4-1 produces a set of candidate characters comprising n candidate characters, from first to n-th candidate characters, per character.

The word search portion 4-2 searches the word dictionary 4-6 and selects a set of candidate words 4-12 from combinations of words included in the candidate character set 4-11, the set of candidate words 4-12 being combinations of words coincident with some words existing in the word dictionary 4-6. The phrase search portion 4-3 selects a combination of words, or set of candidate phrases 4-13, capable of forming a phrase from the set of candidate words 4-12 by referring to the grammatical dictionary 4-7. The phrase evaluating value-calculating portion 4-4 then calculates a phrase-evaluating value from the lengths of words in the phrase, the frequencies of the words, and other factors. The phrase-evaluating value indicates the correctness of the phrase in terms of vocabulary and grammar. With respect to the candidate phrase for which the phrase-evaluating value has been calculated, the phrase-selecting portion 4-5 selects a correct combination of phrases, based on the phrase-evaluating value, and produces the modified character string 4-14.

The candidate character comparator portion 4-9 compares the modified character string 4-14 with the set of candidate characters 4-11. The characters in the modified character string and the first candidate characters of the set of candidate characters in the same positions are compared. Different characters are delivered.

Figure 4C:
FIG. 4(c) is a diagram illustrating the output from an identical character extracting portion of the second example of the further character recognition machine according to the invention.
Figure 4H:
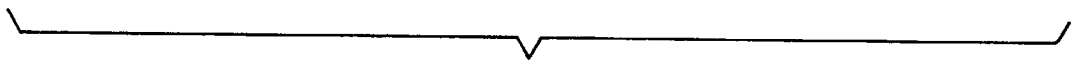
FIG. 4(h) is a diagram illustrating a character species determining portion according to the invention.

The identical character-extracting portion 4-21 extracts identical characters from the characters produced from the candidate character comparator portion 4-9. If these identical characters are contained in different words, these characters are produced as additional learning characters 4-15. For example, when the character modification portion 4-8 produces a modified character string as shown in FIG. 4(c), the candidate character comparator portion 4-9 produces "文" of "文章" ("sentence" in Japanese), "認" of "認識" ("recognition"), "文" of "文法" ("grammar"), and "正" of "訂正" ("amendment"). Because "文" of "文章" and "文" of "文法" are the same character and because they are contained in different words, the identical character-extracting portion produces "文" as additional learning character 4-15.

The character recognition portion 4-1 receives the additional learning character 4-15 and adds this character 4-15 to the recognition dictionary 4-16 so that the additional learning character can be recognized, based on the image of the additional learning character and on the characters of the modified character string.

Thus, characters which would not be recognized initially by the character recognition portion 4-1 can be recognized by the addition of the characters to the recognition dictionary.

The addition of the learning characters 4-15 to the recognition dictionary 4-16 in the character recognition portion 4-1 may be implemented by fabricating the character recognition portion 4-1 out of a neural network and varying the weights added to the network according to additional learning.

In the present example, the candidate character comparator portion 4-9 compares the modified character string with the first candidate characters. Alternatively, modified characters are compared with the m-th candidate characters ($1 \leq m \leq i < n$). If the modified characters are not contained in i candidate characters, then the modified characters are delivered as additional learning characters 4-15.

Figure 4D:
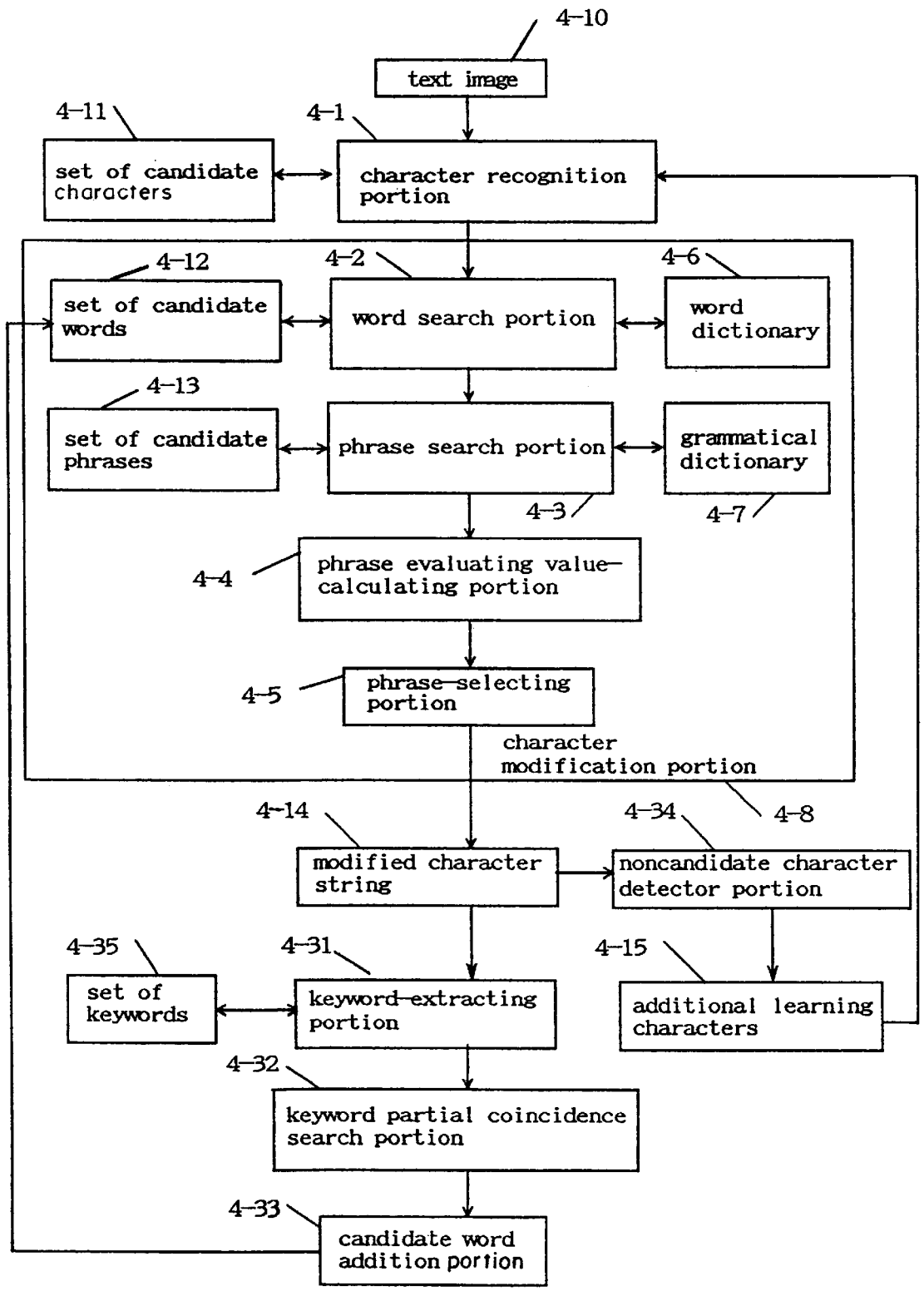
FIG. 4(d) is a diagram illustrating the structure of a third example of the further character recognition machine according to the invention.

A sixth example of the language processing portion according to the present invention is described below. FIG. 4(d) shows the whole structure of this example of the character recognition machine.

This machine has a word search portion 4-2, a phrase search portion 4-3, a phrase evaluating value-calculating portion 4-4, and a phrase-selecting portion 4-5 which are the same as their respective counterparts of the first example.

Figure 4E:
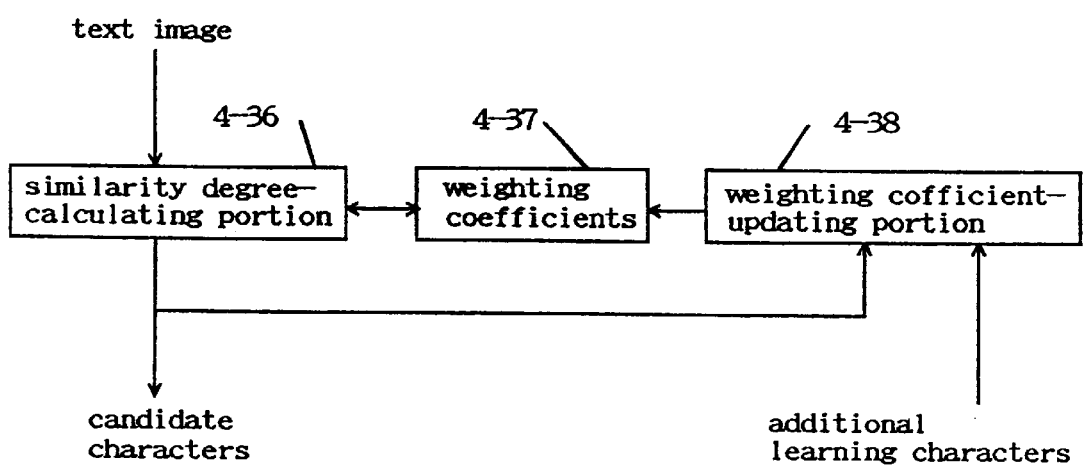
FIG. 4(e) is a diagram of a character recognition portion according to the invention.
Figure 4F:
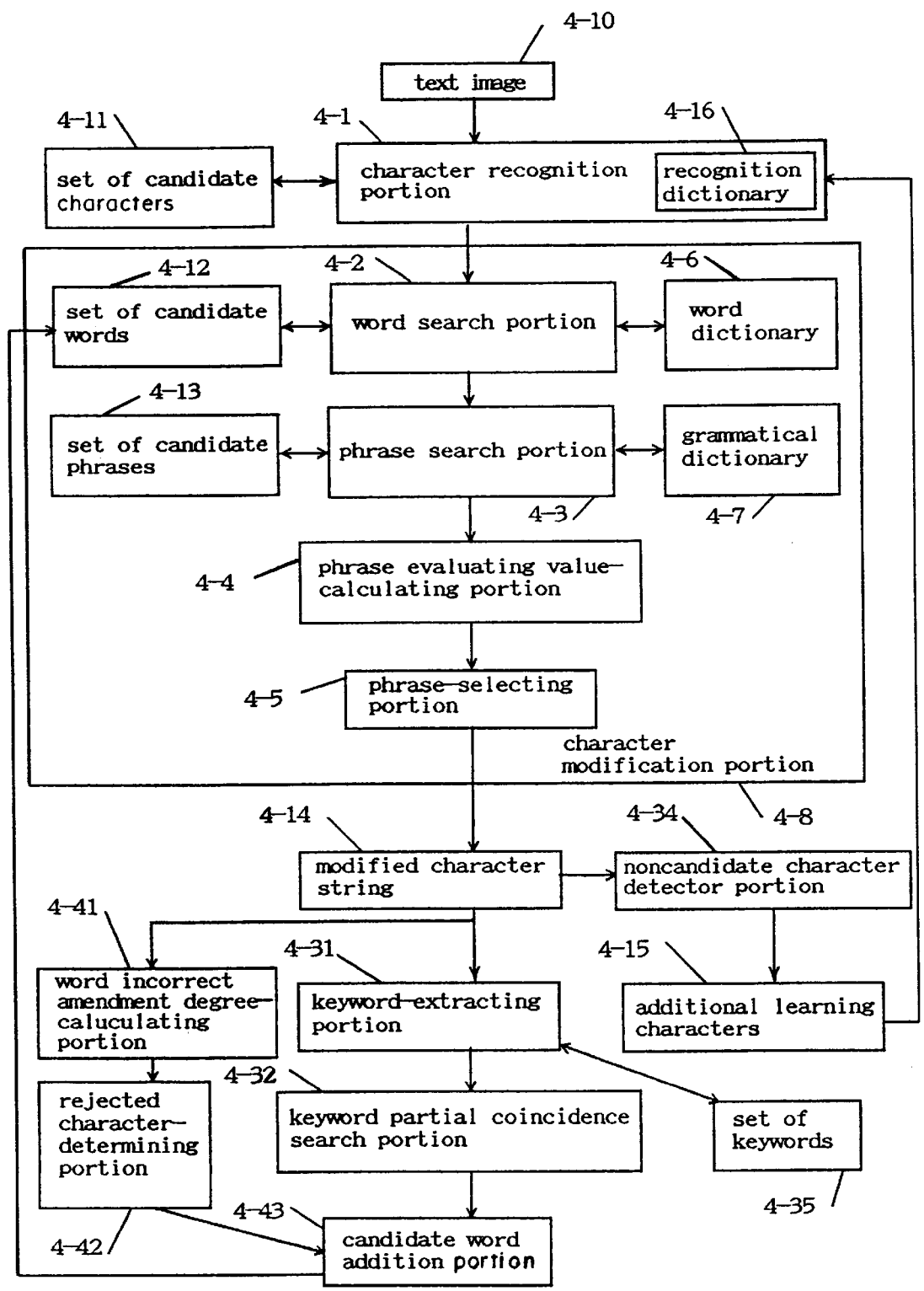
FIG. 4(f) is a diagram illustrating the structure of a fourth example of a character recognition machine according to the invention.
Figure 4G:
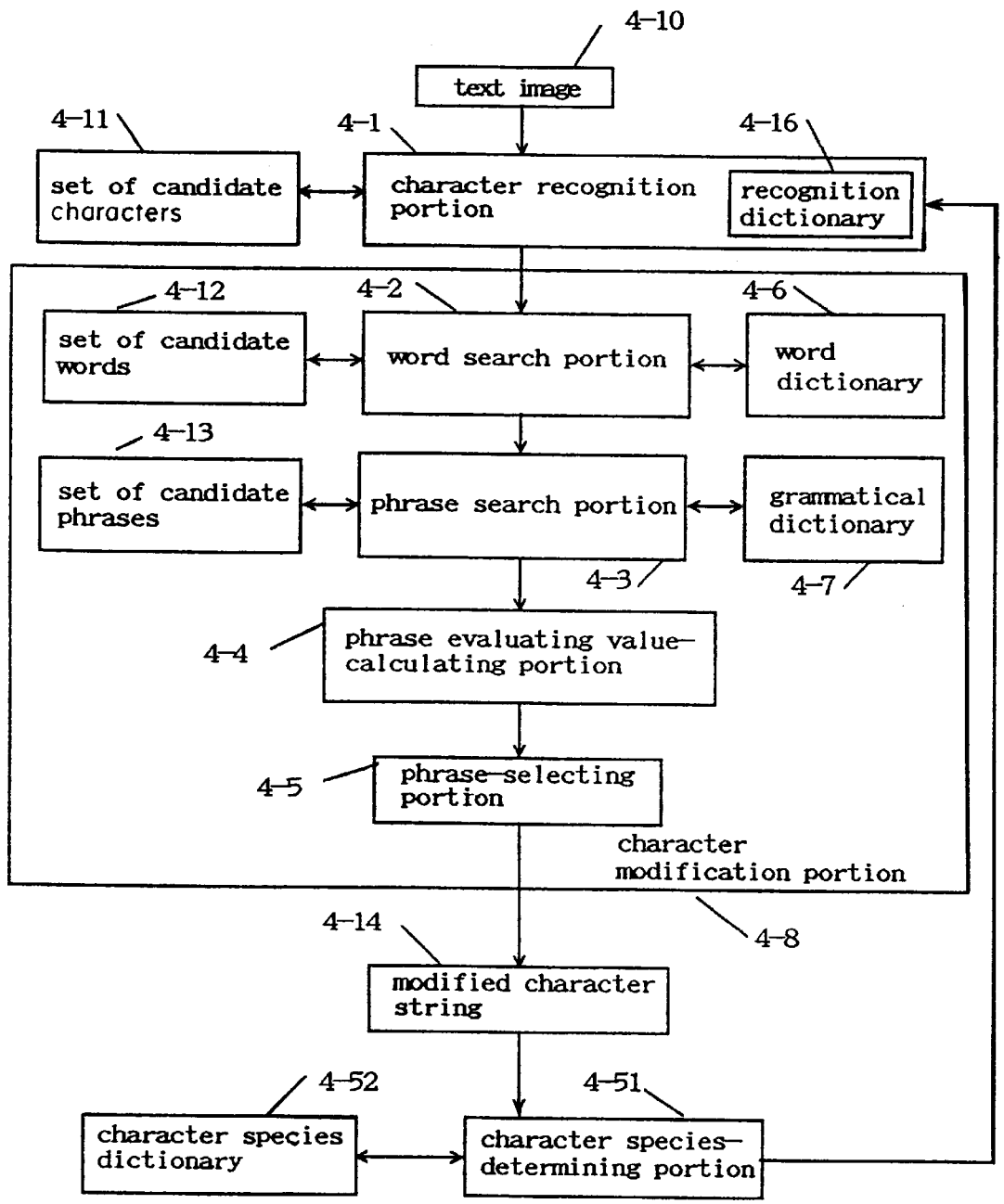
FIG. 4(g) is a diagram illustrating the structure of a fifth example of character recognition machine according to the invention.
Figure 5:
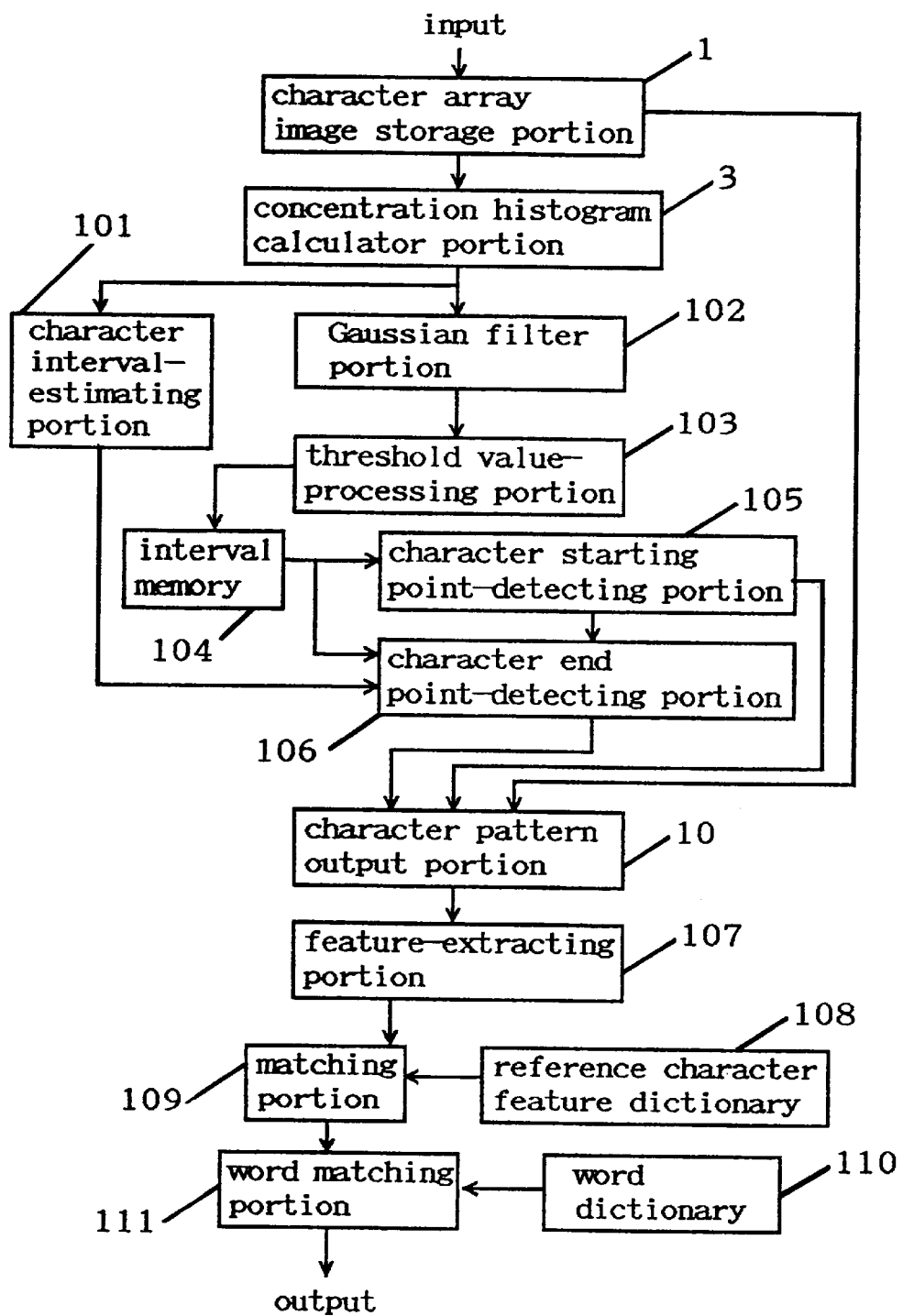
FIGS. 5 through 8 are block diagrams of a conventional character recognition machines.
Figure 6:
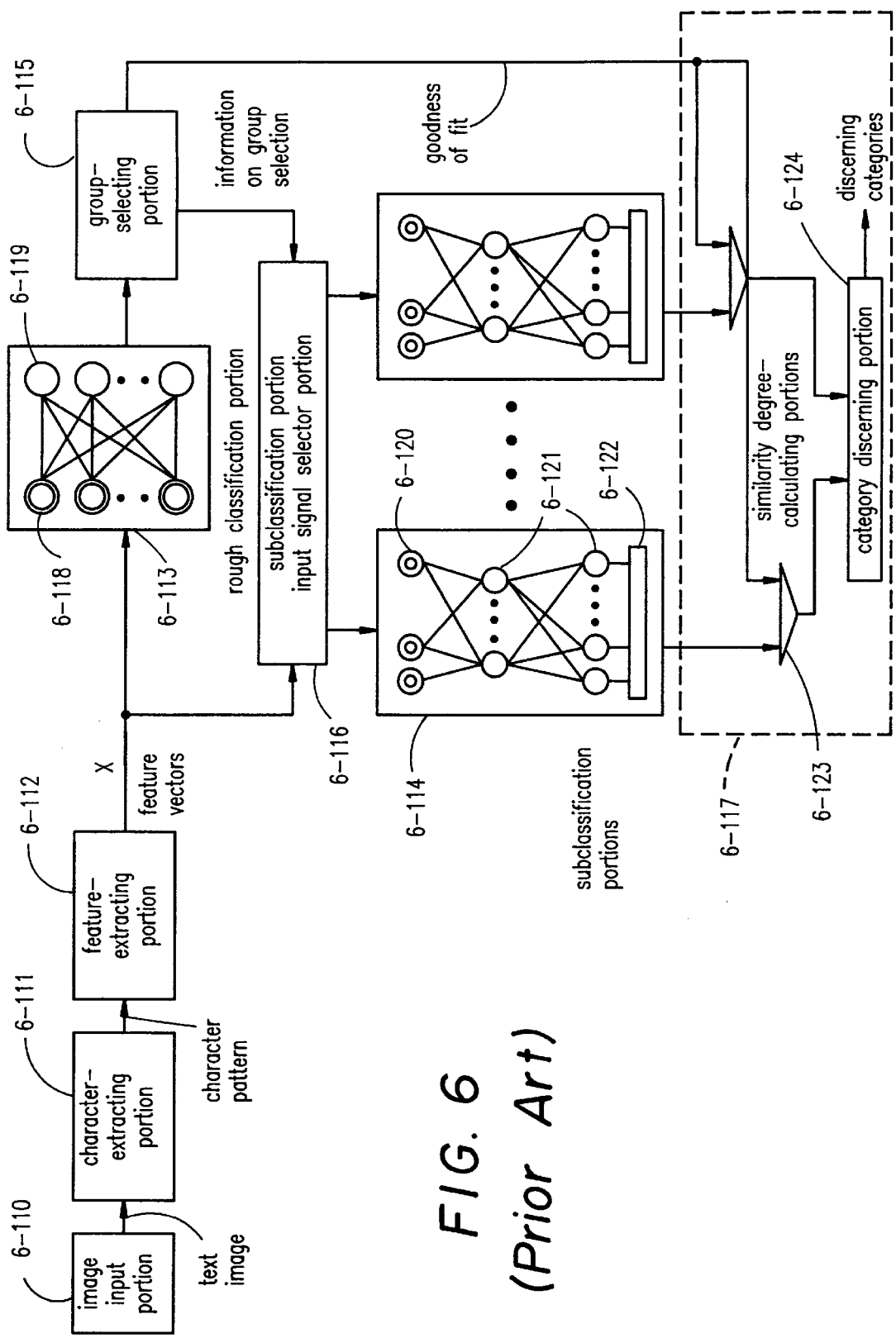
Figure 7:
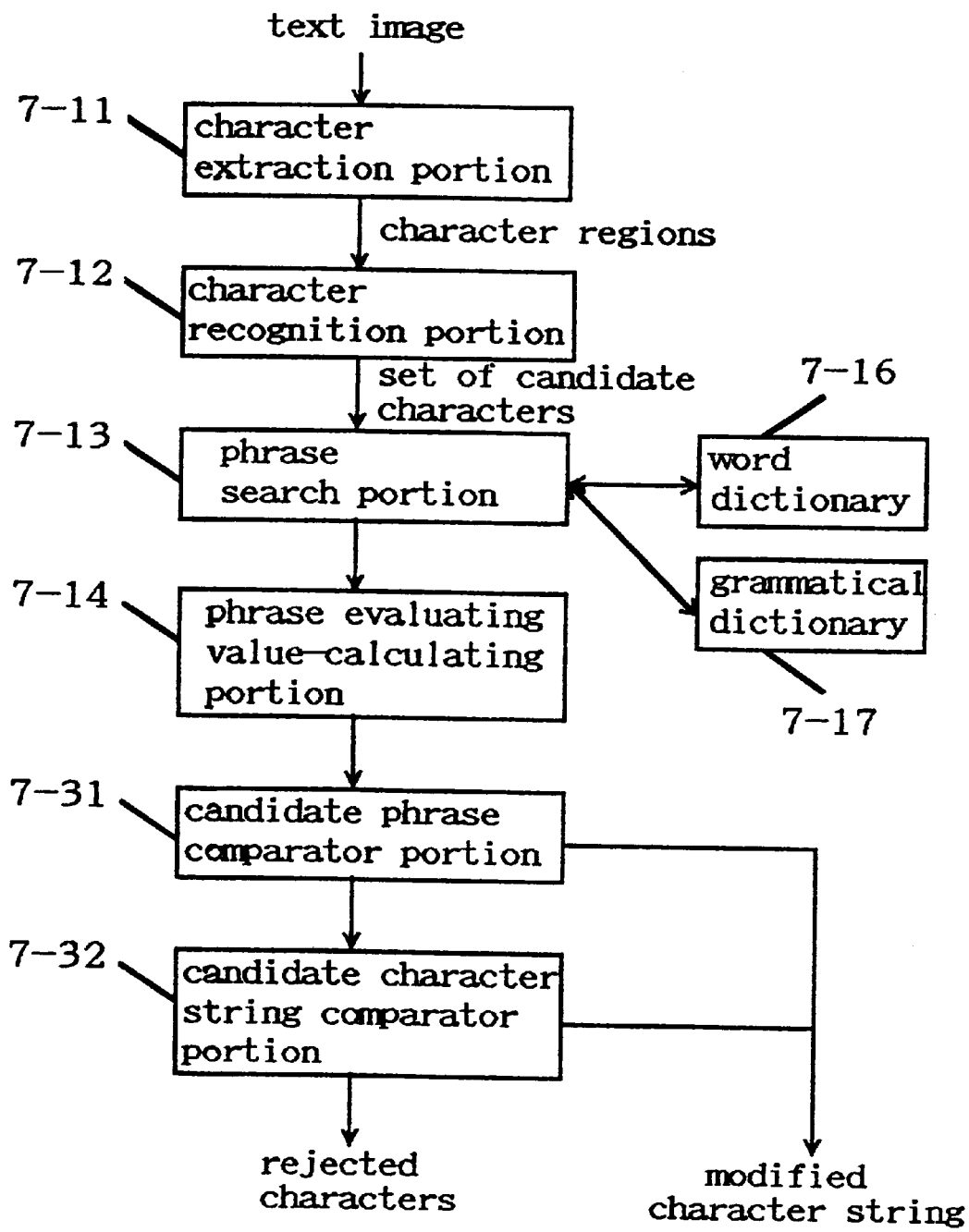
Figure 8:
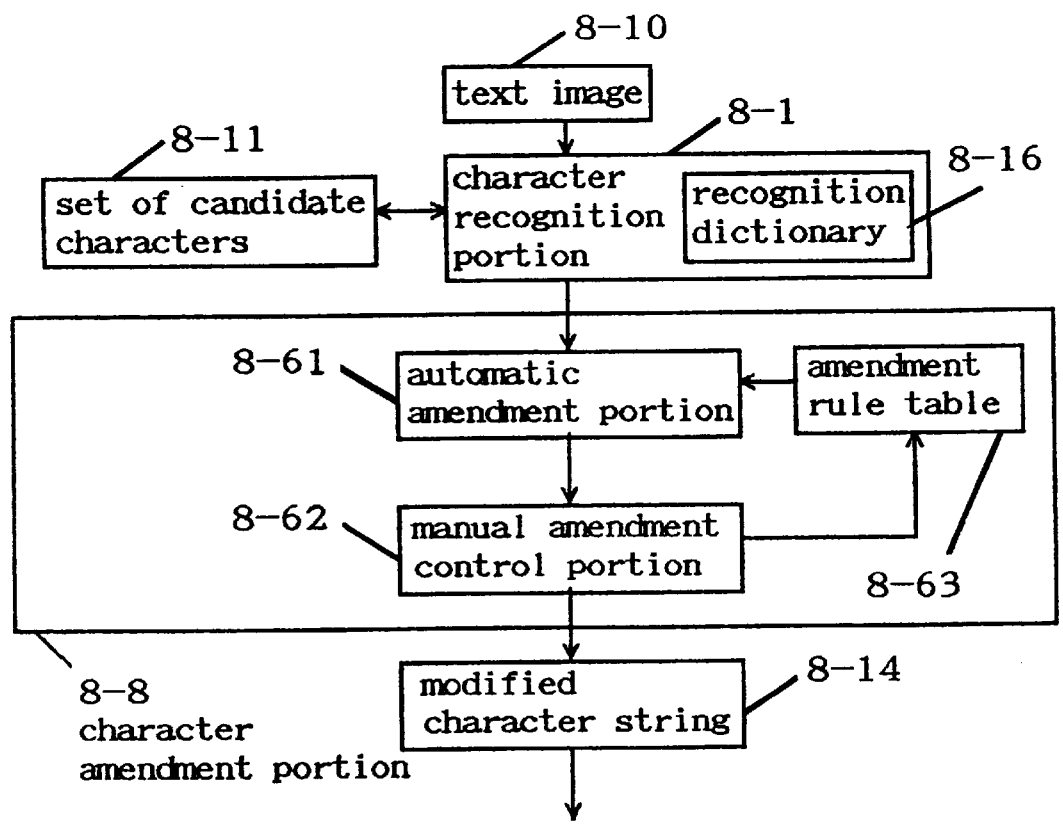

FIG. 4(e) shows the structure of a character recognition portion 4-1, which recognizes candidate characters by a neural network. A similarity degree-calculating portion 4-36 calculates the degrees of similarity of characters from a text image and from weighting coefficients 4-37, and produces candidate characters. A weighting coefficient-updating portion 4-38 updates the weighting coefficients according to the difference between each candidate character and an additional learning character.

A keyword-extracting portion 4-31 extracts keywords of a recognized document from a modified character string 4-14 produced from the phrase-selecting portion 4-5, and creates a set of keywords. This extraction utilizes the differences between the frequencies of words in the document and frequencies of words in general documents. A keyword partial coincidence search portion 4-32 searches for partial coincidence of the obtained set of keywords 4-35 with a set of candidate characters 4-11. As an example, if "認識" ("recognition" in Japanese) is extracted as a keyword, then "認*" and "*識" existing in the modified character string 4-14 are extracted as partially coincident characters. A candidate word addition portion 4-33 adds these partial coincident keywords to the set of candidate words. In the above example, the partially coincident "認*" and "*識" are added as "認識" to the set of candidate words 4-12. This makes it possible to use those characters which are not produced from the character recognition portion 4-1 to amend characters.

A noncandidate character detector portion 4-34 detects noncandidate characters which are contained in the modified character string 4-14 and have been added by the candidate word addition portion 4-33, the modified character string 4-14 being produced from the phrase-selecting portion 4-5. The noncandidate character detector portion 4-34 produces these noncandidate characters as additional learning characters 4-15.

The character recognition machine constructed as described thus far recognizes character in the manner described now.

First, the character recognition portion 4-1 recognizes characters in the text image 4-10 while referring to the weighting coefficients 4-37. The similarity degree-calculating portion 4-36 produces a set of candidate characters comprising n candidate characters, from first to n-th candidate characters, per character.

The word search portion 4-2 searches the word dictionary 4-6, and selects from the set of candidate characters 4-11 the set of candidate words 4-12 which forms combinations of candidate characters coincident with some words existing in the word dictionary 4-6. The phrase search portion 4-3 selects a combination of words, or a set of candidate phrases 4-13, capable of forming a phrase by referring to the grammatical dictionary 4-7. The phrase evaluating value-calculating portion 4-4 then calculates a phrase-evaluating value from the lengths of words in the phrase, the frequencies of the words, and other factors. The phrase-evaluating value indicates the correctness of the phrase in terms of vocabulary and grammar. With respect to the candidate phrase for which the phrase-evaluating value has been calculated, the phrase-selecting portion 4-5 selects a correct combination of phrases, based on the phrase-evaluating value, and produces the modified character string 4-14.

The keyword-extracting portion 4-31 extracts a set of keywords 4-35 from the modified character string 4-14.

The keyword partial coincidence search portion 4-32 searches for partial coincidence of the set of keywords 4-35 with a set of candidate characters 4-11. Subsequently, the candidate word addition portion 4-33 adds words produced by the keyword partial coincidence search portion 4-32 to the set of candidate words 4-12.

Again, the phrase search portion 4-3 and the phrase evaluating value-calculating portion 4-4 search the added candidate words for candidate phrases, and calculate a phrase-evaluating value.

The phrase-selecting portion 4-5 selects phrases having larger evaluation values from the candidate phrases and produces the modified character string 4-14.

The noncandidate character detector portion 4-34 detects those characters of the modified character string 4-14 which are added by the candidate word addition portion 4-33. The detected characters are produced as additional learning characters 4-15.

The weighting coefficient-updating portion 4-38 updates the weighting coefficients 4-37 according to the difference between each candidate character and an additional learning character, and performs additional learning. After the additional learning, characters are recognized, using the updated weighting coefficients 4-37.

Thus, characters which would not be recognized initially by the character recognition portion 4-1 can be recognized by the addition of the characters to the recognition dictionary.

The character recognition portion 4-1 may use a character recognition method which uses no neural network. For example, the vector of the average value of each character is stored in the recognition dictionary. These vectors are compared with an image to recognize characters. Where the recognition dictionary is employed, it is reconstructed, based on the added characters, and then additional learning is performed.

A seventh example of the language processing portion according to the present invention is described below. FIG. 4(*f*) shows the whole structure of this example of the character recognition machine.

This machine has a word recognition portion 4-1, a word search portion 4-2, a phrase search portion 4-3, a phrase evaluating value-calculating portion 4-4, and a phrase-selecting portion 4-5 which are the same as their respective counterparts of the first example. The machine is further equipped with a keyword-extracting portion 4-31, a keyword partial coincidence search portion 4-32 and, a noncandidate character detector portion 4-34 which are the same as their respective counterparts of the fourth example.

A word incorrect amendment degree-calculating portion 4-41 calculates a word incorrect amendment degree that indicates the probability that modification of a word contained in the modified character string 4-14 is incorrect. A rejected character-determining portion 4-42 determines rejected characters according to the word incorrect amendment degree produced from the word incorrect amendment degree-calculating portion 4-41. A candidate word addition portion 4-43 adds those rejected characters which are included in the keywords searched by the keyword partial coincidence search portion 4-32 to the set of candidate words 4-12. The character recognition machine constructed as described thus far recognizes characters in the manner described now.

First, the character recognition portion 4-1 recognizes characters in the text image 4-10, using the recognition dictionary 4-16. The recognition portion 4-1 produces a set of candidate characters comprising n candidate characters, from first to n-th candidate characters, per character.

The word search portion 4-2 searches the word dictionary 4-6, and selects a set of candidate words 4-12 from combinations of the candidate characters 4-11, the set of candidate words 4-12 forming combinations of candidate characters coincident with some words existing in the word dictionary 4-6. The phrase search portion 4-3 selects a combination of words, or a set of candidate phrases 4-13, capable of forming a phrase from the set of candidate words 4-12 by referring to the grammatical dictionary 4-7. The phrase evaluating value-calculating portion 4-4 then calculates a phrase-evaluating value from the lengths of words in the phrase, the frequencies of the words, and other factors. The phrase-evaluating value indicates the correctness of the phrase in terms of vocabulary and grammar. With respect to the candidate phrase for which the phrase-evaluating value has been calculated, the phrase-selecting portion 4-5 selects a correct combination of phrases, based on the phrase-evaluating value, and produces the modified character string 4-14.

The keyword-extracting portion 4-31 extracts a set of keywords 4-35 from the modified character string 4-14.

The keyword partial coincidence search portion 4-32 searches for partial coincidence of the set of keywords 4-35 with a set of candidate words 4-12.

Then, the word incorrect amendment degree-calculating portion 4-41 calculates the degree of incorrect amendment of an amended word from various factors such as the length of the amended word, the evaluation value of each character contained in the word and calculated by the character recognition portion 4-1, the difference in evaluation value between the amended character and the first candidate character calculated by the character recognition portion, the kinds of characters forming the word, and the statistical probability that the amended word is correct. The rejected character-determining portion 4-42 determines rejected characters according to the word incorrect amendment degrees of the amended words and of words located before and behind the amended words.

The candidate word addition portion 4-43 compares the word produced from the keyword partial coincidence search portion 4-32 with the characters produced from the rejected character-determining portion 4-42. Coincident words are added to the set of candidate words 4-12.

Again, the phrase search portion 4-3 and the phrase evaluating value-calculating portion 4-4 search the added candidate words for a candidate phrase, and find the phrase-evaluating value.

The phrase-selecting portion 4-5 selects phrases having larger evaluation values from the candidate phrases, and produces the modified character string 4-14.

The noncandidate character detector portion 4-34 detects the character which is contained in the modified character string 4-14 and has been added by the candidate word addition portion 4-43. The detected word is produced as an additional learning character 4-15.

The character recognition portion 4-1 receives the additional learning character 4-15 and adds this character 4-15 to the recognition dictionary 4-16 so that the additional learning character can be recognized, based on the image of the additional learning character and on the characters of the modified character string.

Thus, characters which would not be recognized initially by the character recognition portion 4-1 can be recognized by the addition of the characters to the recognition dictionary.

The addition of the learning characters 4-15 to the recognition dictionary 4-16 in the character recognition portion 4-1 may be implemented by fabricating the character recognition portion 4-1 out of a neural network and varying the weights added to the network according to additional learning.

An eighth example of the language processing portion according to the present invention is described below. FIG. 4(a) shows the whole structure of this example of the character recognition machine.

This machine has a word recognition portion 4-1, a word search portion 4-2, a phrase search portion 4-3, a phrase evaluating value-calculating portion 4-4, and a phrase-selecting portion 4-5 which are the same as their respective counterparts of the first example. The machine is further equipped with a character species- determining portion 4-51 which determines the character species of the characters in the modified character string 4-14 by referring to a character species dictionary 4-52 and delivers the species.

The character recognition machine constructed as described thus far recognizes characters in the manner described now.

First, the character recognition portion 4-1 recognizes characters in the text image 4-10, using the recognition dictionary 4-16. The recognition portion 4-1 produces a set of candidate characters comprising n candidate characters, from first to n-th candidate characters, per character.

The word search portion 4-2 searches the word dictionary 4-6, and selects a set of candidate words 4-12 from combinations of the candidate characters 4-11, the set of candidate words 4-12 forming combinations of candidate characters coincident with some words existing in the word dictionary 4-6. The phrase search portion 4-3 selects a combination of words, or a set of candidate phrases 4-13, capable of forming a phrase from the set of candidate words 4-12 by referring to the grammatical dictionary 4-7. The phrase evaluating value-calculating portion 4-4 then calculates a phrase-evaluating value from the lengths of words in the phrase, the frequencies of the words, and other factors. The phrase-evaluating value indicates the correctness of the phrase in terms of vocabulary and grammar. With respect to the candidate phrase for which the phrase-evaluating value has been calculated, the phrase-selecting portion 4-5 selects a correct combination of phrases, based on the phrase-evaluating value, and produces the modified character string 4-14.

The character species-determining portion 4-51 determines the character species of the characters in the modified character string 4-14 by referring to the character species dictionary 4-52. Various rules are registered in this dictionary 4-52. These rules are: (1) a character interposed between a prefix located before a numeral such as "第" (the) and "約" approximately) and a postpositional word functioning as an auxiliary to a numeral such as "本" and "個" is a numeral; (2) the probability that a character interposed between katakanas is a katakana is high; and (3) the probability that a character interposed between alphabetical characters is an alphabetical character is high. Character species are determined according to these rules. FIG. 4-8 shows an example in which character species are determined from a modified character string. A character string "ニューラねネットワーク" contained in the modified character array was determined as a katakana array. A character string "9G.5" was determined as a numerical array. The character species in the other portions were not determined. Characters whose species have been determined are sent to the character recognition portion 4-1, which determines character species according to the output from the character species-determining portion and performs character recognition again.

The word search portion 4-2 adds characters produced from the character recognition portion 4-1 to the set of candidate words 4-12, and again searches for candidate words. The phrase search portion 4-3 and the phrase evaluating value-calculating portion 4-4 search the added candidate words for a candidate phrase and find its phrase-evaluating value.

The phrase-selecting portion 4-5 selects phrases having larger evaluation value from candidate phrases and produces the modified character string 4-14.

If character species are limited in this way, the character recognition portion 4-1 recognizes characters within a limited range and so the recognition rate is improved. As a result, when characters are subsequently modified, the recognition rate is enhanced.

In the present example, the character species-determining portion 4-51 limits and determines character species. The character species-determining portion 4-51 may limit the species of characters within a certain range of characters. For example, if it can be determined from the modified character string 4-14 that a character string represents a city name, then characters may be restricted to those characters which are used to represent only city names.

What is claimed is:

1. A character extraction machine comprising:
a character string image input portion for receiving an image consisting of a character string;
a memory for holding the received character string;
a projection profile histogram-calculating portion for calculating a concentration value of histogram which is obtained by counting pixels in the character string;
an initial parameter-setting portion for receiving an output from said projection profile histogram-calculating portion and determining values of processing parameters from heights of the character string, lengths of spaces of projection profile histogram of the character string, and other factors which are obtained from the projection profile histogram, the parameters being used to estimate character positions;

a histogram distribution smoothing network portion formed by a network for receiving an output from said projection profile histogram-calculating portion and an output from said initial parameter-setting portion, said network being composed of interconnected operators each having a multiplicity of inputs and one output, said operators corresponding to positions of pixels in a direction of the character string, and said histogram distribution smoothing network portion for acting to minimize a function which assumes its minimum value when values of the projection profile histogram of character portions have substantially the same value, to thereby smooth the projection profile histogram, thus reducing effects of noises present in the received character string;

an extraction position-estimating network portion formed by a second network for receiving an output from said projection profile histogram-calculating portion and an output from said initial parameter-setting portion, said second network being composed of interconnected operators each having a multiplicity of inputs and one output, said operators corresponding to positions of pixels in a direction of the character string, and said extraction position-estimating network portion for acting to minimize a function which assumes its minimum value when an extracted position of the whole character string has been optimally extracted, to thereby estimate an extraction position of the character;

an extraction position-determining portion for determining character extraction positions according to values outputted from said extraction position-estimating network portion;

a character pattern output portion for reading a character pattern of each character from said memory according to a signal outputted from said extraction position-determining portion;

a character recognition portion for recognizing what character is represented by each character pattern produced from said character pattern output portion;

a language processing portion for receiving an output from said character recognition portion and calculating an evaluation value of each phrase of the character string applied heretofore, said evaluation value indicating a degree of correctness in terms of vocabulary and grammar;

a final character position-determining portion for receiving an output from said language processing portion and determining whether characters in the phrase have been correctly extracted in terms of vocabulary and grammar and which, if the characters have not been correctly extracted, producing positions of a first character and a last character because probability of erroneous estimation of character positions in said phrase is high and which, if the characters have been correctly extracted, producing these character positions as final character extraction positions;

a re-extraction position-determining portion for receiving an output from said final character position-determining portion and determining a position at which a character position should be estimated again;

a character squareness degree-modifying portion for estimating a squareness degree from a character string which has been judged to have correct character positions by said final character position-determining portion; and a parameter-modifying portion for receiving an output from said re-extraction position-determining portion and an output from said character squareness degree-modifying portion and modifying said processing parameters used to estimate the character positions.

2. A character extraction machine in accordance with claim 1, further comprising:

an extraction candidate point-setting portion for detecting positions having a possibility of being character extraction positions, from an output from said projection profile histogram-calculating portion; and an initial value-setting portion for determining initial output values from said operators in said extraction position-estimating network portion on a basis of an output from said extraction candidate point-setting portion and an output from said projection profile histogram-calculating portion.

3. A pattern recognition machine comprising:

a plurality of feature-extracting portions, each of which is for finding each feature vector from an applied pattern;

a plurality of single feature-recognizing portions, each of which is for finding degrees of similarity of the applied pattern from each feature vector, the degrees of similarity indicating degrees to which the applied pattern belong to various categories;

a category-discerning portion for discerning the applied pattern using the degrees of similarity obtained by said plurality of single feature-recognizing portions;

each of said single feature-recognizing portions including:

a group dictionary storing a plurality of group references feature vectors representing category groups each consisting of a set of patterns having similar feature vectors;

a fuzzy rough classification portion for calculating group assignment degrees from the group reference feature vectors and from feature vectors of the applied pattern, the group assignment degree indicating degrees to which the applied pattern belong to the category groups, respectively;

a plurality of subclassification portions for finding inside group similarity degrees from the feature vectors of the applied pattern, the inside group similarity degrees indicating degrees to which the applied pattern belongs to categories contained in the category groups;

a group-selecting portion for selecting a plurality of category groups from the group assignment degrees;

a subclassification portion input signal-selecting portion for selecting the subclassification portion which can receive the feature vectors of the applied pattern according to information about selection of groups obtained from said group-selecting portion; and a single feature similarity degree-calculating portion for finding degrees of similarity of the applied pattern to the categories from a group assignment degree of the category group selected by said group-selecting portion and from the inside group similarity degrees obtained by said selected subclassification portions;

said single feature similarity degree-calculating portion including:

a plurality of multipliers for multiplying the group assignment degree of the category group selected by said group-selecting portion by all inside group similarity degrees, respectively, obtained from said subclassification portions receiving the feature vectors of the applied pattern by said subclassification portion input signal-selecting portion; and a category similarity degree-calculating portion for selecting plural output values having larger values from output values from the multipliers for each category and calculating a sum of these output values;

said category-discerning portion including:

a plurality of similarity degree-normalizing portions for normalizing the degrees of similarity of the categories obtained from said single feature-recognizing portions corresponding to the feature vectors, respectively, with a maximum one of these degrees of similarity to thereby transform the degrees of similarity into normalized degrees of similarity; and a category decision portion for finding integrated degrees of similarity of the categories using the normalized degrees of similarity obtained by said similarity degree-normalizing portions and discerning the applied pattern.

4. A character recognition machine comprising:

a character recognition portion including:

a plurality of feature-extracting portions, each of which is for finding each feature vector from a character pattern produced by a character extraction portion which divides a text image into plural regions for each character;

a plurality of feature-recognizing portions, each of which is for finding degrees of similarity from each feature vector, the degrees of similarity indicating degrees at which the character pattern belongs to various character categories, respectively;

a candidate character-selecting portion for finding a plurality of second candidate character categories and their degrees of similarity to the character pattern from the degrees of similarity obtained from said single feature-recognizing portions; and a post-recognition processing portion for selecting a final character category from the second character candidate categories using information about sizes and positions of the character pattern;

each of said single feature-recognizing portions including:

a group dictionary storing a plurality of group reference feature vectors representing character category groups each consisting of a set of character pattern having similar feature vectors;

a fuzzy rough classification portion for calculating group assignment degrees from the group reference feature vectors and from feature vectors of the applied character pattern, the group assignment degree indicating degrees to which the applied character pattern belongs to the character category groups, respectively;

a plurality of subclassification portions for finding inside group similarity degrees from the feature vectors of the applied character pattern, the inside group similarity degrees indicating degrees to which the applied character pattern belongs to character categories contained in the character category groups;

a group-selecting portion for selecting a plurality of character category groups from the group assignment degrees;

a subclassification portion input signal-selecting portion for selecting the subclassification portion which can receive the feature vectors of the applied character pattern according to information about selection of groups obtained from said group-selecting portion; and a single feature similarity degree-calculating portion for finding degrees of similarity of the applied character pattern to the character categories from a group assignment degree of the character category group selected by said group-selecting portion and from the inside group similarity degrees obtained by said selected subclassification portions;

said single feature similarity degree-calculating portion including:

a plurality of multipliers for multiplying the group assignment degree of the character category group selected by said group-selecting portion by all inside group similarity degrees, respectively, obtained from said subclassification portions receiving the feature vectors of the applied character pattern by said subclassification portion input signal-selecting portion; and a category similarity degree-calculating portion for selecting plural output values having larger values from output values having larger values from output values from the multipliers for each character category and calculating a sum of these output values;

said candidate character-selecting portion including:

a plurality of similarity degree-normalizing portions for normalizing the degrees of similarity of various character categories obtained from said single feature-recognizing portions corresponding to the feature vectors, respectively, with a maximum one of these degrees of similarity to thereby transform the degrees of similarity into normalized degrees of similarity;

a plurality of first candidate character-selecting portions for selecting plural first candidate character categories from all character categories using information about sizes and positions in the character pattern and the normalized degrees of similarity; and a second character-selecting portion for summing up all normalized degrees of similarity of the selected first candidate character categories for each same category, finding integrated degrees of similarity of all the first candidate character categories, selecting plural first candidate character categories having larger values as second candidate character categories, and delivering the second candidate character categories and their integrated degrees of similarity.

5. A character recognition machine in accordance with claim 4, wherein said post-recognition processing portion has: a character information storage portion storing information about reference sizes and reference positions in character patterns for each character category; a post-processed character set storage portion storing a set of post-processed character categories; and a post-processed character set decision portion which compares second candidate character categories obtained from said candidate character-selecting portion with all sets of post-processed character categories stored in said post-processed character set storage portion and which, if said second candidate character categories form said set of post-processed character categories, reads information about the reference sizes and reference positions in the character categories corresponding to said set of post-processed character categories from said character information storage portion, compares information about sizes and positions in the applied character pattern with the read information, and determines any character category of the set of post-processed character categories as a new second candidate character category, and wherein said first candidate character-selecting portion compares information about the reference sizes and reference positions in the character categories stored in said character information storage portion with the information about the sizes and positions in said applied character pattern to select said plural first candidate character categories.

6. The character recognition machine in accordance with claim 4, wherein said first candidate character-selecting portions select character categories having normalized degrees of similarity greater than a certain threshold value, from said similarity degree-normalizing portions, and then compare information about the reference sizes and reference positions of the character categories stored in said character information storage portion with information about the sizes and positions in said applied character pattern, to thereby select said plural first candidate character categories.

7. A character recognition machine in accordance with claim 4, further comprising;

a one-character reject control portion for informing said character extraction portion of positions in a character string of said character pattern to said character extraction portion, if a sum of numbers of first candidate character categories obtained from said first candidate character-selecting portion is zero, with respect to some character pattern produced from said character extraction portion.

8. A character recognition machine in accordance with claim 4, further comprising:

a teacher signal-generating portion which, if a first candidate character of the second candidate categories obtained from said post-recognition processing portion differs from a correct character category of the applied character pattern, produces the correct character category;

an incorrect recognition frequency storage portion storing an incorrect recognition frequency for each set of post-processed character category, said incorrect recognition frequency indicating a frequency at which a combination of said correct character category and said first candidate character category agrees with the set of post-processed character categories;

an incorrect recognition frequency-updating portion which compares the combination of said correct character category and said first candidate character category with the set of post-processed character categories stored in said post-processed character set storage portion and which, if they agree, updates an incorrect recognition frequency of corresponding one of sets of post-processed character categories in said post-processed character set storage portion and which, if the incorrect recognition frequency exceeds a certain permitted number, produces the corresponding set of post-processed character categories; and a character information-modifying portion for modifying information about reference sizes and reference positions of sets of post-processed character categories obtained from said incorrect recognition frequency-updating portion, using information about sizes and positions in said character pattern.

9. A character recognition machine in accordance claim 4, wherein said candidate character-selecting portion comprises:

a plurality of similarity degree-normalizing portions for normalizing degrees of similarity of character categories obtained from said single feature-recognizing portions with a maximum value of these degrees of similarity to transform them into normalized degrees of similarity;

a plurality of first candidate character-selecting portions for selecting a plurality of first candidate character categories from all character categories, using information about the sizes and positions in said character pattern and said normalized degrees of similarity;

a similarity degree-nonlinearly transforming portion for nonlinearly transforming the normalized degrees of similarity of said first candidate categories and dividing the nonlinearly transformed, normalized degrees of similarity by a sum of these degrees of similarity to find nonlinearly transformed degrees of similarity of said first candidate categories; and a second candidate character-selecting portion for summing up nonlinearly transformed degrees of similarity of selected first candidate character categories for each same category so as to find integrated degrees of similarity of all the first candidate character categories, selecting plural first candidate character categories having larger integrated degrees of similarity as second candidate character categories, and producing these second candidate character categories and their integrated degrees of similarity.

10. A character recognition machine in accordance with claim 3, wherein said fuzzy rough classification portion comprises:

a plurality of distance-calculating portions for calculating distances of the feature vectors of said applied character patterns from all group reference feature vectors stored in said group dictionary;

a plurality of dividers for calculating inverses of outputs from said distance-calculating portions;

an adder for summing up the outputs from said dividers;

a plurality of multipliers for multiplying an output from said adder by the outputs from said distance-calculating portions; and a plurality of dividers for calculating inverses of outputs from said multipliers.

11. A character recognition machine in accordance with claim 3, wherein each of said subclassification portions comprises:

a character category dictionary in which character category reference feature vectors indicating typical values of character categories of said character patterns are stored;

a plurality of distance-calculating portions for calculating distances of said feature vectors from all character category reference feature vectors stored in said character category dictionary;

a plurality of dividers for calculating inverses of outputs from said distance-calculating portions;

an adder for summing up the outputs from said dividers;

a plurality of multipliers for multiplying an output from said adder by the outputs from said distance-calculating portions; and a plurality of dividers for calculating inverses of outputs from said multipliers.

12. A character recognition machine in accordance with claim 3, wherein each of said subclassification portions has a multilayered structure and comprises a plurality of processing portions each having a multiplicity of inputs and one output, the processing portions being interconnected in a network in such a way that there is no coupling inside each layer of said multilayered structure and that signals are propagated only to upper layers, and wherein each of said processing portions comprises a weighting coefficient storage portion for holding a plurality of weighting coefficients, input portions for receiving input signals, multiplier means for weighting the input signals applied to the input portions with the weighting coefficients held in said weighting coefficient storage portion, an adder means for summing up the input signals weighted by said multiplier means, and a threshold value processing means for limiting an output from said adder means within a given range.

13. A character recognition machine having a language processing portion capable of processing language, said language processing portion comprising:

a character string image storage means for storing an image input;

a character recognition means for outputting a set of candidate characters and an evaluation;

a word search means for receiving the set of candidate characters and determining a set of candidate words, using a word dictionary, based on a degree of similarity between the candidate characters and the characters in various character positions in the character string image;

a phrase search means for finding candidate phrases from the set of candidate words, using a grammatical dictionary;

a phrase evaluating value-calculating means for calculating correctness of each phrase in terms of vocabulary and grammar;

a phrase-selecting means for selecting one phrase, based on the evaluating values of phrases, and producing a modified character string;

a word incorrectness degree-calculating means for finding an incorrect recognition degree of each word in the modified character string, based on data about correctness percentage of each correct word and the evaluation made by said character recognition means;

a word incorrect amendment degree-calculating means for finding an incorrect amendment degree of each word in the modified character string; and a reject processing means for determining characters to be rejected from the word incorrect amendment degree.

14. A character recognition machine having a language processing portion capable of processing language, said language processing portion comprising:

a character string image storage means for storing an image input;

a word search means for receiving a set of candidate characters and determining a set of candidate words, using a word dictionary, based on a degree of similarity between the candidate characters and the characters in various character positions in the character string image;

a phrase search means for finding candidate phrases from the set of candidate words, using a grammatical dictionary;

a phrase evaluating value-calculating means for calculating correctness of each phrase in terms of vocabulary and grammar;

a phrase-selecting means for selecting one phrase, based on evaluating values of phrases, and producing a modified character string;

a word incorrectness degree-calculating means for finding an incorrect recognition degree of each word in the modified character string, based on data about correctness percentage of each amended word and an evaluation made by a character recognition means;

a word incorrect amendment degree-calculating means for finding a word incorrect amendment degree of each word in the modified character string;

a reject processing means for determining characters to be rejected from the word incorrect amendment degree; and a rejected character-replacing means for replacing the rejected characters in the modified character string by a character category having a maximum degree of similarity and outputted from said character recognition means.

15. A character recognition machine comprising:

a character string image storage portion, a character extraction portion, a character recognition portion, and a language processing portion: and said character string image storage portion for storing a character string to be recognized as a character string image;

said character extraction portion connected with said character string image storage portion and comprising a plurality of operators arranged in a direction of said character string, each of said operators having a multiplicity of inputs and one outputs, the operators being interconnected so as to form a network, and said character extraction portion acting to determine boundary positions of characters by the use of values of initialized processing parameters, to obtain a character pattern of each character and information about sizes and positions in this character pattern, to deliver these character patterns and information to said character recognition portion, to again process a text image in character positions specified by said character recognition portion or by said language processing portion with modified values of said processing parameters, to find new boundary positions of characters in said character positions, to obtain a new character pattern and new information about sizes and positions in this character pattern, and to again deliver these character pattern and information to said character recognition portion;

a character recognition portion for finding degrees of similarity of a character pattern applied from said character extraction portion, said degrees of similarity indicating degrees to which said character pattern belongs to various character categories, said character recognition portion acting to inform said character extraction portion of position of said character pattern in said character string if said degrees of similarity are not matched to information about sizes and positions in the character pattern applied from said character extraction portion, and if said degrees of similarity are matched to information about sizes and positions in the character pattern applied from said character extraction portion, said character recognition portion acting to deliver said degrees of similarity to said language processing portion, or to deliver degrees of similarity to the character category group restricted by said language processing portion for a character pattern in character positions specified by said language processing portion, and to learn a character pattern as a teacher pattern if said language processing portion specifies a correct character category, said character pattern being in character positions of said specified correct character category, and a language processing portion for receiving said degrees of similarity of character categories in various character positions found by said character recognition portion, selecting as a forecasted correct character category a combination of character categories which is correctest in terms of vocabulary and grammar, producing certain character categories and character positions corresponding to a certain character to said character recognition portion if categories of said certain forecasted correct character are restricted to said certain character category, producing said forecasted correct character and character positions corresponding to said forecested correct character to said character recognition portion if said forecasted correct character category differs from a character category applied from said character recognition portion and having a maximum degree of similarity, and producing character positions corresponding to a part to said character extraction portion if said part has no combination of character categories which seems to be correct in terms of vocabulary and grammar.

16. A character recognition machine in accordance with claim 15, where said character extraction portion is a character extraction machine including:

a character string image input portion for receiving an image consisting of a character string;

a memory for holding the received character string;

a projection profile histogram-calculating portion for calculating a concentration value of histogram which is obtained by counting pixels in the character string;

an initial parameter-setting portion for receiving an output from said projection profile histogram-calculating portion and determining values of processing parameters from heights of the character string, lengths of spaces of projection profile histogram of the character string, and other factors which are obtained from the projection profile histogram, the parameters being used to estimate character positions;

a histogram distribution smoothing network portion formed by a network for receiving an output from said projection profile histogram-calculating portion and an output from said initial parameter-setting portion, said network being composed of interconnected operators each having a multiplicity of inputs and one output, said operators corresponding to positions of pixels in a direction of the character string, and said histogram distribution smoothing network portion for acting to minimize a function which assumes its minimum value when values of the projection profile histogram of character portions have substantially the same value, to thereby smooth the projection profile histogram, thus reducing effects of noises present in the received character string;

an extraction position-estimating network portion formed by a second network for receiving an output from said projection profile histogram-calculating portion and an output from said initial parameter-setting portion, said second network being composed of interconnected operators each having a multiplicity of inputs and one output, said operators corresponding to positions of pixels in a direction of the character string, and said extraction position-estimating network portion for acting to minimize a function which assumes its minimum value when an extracted position of the whole character string has been optimally extracted, to thereby estimate an extraction position of the character;

an extraction position-determining portion for determining character extraction positions according to values outputted from said extraction position-estimating network portion;

a character pattern output portion for reading a character pattern of each character from said memory according to a signal outputted from said extraction position-determining portion;

a character recognition portion for recognizing what character is represented by each character pattern produced from said character pattern output portion;

a language processing portion for receiving an output from said character recognition portion and calculating an evaluation value of each phrase of the character string applied heretofore, said evaluation value indicating a degree of correctness in terms of vocabulary and grammar;

a final character position-determining portion for receiving an output from said language processing portion and determining whether characters in the phrase have been correctly extracted in terms of vocabulary and grammar and which, if the characters have not been correctly extracted, producing positions of a first character and a last character because probability of erroneous estimation of character positions in said phrase is high and which, if the characters have been correctly extracted, producing these character positions as final character extraction positions;

a re-extraction position-determining portion for receiving an output from said final character position-determining portion and determining a position at which a character position should be estimated again;

a character squareness degree-modifying portion for estimating a squareness degree from a character string which has been judged to have correct character positions by said final character position-determining portion; and a parameter-modifying portion for receiving an output from said re-extraction position-determining portion and an output from said character squareness degree-modifying portion and modifying said processing parameters used to estimate the character positions.

17. A character recognition machine in accordance with claim 15, wherein said character recognition portion is a pattern recognition machine including:

a plurality of feature-extracting portions, each of which is for finding each feature vector from an applied pattern;

a plurality of single feature-recognizing portions, each of which is for finding degrees of similarity of the applied pattern from each feature vector, the degrees of similarity indicating degrees to which the applied pattern belong to various categories;

a category-discerning portion for discerning the applied pattern using the degrees of similarity obtained by said plurality of single feature-recognizing portions;

each of said single feature-recognizing portions including:

a group dictionary storing a plurality of group references feature vectors representing category groups each consisting of a set of patterns having similar feature vectors;

a fuzzy rough classification portion for calculating group assignment degrees from the group reference feature vectors and from feature vectors of the applied pattern, the group assignment degree indicating degrees to which the applied pattern belong to the category groups, respectively;

a plurality of subclassification portions for finding inside group similarity degrees from the feature vectors of the applied pattern, the inside group similarity degrees indicating degrees to which the applied pattern belongs to categories contained in the category groups;

a group-selecting portion for selecting a plurality of category groups from the group assignment degrees;

a subclassification portion input signal-selecting portion for selecting the subclassification portion which can receive the feature vectors of the applied pattern according to information about selection of groups obtained from said group-selecting portion; and a single feature similarity degree-calculating portion for finding degrees of similarity of the applied pattern to the categories from a group assignment degree of the category group selected by said group-selecting portion and from the inside group similarity degrees obtained by said selected subclassification portions;

said single feature similarity degree-calculating portion including:
  a plurality of multipliers for multiplying the group assignment degree of the category group selected by said group-selecting portion by all inside group similarity degrees, respectively, obtained from said subclassification portions receiving the feature vectors of the applied pattern by said subclassification portion input signal-selecting portion; and
  a category similarity degree-calculating portion for selecting plural output values having larger values from output values from the multipliers for each category and calculating a sum of these output values;

said category-discerning portion including:
  a plurality of similarity degree-normalizing portions for normalizing the degrees of similarity of the categories obtained from said single feature-recognizing portions corresponding to the feature vectors, respectively, with a maximum one of these degrees of similarity to thereby transform the degrees of similarity into normalized degrees of similarity; and
  a category decision portion for finding integrated degrees of similarity of the categories using the normalized degrees of similarity obtained by said similarity degree-normalizing portions and discerning the applied pattern.

18. A character recognition machine in accordance with claim 15, wherein said character recognition portion is a character recognition machine including:

a plurality of feature-extracting portions, each of which is for finding each feature vector from a character pattern produced by a character extraction portion which divides a text image into plural regions for each character;

a plurality of feature-recognizing portions, each of which is for finding degrees of similarity from each feature vector, the degrees of similarity indicating degrees at which the character pattern belongs to various character categories, respectively;

a candidate character-selecting portion for finding a plurality of second candidate character categories and their degrees of similarity to the character pattern from the degrees of similarity obtained from said single feature-recognizing portions; and a post-recognition processing portion for selecting a final character category from the second character candidate categories using information about sizes and positions of the character pattern;

each of said single feature-recognizing portions including:
  a group dictionary storing a plurality of group reference feature vectors representing character category groups each consisting of a set of character pattern having similar feature vectors;
  a fuzzy rough classification portion for calculating group assignment degrees from the group reference feature vectors and from feature vectors of the applied character pattern, the group assignment degree indicating degrees to which the applied character pattern belongs to the character category groups, respectively;
  a plurality of subclassification portions for finding inside group similarity degrees from the feature vectors of the applied character pattern, the inside group similarity degrees indicating degrees to which the applied character pattern belongs to character categories contained in the character category groups;
  a group-selecting portion for selecting a plurality of character category groups from the group assignment degrees;
  a subclassification portion input signal-selecting portion for selecting the subclassification portion which can receive the feature vectors of the applied character pattern according to information about selection of groups obtained from said group-selecting portion; and
  a single feature similarity degree-calculating portion for finding degrees of similarity of the applied character pattern to the character categories from a group assignment degree of the character category group selected by said group-selecting portion and from the inside group similarity degrees obtained by said selected subclassification portions;

said single feature similarity degree-calculating portion including:
  a plurality of multipliers for multiplying the group assignment degree of the character category group selected by said group-selecting portion by all inside group similarity degrees, respectively, obtained from said subclassification portions receiving the feature vectors of the applied character pattern by said subclassification portion input signal-selecting portion; and
  a category similarity degree-calculating portion for selecting plural output values having larger values from output values having larger values from output values from the multipliers for each character category and calculating a sum of these output values;

said candidate character-selecting portion including:
  a plurality of similarity degree-normalizing portions for normalizing the degrees of similarity of various character categories obtained from said single feature-recognizing portions corresponding to the feature vectors, respectively, with a maximum one of these degrees of similarity to thereby transform the degrees of similarity into normalized degrees of similarity;

a plurality of first candidate character-selecting portions for selecting plural first candidate character categories from all character categories using information about sizes and positions in the character pattern and the normalized degrees of similarity; and a second character-selecting portion for summing up all normalized degrees of similarity of the selected first candidate character categories for each same category, finding integrated degrees of similarity of all the first candidate character categories, selecting plural first candidate character categories having larger values as second candidate character categories, and delivering the second candidate character categories and their integrated degrees of similarity;

said post-recognition processing portion selects plural final candidate character categories and finds their degrees of similarity from the plural second candidate character categories by the use of information about sizes and positions in the character pattern and delivers these final candidate character categories and their degrees of similarity as values evaluating characters in the final candidates character categories to said language processing portion.

19. A character recognition machine in accordance with claim 15, wherein said language processing portion is a language processing portion including:

a character string image storage means for storing an image input;

a character recognition means for outputting a set of candidate characters and an evaluation;

a word search means for receiving the set of candidate characters and determining a set of candidate words, using a word dictionary, based on a degree of similarity between the candidate characters and the characters in various character positions in the character string image;

a phrase search means for finding candidate phrases from the set of candidate words, using a grammatical dictionary;

a phrase evaluating value-calculating means for calculating correctness of each phrase in terms of vocabulary and grammar;

a phrase-selecting means for selecting one phrase, based on the evaluating values of phrases, and producing a modified character string;

a word incorrectness degree-calculating means for finding an incorrect recognition degree of each word in the modified character string, based on data about correctness percentage of each correct word and the evaluation made by said character recognition means;

a word incorrect amendment degree-calculating means for finding an incorrect amendment degree of each word in the modified character string; and a reject processing means for determining characters to be rejected from the word incorrect amendment degree.

20. A character recognition machine having a language processing portion capable of processing language, said language processing portion comprising:

a character string image storage means for storing an image input;

a word search means for receiving a set of candidate characters and determining a set of candidate words, using a word dictionary, based on a degree of similarity between the candidate characters and the characters in various character positions in the character string image;

a phrase search means for finding candidate phrases from the set of candidate words, using a grammatical dictionary;

a phrase evaluating value-calculating means for calculating correctness of each phrase in terms of vocabulary and grammar;

a phrase-selecting means for selecting one phrase, based on the evaluating values of phrases, and producing a modified character string;

a word incorrectness degree-calculating means for finding an incorrect recognition degree of each word in the modified character string, based on data about correctness percentage of each correct word and an evaluation made by a character recognition portion;

a word incorrect amendment degree-calculating means for finding a word incorrect amendment degree of each word in the modified character string; and a reject processing means for determining characters to be rejected from said word incorrect amendment degree and for outputting the rejected characters as misrecognized characters.

21. A character recognition machine having a language processing portion capable of processing language, said language processing portion comprising:

a character string image storage means for storing an image input;

a word search means for receiving a set of candidate characters and determining a set of candidate words, using a word dictionary, based on a degree of similarity between the candidate characters and the characters in various character positions in the character string image;

a phrase search means for finding candidate phrases from the set of candidate words, using a grammatical dictionary;

a phrase evaluating value-calculating means for calculating correctness of each phrase in terms of vocabulary and grammar;

a phrase-selecting means for selecting one phrase, based on evaluating values of phrases, and producing a modified character string;

a word incorrectness degree-calculating means for finding an incorrect recognition degree of each word in the modified character string, based on data about correctness percentage of each amended word and an evaluation made by a character recognition portion;

a word incorrect amendment degree-calculating means for finding a word incorrect amendment degree of each word in the modified character string;

a reject processing means for determining characters to be rejected from the word incorrect amendment degree;

a rejected character-replacing means for replacing the rejected characters in the modified character string by a character category having a maximum degree of similarity and outputted from said character recognition means; and a re-extraction position-indicating means for producing a re-extraction position of the rejected characters to a character extraction means which divides a text image into plural regions for each character.

* * * * *